(12) United States Patent
Weeldreyer et al.

(10) Patent No.: US 9,092,130 B2
(45) Date of Patent: *Jul. 28, 2015

(54) DEVICES, METHODS, AND GRAPHICAL USER INTERFACES FOR DOCUMENT MANIPULATION

(75) Inventors: Christopher Douglas Weeldreyer, San Carlos, CA (US); Martin J. Murrett, Portland, OR (US); Matthew Todd Schomer, Santa Cruz, CA (US); Kevin Raemon Glyn Smyth, Vancouver (CA); Ian Joseph Elseth, Vancouver, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,202

(22) Filed: Sep. 23, 2011

(65) Prior Publication Data

US 2012/0311422 A1 Dec. 6, 2012

Related U.S. Application Data

(60) Provisional application No. 61/491,323, filed on May 31, 2011.

(51) Int. Cl.
*G06F 17/22* (2006.01)
*G06F 3/041* (2006.01)
(Continued)

(52) U.S. Cl.
CPC .......... *G06F 3/0488* (2013.01); *G06F 3/04883* (2013.01); *G06F 17/214* (2013.01); *G06F 17/24* (2013.01); *G06F 2203/04805* (2013.01); *G06F 2203/04806* (2013.01)

(58) Field of Classification Search
USPC ......... 715/200, 201, 204, 205, 209, 226, 231, 715/234, 243, 244, 246, 251, 252, 253, 255, 715/256, 273, 700, 760, 788, 859, 860, 715/861; 345/156, 173, 179, 472.2
See application file for complete search history.

(56) References Cited

U.S. PATENT DOCUMENTS 4,332,464 A 6/1982 Bartulis et al.
4,680,429 A 7/1987 Murdock et al.
(Continued)

FOREIGN PATENT DOCUMENTS

CN 1129889 A 8/1996
CN 1293807 A 5/2001
(Continued)

OTHER PUBLICATIONS

Notice of Allowance dated Sep. 16, 2013, received in U.S. Appl. No. 13/243,423, 12 pages (Weeldreyer).
(Continued)

*Primary Examiner* — Maikhanh Nguyen
(74) *Attorney, Agent, or Firm* — Morrison & Foerster LLP

(57) ABSTRACT

An electronic device displays at least a portion of an electronic document with a predefined page layout at a first magnification level on a display; detects a first input indicating a first insertion point in the document, where the first insertion point is proximate to a first portion of text in the document; and in response to detecting the first input: selects a second magnification level different from the first magnification level, where the second magnification level is selected so as to display the first portion of text at a target text display size, and, while maintaining the predefined page layout of the document, displays, at the second magnification level, a portion of the document that includes the first portion of text.

24 Claims, 51 Drawing Sheets

(51) Int. Cl.
   *G06F 3/0488*   (2013.01)
   *G06F 17/21*   (2006.01)
   *G06F 17/24*   (2006.01)

(56) References Cited

U.S. PATENT DOCUMENTS

| | | | |
|---|---|---|---|
| 4,698,625 A | 10/1987 | McCaskill et al. |
| 4,755,811 A | 7/1988 | Slavin et al. |
| 4,790,028 A | 12/1988 | Ramage |
| 5,016,002 A | 5/1991 | Levanto |
| 5,027,110 A | 6/1991 | Chang et al. |
| 5,053,758 A | 10/1991 | Cornett et al. |
| 5,079,723 A | 1/1992 | Herceg et al. |
| 5,119,079 A | 6/1992 | Hube et al. |
| 5,201,034 A | 4/1993 | Matsuura et al. |
| 5,260,697 A | 11/1993 | Barrett et al. |
| 5,266,931 A | 11/1993 | Tanaka |
| 5,266,949 A | 11/1993 | Rossi |
| 5,319,386 A | 6/1994 | Gunn et al. |
| 5,326,270 A | 7/1994 | Ostby et al. |
| 5,335,276 A | 8/1994 | Thompson et al. |
| 5,341,293 A | 8/1994 | Vertelney et al. |
| 5,341,466 A | 8/1994 | Perlin et al. |
| 5,347,295 A | 9/1994 | Agulnick et al. |
| 5,367,453 A | 11/1994 | Capps et al. |
| 5,408,060 A | 4/1995 | Muurinen |
| 5,422,656 A | 6/1995 | Allard et al. |
| 5,459,488 A | 10/1995 | Geiser |
| 5,463,725 A | 10/1995 | Henckel et al. |
| 5,465,401 A | 11/1995 | Thompson |
| 5,483,261 A | 1/1996 | Yasutake |
| 5,488,204 A | 1/1996 | Mead et al. |
| 5,511,148 A | 4/1996 | Wellner |
| 5,523,775 A | 6/1996 | Capps |
| 5,543,588 A | 8/1996 | Bisset et al. |
| 5,543,897 A | 8/1996 | Altrieth, III |
| 5,553,225 A | 9/1996 | Perry |
| 5,565,888 A | 10/1996 | Selker |
| 5,568,536 A | 10/1996 | Tiller et al. |
| 5,579,037 A | 11/1996 | Tahara et al. |
| 5,589,586 A | 12/1996 | Stein et al. |
| 5,615,384 A | 3/1997 | Allard et al. |
| 5,625,710 A | 4/1997 | Katsuyama et al. |
| 5,638,523 A | 6/1997 | Mullet et al. |
| 5,640,580 A | 6/1997 | Slayden et al. |
| 5,673,338 A | 9/1997 | Denenberg et al. |
| 5,689,287 A | 11/1997 | Mackinlay et al. |
| 5,710,831 A | 1/1998 | Beernink et al. |
| 5,721,939 A | 2/1998 | Kaplan |
| 5,736,974 A | 4/1998 | Selker |
| 5,754,873 A | 5/1998 | Nolan |
| 5,757,358 A | 5/1998 | Osaga |
| 5,760,773 A | 6/1998 | Berman et al. |
| 5,778,404 A | 7/1998 | Capps et al. |
| 5,815,142 A | 9/1998 | Allard et al. |
| 5,825,352 A | 10/1998 | Bisset et al. |
| 5,835,079 A | 11/1998 | Shieh |
| 5,874,965 A | 2/1999 | Takai et al. |
| 5,877,751 A | 3/1999 | Kanemitsu et al. |
| 5,880,411 A | 3/1999 | Gillespie et al. |
| 5,910,800 A | 6/1999 | Shields et al. |
| 5,910,801 A | 6/1999 | Rosenburg et al. |
| 5,926,769 A | 7/1999 | Valimaa et al. |
| 5,943,043 A | 8/1999 | Furuhata et al. |
| 5,956,021 A | 9/1999 | Kubota et al. |
| 5,967,996 A | 10/1999 | Kadota et al. |
| 5,977,950 A | 11/1999 | Rhyne |
| 5,982,352 A | 11/1999 | Pryor |
| 6,020,881 A | 2/2000 | Naughton et al. |
| 6,037,939 A | 3/2000 | Kashiwagi et al. |
| 6,049,326 A | 4/2000 | Beyda et al. |
| 6,054,990 A | 4/2000 | Tran |
| 6,073,036 A | 6/2000 | Heikkinen et al. |
| 6,121,960 A | 9/2000 | Carroll et al. |
| 6,157,935 A | 12/2000 | Tran et al. |
| 6,173,194 B1 | 1/2001 | Vanttila |
| 6,188,391 B1 | 2/2001 | Seely et al. |
| 6,262,735 B1 | 7/2001 | Etelāperä |
| 6,295,390 B1 | 9/2001 | Kobayashi et al. |
| 6,310,610 B1 | 10/2001 | Beaton et al. |
| 6,323,846 B1 | 11/2001 | Westerman et al. |
| 6,411,283 B1 | 6/2002 | Murphy |
| 6,525,749 B1 | 2/2003 | Moran et al. |
| 6,563,913 B1 | 5/2003 | Kaghazian |
| 6,570,557 B1 | 5/2003 | Westerman et al. |
| 6,643,824 B1 | 11/2003 | Bates et al. |
| 6,664,989 B1 | 12/2003 | Snyder et al. |
| 6,664,991 B1 | 12/2003 | Chew et al. |
| 6,677,932 B1 | 1/2004 | Westerman |
| 6,690,387 B2 | 2/2004 | Zimmerman et al. |
| 6,822,635 B2 | 11/2004 | Shahoian et al. |
| 6,850,220 B2 | 2/2005 | Sakaguchi |
| 6,888,536 B2 | 5/2005 | Westerman et al. |
| 6,938,222 B2 | 8/2005 | Hullender et al. |
| 6,971,068 B2 | 11/2005 | Bates et al. |
| 7,015,894 B2 | 3/2006 | Morohoshi |
| 7,030,861 B1 | 4/2006 | Westerman et al. |
| 7,047,503 B1 | 5/2006 | Parrish et al. |
| 7,075,512 B1 | 7/2006 | Fabre et al. |
| 7,084,859 B1 | 8/2006 | Pryor |
| 7,088,344 B2 | 8/2006 | Maezawa et al. |
| 7,103,852 B2 | 9/2006 | Kairis, Jr. |
| 7,123,243 B2 | 10/2006 | Kawasaki et al. |
| 7,148,499 B2 | 12/2006 | Lapstun et al. |
| 7,184,064 B2 | 2/2007 | Zimmerman et al. |
| 7,213,214 B2 | 5/2007 | Baar et al |
| 7,218,226 B2 | 5/2007 | Wehrenberg |
| 7,268,772 B2 | 9/2007 | Kawai et al. |
| 7,305,630 B2 | 12/2007 | Hullender et al. |
| 7,319,457 B2 | 1/2008 | Lin et al. |
| 7,408,538 B2 * | 8/2008 | Hinckley et al. ............... 345/173 |
| 7,469,381 B2 * | 12/2008 | Ording ............... 715/702 |
| 7,479,949 B2 | 1/2009 | Jobs et al. |
| 7,480,870 B2 | 1/2009 | Anzures et al. |
| 7,509,588 B2 | 3/2009 | van Os et al. |
| 7,536,656 B2 | 5/2009 | Hullender et al. |
| 7,565,613 B2 | 7/2009 | Forney |
| 7,614,008 B2 | 11/2009 | Ording |
| 7,633,076 B2 | 12/2009 | Huppi et al. |
| 7,650,137 B2 | 1/2010 | Jobs et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,683,888 B1 | 3/2010 | Kennedy |
| 7,683,889 B2 | 3/2010 | Rimas Ribikauskas et al. |
| 7,692,637 B2 | 4/2010 | Davis |
| 7,694,231 B2 | 4/2010 | Kocienda et al. |
| 7,705,830 B2 | 4/2010 | Westerman et al. |
| 7,743,348 B2 | 6/2010 | Robbins et al. |
| 7,760,187 B2 | 7/2010 | Kennedy |
| 7,760,925 B2 | 7/2010 | Sakurai et al. |
| 7,768,536 B2 * | 8/2010 | Hyatt ............... 345/660 |
| 7,808,479 B1 | 10/2010 | Hotelling et al. |
| 7,812,826 B2 | 10/2010 | Ording et al. |
| 7,818,691 B2 | 10/2010 | Irvine |
| 7,856,605 B2 | 12/2010 | Ording et al. |
| 7,864,163 B2 | 1/2011 | Ording et al. |
| 7,889,212 B2 | 2/2011 | Schulz et al. |
| 7,957,762 B2 | 6/2011 | Herz et al. |
| 7,957,955 B2 | 6/2011 | Christie et al. |
| 8,006,002 B2 | 8/2011 | Kalayjian et al. |
| 8,042,042 B2 | 10/2011 | Kim et al. |
| 8,074,172 B2 | 12/2011 | Kocienda et al. |
| 8,201,109 B2 * | 6/2012 | Van Os et al. ............... 715/863 |
| 8,239,784 B2 | 8/2012 | Hotelling et al. |
| 8,255,798 B2 | 8/2012 | Ording |
| 8,352,877 B2 | 1/2013 | Beatty et al. |
| 8,370,736 B2 * | 2/2013 | Ording et al. ............... 715/234 |
| 8,381,135 B2 | 2/2013 | Hotelling et al. |
| 8,416,205 B2 * | 4/2013 | Rapp et al. ............... 345/173 |
| 2001/0040587 A1 | 11/2001 | Scheck |
| 2002/0003469 A1 | 1/2002 | Gupta |
| 2002/0011993 A1 | 1/2002 | Lui et al. |
| 2002/0015024 A1 | 2/2002 | Westerman et al. |

(56) References Cited

U.S. PATENT DOCUMENTS

| | | |
|---|---|---|
| 2002/0030665 A1 | 3/2002 | Ano |
| 2002/0030699 A1 | 3/2002 | Van Ee |
| 2002/0039108 A1 | 4/2002 | Roy et al. |
| 2002/0059350 A1 | 5/2002 | Iwema et al. |
| 2002/0067346 A1 | 6/2002 | Mouton |
| 2002/0069220 A1 | 6/2002 | Tran |
| 2002/0080123 A1 | 6/2002 | Kennedy et al. |
| 2002/0080151 A1 | 6/2002 | Venolia |
| 2002/0097270 A1 | 7/2002 | Keely et al. |
| 2002/0112180 A1 | 8/2002 | Land et al. |
| 2002/0180763 A1 | 12/2002 | Kung |
| 2003/0014382 A1 | 1/2003 | Iwamoto et al. |
| 2003/0043113 A1 | 3/2003 | Itoh |
| 2003/0063073 A1 | 4/2003 | Geaghan et al. |
| 2003/0137522 A1 | 7/2003 | Kaasila et al. |
| 2004/0021676 A1 | 2/2004 | Chen et al. |
| 2004/0039934 A1 | 2/2004 | Land et al. |
| 2004/0075695 A1 | 4/2004 | Chew et al. |
| 2004/0130575 A1 | 7/2004 | Tai et al. |
| 2004/0135818 A1 | 7/2004 | Thomson et al. |
| 2004/0155888 A1 | 8/2004 | Padgitt et al. |
| 2004/0160419 A1 | 8/2004 | Padgitt |
| 2004/0174399 A1 | 9/2004 | Wu et al. |
| 2004/0183817 A1 | 9/2004 | Kaasila |
| 2004/0196267 A1 | 10/2004 | Kawai et al. |
| 2004/0203674 A1 | 10/2004 | Shi et al. |
| 2004/0237053 A1 | 11/2004 | Impas et al. |
| 2005/0005241 A1 | 1/2005 | Hunleth et al. |
| 2005/0012723 A1 | 1/2005 | Pallakoff |
| 2005/0024341 A1* | 2/2005 | Gillespie et al. ............... 345/173 |
| 2005/0052547 A1 | 3/2005 | Minakuti et al. |
| 2005/0068342 A1 | 3/2005 | Ouchi et al. |
| 2005/0076300 A1 | 4/2005 | Martinez |
| 2005/0093826 A1 | 5/2005 | Huh |
| 2005/0111736 A1 | 5/2005 | Hullender et al. |
| 2005/0135053 A1 | 6/2005 | Carroll |
| 2005/0140660 A1 | 6/2005 | Valikangas |
| 2005/0145807 A1 | 7/2005 | Lapstun et al. |
| 2005/0190059 A1 | 9/2005 | Wehrenberg |
| 2005/0190147 A1 | 9/2005 | Kim |
| 2005/0192924 A1 | 9/2005 | Drucker et al. |
| 2005/0198588 A1 | 9/2005 | Lin et al. |
| 2005/0229117 A1 | 10/2005 | Hullender et al. |
| 2005/0243373 A1 | 11/2005 | Silverbrook et al. |
| 2006/0001654 A1 | 1/2006 | Smits |
| 2006/0005151 A1 | 1/2006 | Altman |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033721 A1 | 2/2006 | Woolley et al. |
| 2006/0033724 A1 | 2/2006 | Chaudhri et al. |
| 2006/0038796 A1* | 2/2006 | Hinckley et al. ............... 345/173 |
| 2006/0041589 A1 | 2/2006 | Helfman et al. |
| 2006/0053387 A1 | 3/2006 | Ording |
| 2006/0066588 A1 | 3/2006 | Lyon et al. |
| 2006/0085757 A1 | 4/2006 | Andre et al. |
| 2006/0097991 A1 | 5/2006 | Hotelling et al. |
| 2006/0101354 A1 | 5/2006 | Hashimoto et al. |
| 2006/0125803 A1 | 6/2006 | Westerman et al. |
| 2006/0132460 A1 | 6/2006 | Kolmykov-Zotov et al. |
| 2006/0161871 A1 | 7/2006 | Hotelling et al. |
| 2006/0190833 A1 | 8/2006 | SanGiovanni et al. |
| 2006/0197753 A1 | 9/2006 | Hotelling |
| 2006/0238519 A1 | 10/2006 | Westerman et al. |
| 2006/0242607 A1 | 10/2006 | Hudson |
| 2006/0244735 A1 | 11/2006 | Wilson |
| 2006/0265648 A1 | 11/2006 | Rainisto et al. |
| 2006/0265653 A1 | 11/2006 | Paasonen et al. |
| 2006/0274051 A1 | 12/2006 | Longe et al. |
| 2006/0277481 A1 | 12/2006 | Forstall et al. |
| 2006/0284858 A1 | 12/2006 | Rekimoto |
| 2006/0290678 A1 | 12/2006 | Lii |
| 2007/0033544 A1 | 2/2007 | Fleisher et al. |
| 2007/0109275 A1 | 5/2007 | Chuang |
| 2007/0115264 A1 | 5/2007 | Yu et al. |
| 2007/0139374 A1 | 6/2007 | Harley |
| 2007/0150829 A1* | 6/2007 | Eschbach et al. ............... 715/781 |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0152984 A1 | 7/2007 | Ording et al. |
| 2007/0157085 A1 | 7/2007 | Peters |
| 2007/0186158 A1 | 8/2007 | Kim et al. |
| 2007/0238489 A1 | 10/2007 | Scott |
| 2007/0247435 A1 | 10/2007 | Benko et al. |
| 2007/0250793 A1 | 10/2007 | Miura et al. |
| 2007/0252821 A1 | 11/2007 | Hollemans et al. |
| 2007/0257890 A1 | 11/2007 | Hotelling |
| 2007/0260981 A1 | 11/2007 | Kim et al. |
| 2007/0268317 A1* | 11/2007 | Banay ............... 345/660 |
| 2008/0002888 A1 | 1/2008 | Yuan |
| 2008/0036743 A1 | 2/2008 | Westerman et al. |
| 2008/0042984 A1 | 2/2008 | Lim et al. |
| 2008/0055269 A1 | 3/2008 | Lemay et al. |
| 2008/0055273 A1 | 3/2008 | Forstall |
| 2008/0062202 A1 | 3/2008 | Schulz et al. |
| 2008/0077880 A1 | 3/2008 | Oygard |
| 2008/0094368 A1 | 4/2008 | Ording et al. |
| 2008/0098331 A1 | 4/2008 | Novick et al. |
| 2008/0122796 A1 | 5/2008 | Jobs et al. |
| 2008/0126387 A1 | 5/2008 | Blinnikka |
| 2008/0165141 A1* | 7/2008 | Christie ............... 345/173 |
| 2008/0165142 A1* | 7/2008 | Kocienda et al. ............... 345/173 |
| 2008/0165143 A1 | 7/2008 | Tolmasky et al. |
| 2008/0165148 A1 | 7/2008 | Williamson et al. |
| 2008/0165160 A1 | 7/2008 | Kocienda et al. |
| 2008/0168349 A1 | 7/2008 | Lamiraux et al. |
| 2008/0168388 A1 | 7/2008 | Decker |
| 2008/0174570 A1 | 7/2008 | Jobs et al. |
| 2008/0184138 A1 | 7/2008 | Krzanowski et al. |
| 2008/0201452 A1 | 8/2008 | Athas et al. |
| 2008/0252662 A1 | 10/2008 | Hyatt |
| 2008/0259040 A1 | 10/2008 | Ording et al. |
| 2008/0270891 A1 | 10/2008 | Friedman et al. |
| 2008/0294974 A1 | 11/2008 | Nurmi et al. |
| 2008/0316183 A1 | 12/2008 | Westerman et al. |
| 2008/0316212 A1 | 12/2008 | Kushler |
| 2008/0320391 A1 | 12/2008 | Lemay et al. |
| 2009/0002326 A1 | 1/2009 | Pihlaja |
| 2009/0006991 A1 | 1/2009 | Lindberg et al. |
| 2009/0015596 A1 | 1/2009 | Fuchs et al. |
| 2009/0044124 A1 | 2/2009 | Pihlaja |
| 2009/0048000 A1 | 2/2009 | Ade-Hall |
| 2009/0070704 A1* | 3/2009 | Ording ............... 715/784 |
| 2009/0073194 A1* | 3/2009 | Ording ............... 345/672 |
| 2009/0077488 A1* | 3/2009 | Ording ............... 715/784 |
| 2009/0089707 A1 | 4/2009 | Knowles |
| 2009/0093276 A1 | 4/2009 | Kim et al. |
| 2009/0125848 A1 | 5/2009 | Keohane et al. |
| 2009/0138810 A1 | 5/2009 | Howard et al. |
| 2009/0153492 A1 | 6/2009 | Popp |
| 2009/0167700 A1 | 7/2009 | Westerman et al. |
| 2009/0178008 A1* | 7/2009 | Herz et al. ............... 715/840 |
| 2009/0225100 A1 | 9/2009 | Lee et al. |
| 2009/0228792 A1 | 9/2009 | Van Os et al. |
| 2009/0228828 A1 | 9/2009 | Beatty et al. |
| 2009/0228841 A1 | 9/2009 | Hildreth |
| 2009/0228842 A1 | 9/2009 | Westerman et al. |
| 2009/0235186 A1 | 9/2009 | Howard et al. |
| 2009/0292989 A1 | 11/2009 | Matthews et al. |
| 2009/0319888 A1 | 12/2009 | Oygard |
| 2010/0042933 A1 | 2/2010 | Ragusa |
| 2010/0123737 A1 | 5/2010 | Williamson et al. |
| 2010/0169766 A1 | 7/2010 | Duarte et al. |
| 2010/0174732 A1 | 7/2010 | Levy et al. |
| 2010/0174979 A1 | 7/2010 | Mansfield et al. |
| 2010/0174980 A1 | 7/2010 | Mansfield et al. |
| 2010/0174985 A1 | 7/2010 | Levy et al. |
| 2010/0185975 A1 | 7/2010 | Anwar |
| 2010/0202010 A1 | 8/2010 | Xiao |
| 2010/0231529 A1 | 9/2010 | Tikka |

(56) References Cited

U.S. PATENT DOCUMENTS

| | | | |
|---|---|---|---|
| 2010/0235726 A1 | 9/2010 | Ording et al. | |
| 2010/0235734 A1 | 9/2010 | Ording et al. | |
| 2010/0235783 A1* | 9/2010 | Ording et al. | 715/810 |
| 2010/0274674 A1 | 10/2010 | Roberts et al. | |
| 2010/0283743 A1 | 11/2010 | Coddington | |
| 2011/0007094 A1 | 1/2011 | Nash et al. | |
| 2011/0074698 A1* | 3/2011 | Rapp et al. | 345/173 |
| 2011/0074699 A1* | 3/2011 | Marr et al. | 345/173 |
| 2011/0078597 A1 | 3/2011 | Rapp et al. | |
| 2011/0258537 A1 | 10/2011 | Rives et al. | |
| 2011/0258563 A1 | 10/2011 | Lincke | |
| 2011/0267355 A1 | 11/2011 | Coombes et al. | |
| 2011/0292084 A1 | 12/2011 | Thomas | |
| 2013/0055150 A1 | 2/2013 | Galor | |
| 2013/0174081 A1 | 7/2013 | Yoon et al. | |
| 2014/0139431 A1 | 5/2014 | Tseng et al. | |
| 2014/0317549 A1 | 10/2014 | Hwang et al. | |

FOREIGN PATENT DOCUMENTS

| | | |
|---|---|---|
| CN | 101063920 A | 10/2007 |
| CN | 101068411 A | 11/2007 |
| EP | 0 283 995 A2 | 9/1988 |
| EP | 0 476 972 A2 | 3/1992 |
| EP | 0 575 146 A2 | 12/1993 |
| EP | 0 609 030 A1 | 8/1994 |
| EP | 0 651 543 A2 | 5/1995 |
| EP | 0667567 A2 | 8/1995 |
| EP | 0 795 811 A1 | 9/1997 |
| EP | 1 674 976 A2 | 6/2006 |
| EP | 1 850 217 A2 | 10/2007 |
| EP | 2 138 929 A2 | 12/2009 |
| EP | 2 144 149 A2 | 1/2010 |
| FR | 2 898 197 A1 | 9/2007 |
| GB | 2 351 639 A | 1/2001 |
| GB | 2 433 402 A | 6/2007 |
| JP | 57 041 731 | 3/1982 |
| JP | 59 057 336 | 4/1984 |
| JP | 02 153 415 A | 6/1990 |
| JP | 3-113578 A | 5/1991 |
| JP | 04 047 358 | 2/1992 |
| JP | 05 165 459 | 7/1993 |
| JP | 06 274 586 A | 9/1994 |
| JP | 06 332 617 A | 12/1994 |
| JP | 07 320 051 | 12/1995 |
| JP | 07 320 079 | 12/1995 |
| JP | 08 185 265 A | 7/1996 |
| JP | 08 227 341 A | 9/1996 |
| JP | 10-340075 A | 12/1998 |
| JP | 00 163 031 | 6/2000 |
| JP | 02 342 033 | 11/2002 |
| JP | 07 072 233 | 3/2007 |
| JP | 07 299 394 | 11/2007 |
| JP | 10 146 279 | 7/2010 |
| KR | 10-2007-0107462 A | 11/2007 |
| KR | 10-2010-0039253 A | 4/2010 |
| WO | WO 94/29788 A1 | 12/1994 |
| WO | WO 98/09270 A1 | 3/1998 |
| WO | WO 98/52118 A | 11/1998 |
| WO | WO 99/21084 A1 | 4/1999 |
| WO | WO 99/54807 A1 | 10/1999 |
| WO | WO 00/75766 A1 | 12/2000 |
| WO | WO 01/46790 A2 | 6/2001 |
| WO | WO 03/023593 A1 | 3/2003 |
| WO | WO 2004/051392 A2 | 6/2004 |
| WO | WO 2004/051430 A2 | 6/2004 |
| WO | WO 2004/070604 A2 | 8/2004 |
| WO | WO 2006/003591 A2 | 1/2006 |
| WO | WO 2006/020304 A2 | 2/2006 |
| WO | WO 2006/020305 A2 | 2/2006 |
| WO | 20061036607 A1 | 4/2006 |
| WO | WO 2006/126055 A2 | 11/2006 |
| WO | WO 2007/037806 A1 | 4/2007 |
| WO | WO 2008/030879 A2 | 3/2008 |
| WO | WO 2008/030976 A2 | 3/2008 |
| WO | WO 2008/352100 A2 | 5/2008 |
| WO | WO 2009/022243 A1 | 2/2009 |
| WO | WO 2009/085779 A1 | 7/2009 |
| WO | WO 2009/111249 A2 | 9/2009 |

OTHER PUBLICATIONS

Final Office Action dated Jul. 5, 2013, received in US. Appl. No. 13/243,582, 13 pages (Weeldreyer).
Notice of Allowance dated Jul. 3, 2013, received in U S. Appl. No. 13/243,637, 13 pages (Weeldreyer).
International Search Report and Written Opinion dated Jan. 17, 2013, received in International Patent Application No. PCT/US2012/040291, which corresponds to U.S. Appl. No. 13/243,202, 28 pages. (Weeldreyer)
Office Action dated May 24, 2013, received in U.S. Appl. No. 13/243,423, 13 pages (Weeldreyer).
Office Action dated May 24, 2013, received in U.S. Appl. No. 13/243,506, 18 pages (Weeldreyer).
Advances in Human-Computer Interaction, Chapters 1, 5, and 6, Ablex Publishing Corporation, 1992, 121 pages.
Ahlberg, C. et al., "The Alphaslider: A Compact and Rapid Selector," ACM, Apr. 1984, proceedings of the SIGCHI conference on Human Factors in Computing Systems, pp. 365-371.
Ahlberg et al., "Visual Information Seeking: Tight Coupling of Dynamic Query Filters with Starfield Displays," Human Factors in Computing Systems, Boston MA, Apr. 24-28, 1994, 7 pages.
Ahlström et al., "Overcoming Touchscreen User Fatigue by Workplace Design," Proceeding CHI '92 Posters and short talks of the 1992 SIGCHI conference on Human factors in computing systems ACM, New York, 1992, 2 pages.
Apple.com, "Quasi Clipboard," Apple Web Apps, Jan. 7, 2008, 1 page, http://www.apple.com/webapps/utilities/quasiclipboard.html.
Baeza-Yates, R., "Visualization of Large Answers in Text Databases," AVI '96 Proceedings of the Working Conference on Advanced Visual Interfaces, ACM, New York, 1996, 7 pages.
Barthel, B., "Information Access for Visuaiiy Impaired Persons: Do We Still Keep a 'Document' in 'Documentation'?" Professional Communication Conference, IPCC '95, Sep. 27-29, 1995, 5 pages.
Bederson et al., "Pad++; A Zooming Graphical Interface for Exploring Alternate Interface Physics," UIST "94, 1994 ACM, 10 pages.
Bederson et al., "The Craft of Information Visualization," Elsevier Science (USA) 2003, 435 pages.
Benel et al., "Optimal Size and Spacing of Touch Screen Input Areas," INTERACT '87—2nd IFIP International Conference on Human-Computer Interaction, Sep. 1-4, 1987, Stuttgart, Germany, 5 pages.
Beringer et al., "Operator Behavioral Biases Using High-Resolution Touch Input Devices," Proceedings of the Human Factors Society 33rd Annual Meeting, 1989, 3 pages.
Beringer, D., Target Size, Location, Sampling Point and Instructional Set: More Effects on Touch Panel Operation, Proceedings of the Human Factors Society 34th Annual Meeting, 1990, 5 pages.
Bernabei et al., "Graphical I/O Devices for Medical Users," Engineering in Medicine and Biology Society, 1992 14th Annual International Conference of the IEEE, Oct. 29-Nov. 1, 1992, Paris, France, 3 pages.
Bier, et al., "Toolglass and Magic Lenses: The See-Through Interface," Proceedings of SIGGRAPH '93, Aug. 2-6, 1993, ACM 1993, 8 pages.
Bitstream®, "ThunderHawk Pocket PC Edition for End Users," © 2005, downloaded Jun. 12, 2006, 4 pages, http://www.bitstream.com/wireless/products/pocketpc/faq_using.html.
Brighthand, "Thread: Cut, Copy & Paste," Brighthand.com, Jan. 13, 2005, http://forum.brighthand.com/showthread.php?t=82701, 2 pages.
Brighthand, "Thread: How do I cut & paste, & copy on a PDA," Brighthand. Com, Sep. 19, 2004, http://forum.brighthand.com/showthread.php?s=2d32c96c9aaedaa454e3d05962503046&t=77588, 2 pages.
Brown et al., "Browsing Graphs Using a Fisheye View," INTERCHI '93, Apr. 24-29, 1993, ACM 1993, 1 page.

(56) References Cited

OTHER PUBLICATIONS

Burger, D., "Improved Access to Computers for the Visually Handicapped: New Prospects and Principles," IEEE Transactions on Rehabilitation Engineering, vol. 2, No, 3. Sep. 1994, 8 pages.
Card et al., "Readings in Information Visualization Using Vision to Think," Morgan Kaufman Publishers, Inc., 1999, 711 pages.
Chen, Y., "Detecting Web Page Structure for Adaptive Viewing on Small Form Factor Devices," Microsoft Research, i-yuchen@microsoft.com, May 20-24, 2003, 9 pages.
Degani et al., "'Soft' Controls for Hard Displays: Still a Challenge," Proceedings of the Human Factors Society 36th Annual Meeting, 1992, 5 pages.
Eslambolchilaar et al., "Making Sense of Fisheye Views," Second Dynamics and Interaction Workshop at University of Glasgow, Glasgow, Scotland, Aug. 2005, 6 pages.
FreewarePalm, "CutPaste5 v3.1," FreewarePalm.com, Apr. 5, 2004, http://www.freewarepalm.com/utilities/cutpaste5.shtml, 2 pages.
Furnas, G., "Effective View Navigation," CHI '97 Proceedings of the SIGCHI conference on Human factors in computing systems, ACM, New York, 1997, 8 pages.
Furnas, G., "Generalized Fisheye Views," ACM SIGCHI Bulletin, Special Issue: CHI '86 Conference Proceedings, vol. 17, Issue 4, Apr. 1986, 8 pages.
Furnas et al., "Space-Scale Diagrams: Understanding Multiscale Interfaces," CHI '95 Proceedings of the SIGCHI conference on Human factors in computing systems, ACM Press/Addison-Wesley Publishing Co. New York, NY, USA, 1995, 12 pages.
Furnas, G., "The Fisheye Calendar System," Bellcore Technical Memorandum, Nov. 19, 1991 , 9 pages.
Hinckley et al., "A survey of Design Issues in Spatial Input," Proceedings of the ACM Symposium on User Interface Software and Technology, Nov. 2-4, 1994, 10 pages.
Holman et al., "PaperWindows: Interaction Techniques for Digital Paper," Papers: Physical Interaction, CHI 2005, Apr. 2-7, 2005, Portland, Oregon, USA, 9 pages.
IBM, "Simon Says 'Here's How?'" Simon Users Manual, IBM Corp 1994, 63 pages.
iPhone Hacks, "iCopy Brings Copy & Paste Feature to the iPhone," Mar. 2008, 3 pages, http://www.iphonehacks.com/2008/03/iphone-icopy.html.
iPhone Hacks, "iPhone App-MagicPad's Copy & Paste Feature," Jul. 2008, 2 pages, http://www.iphonehacks.com/2008/07/iphonecopypaste.html.
Johnson, J., "A Comparison of User Interfaces for Panning on a Touch-Controlled Display," CHI '95 Proceedings, ACM 1995, 18 pages.
Jordan, M., "Quick Look in Leopard," Mac Tips, Nov. 7, 2007, 6 pages, http://mactips.info/tips/2007/11/quick-look-in-leopard.
Kamba et al., "Using small screen space more efficiently," CHI '96, Vancouver, BC, Canada, Apr. 13-18, 1996, 8 pages.
Keahey et al., "Non-Linear Image Magnification," Department of Computer Science, Indiana University, Apr. 24, 1996, 11 pages.
Keahey et al., "Nonlinear Magnification Fields," Department of Computer Science, Indiana University, Proceedings of the 1997 IEEE Symposium on Interaction Visualization, 12 pages.
Keahey et al., "Techniques for Non-Linear Magnification Transformations," Proceedings of the 1996 Symposium on Information Visualization, 8 pages.
Keahey et al., "Viewing Text With Non-Linear Magnification: An Experimental Study," Department of Computer Science, Indianan University, Apr. 24, 1990, 9 pages.
Kline et al., "Improving GUI Accessibility for People with Low Vision," Proceedings of the SIGCHI conference on Human factors in computing systems, May 7-11, 1995, 10 pages.
Kline et al., "UnWindows 1.0: X Windows Tools for Low Vision Users," Newsletter ACM SIGCHI Computers and the Physically Handicapped, Issue 49, Mar. 1994, 5 pages.
Kottke et al., "New iPhone features," kottke.org, Jul. 5, 2007, http://web.archive.org/web/20070705203857/http://www.knttke.org/07/07/new-iphone-features, 19 pages.

Lamping et al., "Laying out and Visualizing Large Trees Using a Hyperbolic Space." Proceedings of the 7th Annual ACM Symposium on User Interface Software and Technology, Nov. 2-4, 1994, ACM New York, NY, USA, 1994, 2 pages.
Lazzaro, J., "Adapting desktop computers to meet the needs of disabled workers is easier than you might think," Byte Magazine, Jun. 1993, #144, 5 pages.
Leahy et al., "Effect of Touch Screen Target Location on User Accuracy," Proceeding of the Human Factors Society 34th Annual Meeting, 1990, 5 pages.
Lee at al., "A Multi-Touch Three Dimensional Touch-Sensitive Tablet," CHI 85 Proceedings, Apr. 1985, pp. 21-25.
Lemmons et al., "Hewlett-Packard makes some magic," Product Review, Byte Publications Inc., Oct. 1983, 15 pages.
Leung et al., "A Review and Taxonomy of Distortion-Oriented Presentation Techniques," ACM Transactions on Computer-Human Interaction, vol. 1, No. 2 Jun. 1994. 35 pages.
Lieberman, H., "A Multi-Scale, Multi-Layer, Translucent Virtual Space," First International Conference on Information Visualization (IV'97), London, England, Aug. 27-28, 8 pages.
Lieberman, H., "Powers of Ten Thousand: Navigating in Large Information Spaces," Proceedings of the ACM Symposium on User Interface Software and Technology, Nov. 2-4, 1994, 2 pages.
Ionelysandwich, "iPhone Copy/Paste Proof of Concept Video," Jan. 28, 2008, 1 page, http://babygotmac.com/a/iphone-copypaste-proof-of-concept-video/.
Mac Forums, "How Would You Like Selection/Copy/Paste to Work?" Jul. 17, 2007, 13 pages, http://forums.macrumors.com/showthread.php?p=3932833#post3932833.
MacKenzie et al., "Alphanumeric entry on pen-based computers," International Journal of Human-Computer Studies (1994) 41, 18 pages.
Mackinlay et al., "The Perspective Wall: Detail and Context Smoothly Integrated," Proceedings of CHI '91 ACM Conference on Human Factors in Computing Systems, ACM 1991, 7 pages.
Microsoft.com, "Touch," msdn.microsoft.com, downloaded May 5, 2011, http://msdn.microsoft.com/en-us/library/cc872774.aspx, 18 pages.
Miller, D., "Personal/Java Application Environment," Jun. 8, 1999, http://java.sun.com/products/personaljava/touchable, 12 pages.
Milner, N., "A Review of Human Performance and Preferences with Different Input Devices to Computer Systems," Proceedings of the 4th Conference of the British Computer Society on People and Computers, Cambridge University Press, 1988, 22 pages.
Mitchell, R. "GUI Gets a Makeover," Computerworid Software, 4 pages, Sep. 25, 2006, http://www.computerworld.com/action/article.do?command=printArticleBasic&articleId=263695.
NCIP staff, "Magnification Technology," National Center to Improve Practice in Special Education Through Technology, Media, and Materials, 1994, 7 pages, http://www2.edc.org/ncip/library/vi/magnifi.htm.
Noik, G., "Layout-independent Fisheye Views of Nested Graphs," in VL'93: IEEE Symposium on Visual Languages, IEEE 1993, 6 pages.
Phillipps, B., "Touchscreens are changing the face of computers," Electronic Products 1994, 7 pages.
Pickering, J., "Touch-sensitive screens: the technologies and their application," Int. J. Man-Machine Studies (1986), 21 pages.
Plaisant et al., "Touchscreen Interfaces for Alphanumeric Data Entry," Proceedings of the Human Factors Society 36th Annual Meeting, 1992, 5 pages.
Plaisant et al., "Touchscreen Toggle Design," Proceedings of the Conference on Human Factors in Computing Systems, Addison Wesley, US, May 3, 1992, 2 pages.
Potter et al., "An Experimental Evaluation of Three Touch Screen Strategies within a Hypertext Database," International Journal of Human-Computer Interaction 1 (1) 41-52, 1989, 12 pages.
Potter et al., "Improving the Accuracy of Touch Screens: An Experimental Evaluation of Three Strategies," CHI '88 Proceedings of the SIGCHI conference on Human factors in computing systems, ACM New York, NY, USA, 1988, 6 pages.
Rao et al., "Exploring Large Tables with the Table Lens," CHI '95 Mosaic of Creativity, May 7-11, 1995, CHI' Companion 95, Denver, Colorado, USA, 2 pages.

(56) References Cited

OTHER PUBLICATIONS

Rao et al., "The Table Lens: Merging Graphical and Symbolic Representations in an Interactive Focus+Context Visualization for Tabular Information," Proceedings of the ACM SIGCHI Conference on Human Factors in Computing Systems, Boston, MA, Apr. 1994, 7 pages.
Raskin, A., "Firefox Mobile Concept Video," Aza'S Thoughts, Jun. 11, 2008, http://www.azarask.in/blog/post/firefox-mobile-concept~vido/, 50 pages.
Rekimoto, J. et al., "PreSense: Interaction Techniques for Finger Sensing Input Devices," UIST 2003, Vancouver, BC, Canada, © 2003 ACM, vol. 5, issue 2, pp. 203-212.
Ren et al., "Efficient strategies for selecting small targets on pen-based systems: an evaluation experiment for selection strategies and strategy classifications," Proceedings of the IFIP, vol. 22, 1999, 19 pages.
Ren et al., "Improving Selection Performance on Pen-Based Systems: A Study of Pen-Based Interaction for Selection Tasks," ACM Transactions on Computer-Human Interaction, vol. 7, No. 3, Sep. 2000, 33 pages.
Ren et al., "The Best among Six Strategies for Selecting a Minute Target and the Determination of the Minute Maximum Size of the Targets on a Pen-Based Computer," INTERACT '97, Proceedings of the IFIP TC13 International Conference on Human-Computer Interaction, Sydney, Australia, Jul. 1997, 8 pages.
Riecken, R., "Adaptive Direct Manipulation," IEEE International Conference Proceedings on Systems, Man, and Cybernetics, Decision Aiding for Complex Systems, 1991, 6 pages.
Robertson et al., "Information Visualization Using 3D Interactive Animation," Communications of the ACM, Apr. 1993, vol. 36, No. 4, 15 pages.
Robertson et al., "The Document Lens," UIST '93 Proceedings of the 6th annual ACM symposium on User interface software and technology, ACM, New York, 1993, 8 pages.
Rosner et al., "In Touch: A Graphical User Interface Development Tool," Software Tools for Interface Design, IEEE Colloquium, London, UK, Nov. 8, 1990, 7 pages.
Rubine, D., "Combining Gestures and Direct Manipulation," Conference of Human Factors in Computing Systems, pp. 659-660, 1992.
Rubine, D., "The Automatic Recognition of Gestures," 1991 Dean Harris Rubine, in partial fulfillment of the requirements for the degree of Doctor of Philosophy in Computer Science, Carnegie Mellon University, 285 pages.
Sarkar et al., "Graphical Fisheye Views of Graphs," Chi'92, Proceedings of the SIGCHI conference on Human Factors in Computing Science, May 3-7, 1992, ACM N Y, 1992, 9 pages.
Sarkar et al., "Graphical Fisheye Views of Graphs," Mar. 17, 1992, DEC/Systems Research Center 1992, 31 pages.
Sarkar et al., "Graphical Fisheye Views," Communications of the ACM, Dec. 1994, vol. 37, No. 12, 12 pages.
Sarkar et al., "Stretching the Rubber Sheet: A Metaphor for Viewing Large Layouts on Small Screens," Proceedings of the ACM Symposium on User Interface Software and Technology, Nov. 3-5, 1993, 11 pages.
Schaffer et al., "Navigating Hierarchically Clustered Networks through Fisheye and Full-Zoom Methods," ACM Transactions on Computer-Human Interaction, vol. 3, No. 2, Jun. 1996, 27 pages.
Scott et al., "Designing Touch Screen Numeric Keypads: Effects of Finger Size, Key Size, and Key Spacing," Proceedings of the Human Factors and Ergonomics Society 41st Annual Meeting, 1997, 5 pages.
Sears et al., "High precision touchscreens: design strategies and comparisons with a mouse," Int. J. Man-Machine Studies (1991) 34, 21 pages.
Sears et al., "Investigating touchscreen typing: the effect of keyboard size on typing speed," Behavior & Information Technology, 1993, vol. 12, No. 1, 6 pages.
Sheelagh et al., "3-Dimensional Pliable Surfaces: For the Effective Presentation of Visual Information," 1995 User Interface Software & Technology, 11 pages.
Sheelagh et al., "Extending Distortion Viewing from 2D to 3D," IEEE Computer Graphics and Applications, vol. 17, Issue 4, Jul./Aug. 1997, 10 pages.
Sheelagh et al., "Making Distortions Comprehensible," Proceedings of Symposium on Visual Languages, 1997, 10 pages.
Shen et al., "Informing the Design of Direct-Touch Tabletops," IEEE Sep./Oct. 2006, pp. 36-46.
Shneiderman, B., "Designing the User Interface Strategies for Effective Human-Computer Interaction," Second Edition, Addison-Wesley Publishing, Company 1992, 599 pages.
Shneiderman, B., "Designing the User Interface Strategies for Effective Human-Computer Interaction," Third Edition, Addison-Wesley Publishing Company 1998, 669 pages.
Shneiderman, B., "Direct Manipulation for Comprehensible, Predictable and Controllable User Interfaces," IUI '97 Proceedings of the 2nd International Conference on Intelligent User Interfaces, ACM New York, New York, USA 1997, 7 pages.
Shneiderman, B., "The Eyes Have It: A Task by Data Type Taxonomy for Information Visualizations," Proceedings of the 1996 IEEE Symposium on Visual Languages (VL '96), 1996 IEEE, 8 pages.
Shneiderman, B., "Touch Screens Now Offer Compelling Uses," Interface IEEE Software, Mar. 1991, 2 pages.
Simkovitz, D., "LP-DOS Magnifies the PC Screen," Proceedings of the Johns Hopkins National Search for Computing Applications to Assist Persons with Disabilities, Feb. 1-5, 1992, 2 pages.
Smith, R., "Relating Distortion to Performance in Distortion Oriented Displays," Proceedings Sixth Australian Conference on Computer-Human Interaction, 1996, Hamilton, New Zealand, 6 pages.
Sparks of Innovation in Human-Computer Interaction, B. Shneiderman, Ed., Ablex Publ., Norwood, N.J., (1993), various sections, 133 pages.
Starrett, C., "iPhone Gems: Top Photography and Image Manipulation Apps," iLounge, Oct. 8, 2008, 14 pages, http://www.ilounge.com/index.php/articles/comments/iphone-gems-top-photography-and-image-manipulation-apps.
Stone et al., "The Movable Filter as a User Interface Tool," CHI '94 Proceedings of SIGCHI conference on Human factors in computing systems: celebrating interdependence, ACM New York. NY, USA, 1994, 7 pages.
Su, J., "A Review of Telesensory's Vista PCI Screen Magnification System," Journal of Visual Impairment & Blindness, Oct. 1998, 5 pages.
Su et al., "A Review of Supernova Screen Magnification Program for Windows," Journal of Visual Impairment & Blindness, Feb. 1999, 3 pages.
Su et al., "A Review of Zoom Text Xtra Screen Magnification Program for Windows 95," Journal of Visual Impairment & Blindness, Feb. 1998, 4 pages.
Treo FAQ, "How can I copy and, paste text on my Treo?" treocentral.com, downloaded Sep. 4, 2012. http://www.treocentral.com/content/FAQ/110.htm, 1 page.
Uslan et al., "A Review of Henter-Joyce's MAGic for Windows NT," Journal of Visual Impairment and Blindness, Oct. 1999, 3 pages.
Uslan et al., "A Review of Two Screen Magnification Programs for Windows 95: Magnum 95 and LP-Windows," Journal of Visual Impairment & Blindness, Sep.-Oct. 1997, 5 pages.
Vimeo, "iPhone Copy and Paste," lonelysandwich, Sep. 2007, http://www.vimeo.com/266383, 7 pages.
Vogel et al., "Shift: A Technique for Operating Pen-Based Interfaces Using Touch," CHI 2007, Apr. 28-May 3, 2007, 10 pages.
W3C, "Cascading Style Sheets," level 2 revision 1 Css 2.1 Specification, Jun. 13, 2005, 14 pages, http://www.w3.org/TR/2005/WD-CSS21-20050613.
Ware et al., "The DragMag Image Magnifier," CHI '95 Mosaic of Creativity, May 7-11, 1995, ACM 1995, 2 pages.
Westerman, W., "Hand Tracking Finger Identification and Chordic Manipulation on a Multi-touch Surface," Doctoral Dissertation, submitted Spring 1999, 363 pages.
Yatani et al., "Escape: A target Selection Technique Using Visually-cued Gestures," CHI 2008, Apr. 5-10, 2008, Florence, Italy, 10 pages.
YouTube, "Copy/Cut and Paste for iPhone," 3:19 minute video, uploaded to YouTube by madmaxwhatever on Aug. 20, 2008, http://www.youtube.com/watch?v=3-3ZmJL5BCg, 1 page.

(56) References Cited

OTHER PUBLICATIONS

YouTube, "Copy and Paste on a Palm Pre," 1:13 minute video uploaded to YouTube by MobileInfocenter on Jan. 9, 2009, http://www.youtube.com/watch?v=luMEMEBiL_g. 2 pages.
YouTube, "eMind Basic Gestures: Cutting, Copying and Pasting Text," 1:10 minute video uploaded to YouTube by quine42 on Nov. 22, 2008, http://www.youtube.com/watch?v=4QIOYiCoChc, 1 page.
YouTube, "iPhone Cut & Paste with(in) Citrix XenApp," 1:31 minute video uploaded to YouTube by chrisfictxs on Jan. 6, 2009, http://www.youtube.com/watch?v=NJDnQ4DAY3s, 1 page.
International Search Report and Written Opinion dated May 2, 2011, received in International Application No. PCT/US2010/060113, which corresponds to U.S. Appl. No. 12/638,736, 15 pages (McCullough).
International Search Report and Written Opinion dated Jul. 18, 2008, received in International Application No. PCT/US2007/082486, which corresponds to U.S. Appl. No. 11/923,453, 12 pages (Kocienda).
European Search Report and Written Opinion dated Mar. 6, 2012, received in European Patent Application No. 11186455.9, which corresponds to U.S. Appl. No. 11/923,453, 9 pages (Kocienda).
International Search Report and Written Opinion dated Nov. 12, 2009, received in International Application No. PCT/US2008/086542, which corresponds to U.S. Appl. No. 12/242,852, 16 pages (van Os).
International Preliminary Report on Patentability dated Sep. 16, 2010, received in International Application No. PCT/US2008/086542, which corresponds to U.S. Appl. No. 12/242,852, 11 pages (van Os).
European Search Report dated May 9, 2102, received in European Patent Application No. 11192108.6, which corresponds to U.S. Appl. No. 12/242,852, 6 pages (van Os).
International Search Report and Written Opinion dated Jun. 22, 2011, received in International Application No. PCT/US2010/026947, which corresponds to U.S. Appl. No. 12/565,750, 17 pages (Ording).
Invitation to Pay Additional Fees dated Jun. 9, 2009, received in International Application No. PCT/US009/035177, which corresponds to U.S. Appl. No. 12/042,313, 6 pages (Westerman).
International Search Report dated Sep. 10, 2009, received in International Application No. PCT/US/2009/035177, which corresponds to U.S. Appl. No. 12/042,313, 6 pages (Westerman).
European Search Report dated Aug. 20, 2009, received in European Application No. 09154312.4, which corresponds to U.S. Appl. No. 12/042,313, 10 pages (Westerman).
Office Action dated Oct. 30, 2008, received in U.S. Appl. No. 11/553,436, 18 pages (Ording).
Office Action dated May 13, 2009, received in U.S. Appl. No. 11/553,436, 18 pages (Ording).
Office Action dated Oct. 30, 2009, received in U.S. Appl. No. 11/553,436, 13 pages (Ording).
Final Office Action dated Jun. 28, 2010, received in U.S. Appl. No. 11/553,436, 12 pages (Ording).
Notice of Allowance dated Sep. 29, 2010, received in U.S. Appl. No. 11/553,436, 8 pages (Ording).
Office Action dated Feb. 9, 2011, received in U.S. Appl. No. 11/923,453, 18 pages (Kocienda).
Final Office Action dated Oct. 31, 2011, received in U.S. Appl. No. 11/923,453, 23 pages (Kocienda).
Notice of Allowance dated Jun. 12, 2013, received in U.S. Appl. No. 11/923,453, 16 pages (Kocienda).
Office Action dated Aug. 10, 2011, received in Chinese Patent Application No. 200780046864.5, which corresponds to U.S. Appl. No. 11/923,453, 10 pages (Kocienda).
Decision to Grant dated May 15, 2012, received in Chinese Patent Application No. 200780046864.5, which corresponds to U.S. Appl. No. 11/923,453, 4 pages (Kocienda).
Office Action dated Oct. 15, 2009, received in European Patent Application No. 07 854 411.1, which corresponds to U.S. Appl. No. 11/923,453, 5 pages (Kocienda).

Office Action dated Jul. 25, 2013, received in European Patent Application No. 11 186 455.9, which corresponds to U.S. Appl. No. 11/923,453, 6 pages (Kocienda).
Office Action dated Mar. 18, 2011, received in U.S. Appl. No. 12/242,852, 16 pages (van Os).
Final Office Action dated Sep. 21, 2011, received in U.S. Appl. No. 12/242,852, 6 pages (van Os).
Notice of Allowance dated Jan. 9, 2012, received in U.S. Appl. No. 12/242,852, 10 pages (van Os).
Notice of Allowance dated Apr. 27, 2012, received in U.S. Appl. No. 12/242,852, 25 pages (van Os).
Office Action dated Jun. 4, 2012, received in Chinese Patent Application No. 200880129021.6, which corresponds to U.S. Appl. No. 12/242,852, 7 pages (van Os).
Decision to Grant dated Apr. 12, 2013, received in Chinese Patent Application No. 200880129021.6, which coresponds to U.S. Appl. No. 12/242,852, 12 pages. (van Os).
Office Action dated Feb. 14, 2011, received in European Patent Application No. 08 873 123.7, which corresponds to U.S. Appl. No. 12/242,852, 4 pages (van Os).
Intention to Grant dated Sep. 13, 2011, received in European Patent Application No. 08 873 123.7, which corresponds to U.S. Appl. No. 12/242,852, 4 pages (van Os).
Decision to Grant dated Dec. 20, 2011, received in European Patent Application No. 08873123.7, which corresponds to U.S. Appl. No. 12/242,852, 1 page (van Os).
Office Action dated May 5, 2008, received in U.S. Appl. No. 10/927,925, 23 pages (Kennedy).
Office Action dated Apr. 16, 2009, received in U.S. Appl. No. 10/927,925, 15 pages (Kennedy).
Final Office Action dated Nov. 17, 2009, received in U.S. Appl. No. 10/927,925, 19 pages (Kennedy).
Notice of Allowance dated Mar. 15, 2010, received in U.S. Appl. No. 10/927,925, 8 pages (Kennedy).
Notice of Allowance dated Jan. 27, 2011, received in U.S. Appl. No. 12/565,750, 10 pages (Ording).
Notice of Allowance dated Apr. 4, 2011, received in U.S. Appl. No. 12/565,750, 9 pages (Ording).
Office Action dated Sep. 26, 2011, received in U.S. Appl. No. 12/565,750, 11 pages (Ording).
Final Office Action dated Mar. 26, 2012, received in U.S. Appl. No. 12/565,750, 16 pages (Ording).
Notice of Allowance dated Jul. 3, 2012, received in U.S. Appl. No. 12/565,750, 34 pages (Ording).
Office Action dated Jun. 3, 2013, received in Japanese Patent Application No. 2012 500841, which corresponds to U.S. Appl. No. 12/565,750, 2 pages (Ording).
Office Action dated Apr. 26, 2013, received in Korean Patent Application No. 10-2011-7024282, which corresponds to U.S. Appl. No. 12/565,750, 2 pages (Ording).
Office Action dated Mar. 1, 2012, received in U.S. Appl. No. 12/565,751, 36 pages (Ording).
Final Office Action dated Jun. 22, 2012, received in U.S. Appl. No. 12/565,751, 18 pages (Ording).
Office Action dated Jan. 27, 2012, received in U.S. Appl. No. 12/565,752, 33 pages (Ording).
Notice of Allowance dated Jun. 5, 2012 received in U.S. Appl. No. 12/565,752, 7 pages (Ording).
Notice of Allowance dated Jul. 11, 2013, received in U.S. Appl. No. 12/565,752, 16 pages (Ording).
Office Action dated Mar. 13, 2012, received in U.S. Appl. No. 12/565,753, 31 pages (Ording).
Final Office Action dated Aug. 15, 2012, received in U.S. Appl. No. 12/565,753, 11 pages (Ording).
Office Action dated Aug. 5, 2013, received in U.S. Appl. No. 12/565,753, 12 pages (Ording).
Office Action dated Jun. 12, 2012, received in U.S. Appl. No. 12/565,754, 41 pages (Ording).
Final Office Action dated Dec. 20, 2012, received in U.S. Appl. No. 12/565,754, 24 pages (Ording).
Office Action dated Jul. 26, 2012, received in U.S. Appl. No. 12/565,755, 31 pages (Kocienda).

(56) References Cited

OTHER PUBLICATIONS

Final Office Action dated Jan. 3, 2013, received in U.S. Appl. No. 12/565,755, 18 pages (Kocienda).
Office Action dated Feb. 2, 2012, received in U.S. Appl. No. 12/565,756, 31 pages (Kocienda).
Notice of Allowance dated May 31, 2012, received in U.S. Appl. No. 12/565,756, 5 pages (Kocienda).
Notice of Allowance dated Oct. 15, 2013, received in U.S. Appl. No. 12/566,756, 15 pages (Kocienda).
Office Action dated Mar. 2, 2012, received in U.S. Appl. No. 12/565,757, 31 pages (Ording).
Final Office Action dated Aug. 15, 2012, received in U.S. Appl. No. 12/565,757, 12 pages (Ording).
Office Action dated Aug. 2, 2012, received in U.S. Appl. No. 12/565,759, 28 pages (Ording).
Notice of Allowance dated Apr. 8, 2013, received in U.S. Appl. No. 12/565,759, 14 pages (Ording).
Office Action dated Jan. 27. 2012, received in U.S. Appl. No. 12/565,760, 39 pages (Ording).
Notice of Allowance dated Jun. 11, 2012, received in U.S. Appl. No. 12/565,760, 11 pages (Ording).
Notice of Allowance dated Oct. 2, 2012, received in U.S. Appl. No. 12/565,760, 13 pages (Ording).
Office Acton dated Mar. 14, 2011, received in U.S. Appl. No. 12/820,974, 31 pages (Kennedy).
Final Office Action dated Sep. 1, 2011, received in U.S. Appl. No. 12/820,974, 36 pages (Kennedy).
Office Action dated Dec. 29, 2011, received in U.S. Appl. No. 12/820,974, 26 pages (Kennedy).
Notice of Allowance dated Aug. 3, 2012, received in U.S. Appl. No. 12/20,974, 8 pages (Kennedy).
Notice of Allowance dated Dec. 18, 2012, received in U.S. Appl. No. 12/820,974, 14 pages (Kennedy).
Office Action dated Dec. 7, 2010 received in U.S. Appl. No. 12/042,313, 10 pages (Westerman).
Final Office Action dated Apr. 31, 2011, received in U.S. Appl. No. 12/042,313 (Westerman).
Office Action dated Sep. 27, 2012, received in U.S. Appl. No. 12/042,313, 26 pages (Westerman).
Final Office Action dated Apr. 18, 2013, received in U.S. Appl. No. 12/042,313, 9 pages (Westerman).
Notice of Allowance dated Oct. 2, 2013, received in U.S. Appl. No. 12/042,313, 8 pages (Westerman).
Office Action dated Dec. 31, 2010, received in Chinese Patent Application No. 200910118597.9, which corresponds to U.S. Appl. No. 12/042,313, 17 pages (Westerman).
Office Action dated Aug. 24, 2011, received in Chinese Patent Application No. 200910118597.9, which corresponds to U.S. Appl. No. 12/042,313, 6 pages (Westerman).
Decision to Grant dated Jun. 5, 2012, received in Chinese Patent Application No. 200910118597.9, which corresponds to U.S. Appl. No. 12/042,313, 1 page (Westerman).
Office Action dated Oct. 8, 2013, received in European Patent Application No. 09 154 312.4, which corresponds to U.S. Appl. No. 12/042,313, 4 pages (Westerman).
Notice of Allowance dated Oct. 18, 2013, received in U.S. Appl. No. 13/243,506, 13 pages (Weeldreyer).
International Preliminary Report on Patentability received for PCT Patent Application No. PCT/US2012/040291, mailed on Dec. 12, 2013, 19 pages.
Non-Final Office Action received for U.S. Appl. No. 13/243,582, mailed on Mar. 28, 2014, 17 pages.
Notice of Allowance received for U.S. Appl. No. 13/243,423, mailed on Jan. 8, 2014, 9 pages.
Notice of Allowance received for U.S. Appl. No. 13/243,637, mailed on Dec. 31, 2013, 8 pages.
Notice of Allowance received for U.S. Appl. No. 13/243,506, mailed on Feb. 6, 2014, 8 pages.
Non Final Office Action received for U.S. Appl. No. 12/565,754, mailed on Dec. 27, 2013, 21 pages.
Non Final Office Action received for U.S. Appl. No. 12/565,757, mailed on Dec. 20, 2013, 9 pages.
Invitation to Pay Additional Fees dated Aug. 30, 2012, received in International Application No. PCT/US2012/040591, which corresponds to U.S. Appl. No. 13/243,202, 7 pages (Weeldreyer).
Office Action dated Oct. 25, 2012, received in U.S. Appl. No. 13/243,582, 13 pages (Weeldreyer).
Office Action dated Nov. 8, 2012, received in U.S. Appl. No. 13/243,637, 8 pages (Weeldreyer).
International Search Report and Written Opinion received for PCT Patent Application No. PCT/US08/087045, mailed on Feb. 27, 2009, 13 pages.
International Search Report and Written Opinion received for PCT Patent Application No. PCT/US2007/077645, mailed on Jan. 10, 2008, 7 pages.
International Preliminary Report on Patentability received for PCT Patent Application No. PCT/US2007/082486, issued on Apr. 28, 2009, 7 pages.
International Preliminary Report on Patentability received for PCT Patent Application No. PCT/US2009/035177, issued on Sep. 07, 2010, 11 pages.
International Preliminary Report on Patentability received for PCT Patent Application No. PCT/US2010/026947, mailed on Sep. 29, 2011, 11 pages.
Office Action received for European Patent Application No. 07854411.1, mailed on Apr. 18, 2012, 5 pages.
Office Action received for European Application No. 09154312.4, mailed on Feb. 05, 2010, 1 page.
Partial European Search Report received for European Patent Application No. 09154312.4, mailed on Jun. 3, 2009, 4 pages.
Final Office Action received for U.S. Patent Application No. 10/927,925, mailed on Dec. 20, 2007, 26 pages.
Final Office Action received for U.S. Patent Application No. 10/927,925, mailed on Nov. 10, 2008, 22 pages.
Non-Final Office Action received for U.S. Patent Application No. 10/927,925, mailed on Jul. 24, 2007, 21 pages.
Notice of Allowance received for Korean Patent Application No. 10-2013-7028483, mailed on Aug. 19, 2014, 3 pages (Official Copy only). (See Communication under 37 CFR § 1.98(a) (3)).
Office Action received for Korean Patent Application No. 10-2013-7032396, mailed on Jan. 21, 2015, 3 pages (Official Copy only). (See Communication under 37 CFR § 1.98(a) (3)).
Office Action received for European Patent Application No. 10712823.3, mailed on Nov. 20, 2012, 6 pages.
Notice of Allowance received for U.S. Appl. No. 12/565,753, mailed on Jan. 31, 2014, 8 pages.
Final Office Action received for U.S. Appl. No. 12/565,754, mailed on May 22, 2014, 9 pages.
Final Office Action received for U.S. Appl. No. 12/565,757, mailed on Apr. 18, 2014, 11 pages.
Non-Final Office Action received for U.S. Appl. No. 12/565,757, mailed on Sep. 03, 2014, 9 pages.
Non Final Office Action received for U.S. Appl. No. 12/964,679, mailed on Jul. 03, 2014, 15 pages.
Non-Final Office Action received for U.S. Appl. No. 12/964,679, mailed on Mar. 02, 2015, 8 pages.
Non-Final Office Action received for U.S. Appl. No. 13/243,582, mailed on Jan. 29, 2015, 15 pages.
Final Office Action received for U.S. Appl. No. 14/056,263, mailed on Sep. 30, 2014, 11 pages.
Non-Final Office Action received for U.S. Appl. No. 14/056,263, mailed on Mar. 12, 2014, 5 pages.
Notice of Allowance received for U.S. Appl. No. 14/056,263, mailed on Dec. 15, 2014, 6 pages.
Notice of Allowance received for U.S. Appl. No. 14/056,263, mailed on Oct. 24, 2014, 8 pages.
Office Action received for Canadian Patent Application No. 2,755,796, mailed on Oct. 22, 2014, 4 pages.
Office Action received for Chinese Patent Application No. 201210295979.0, mailed on May 5, 2014, 12 pages (6 pages of English Translation and 6 pages of Official copy).
Office Action received for Australian Patent Application No. 2012262127, issued on Jan. 27, 2015, 3 pages.

(56) References Cited

OTHER PUBLICATIONS

Notice of Allowance received for Japanese Patent Application No. 2014-000636, mailed on Feb. 13, 2015, 3 pages (Official Copy only). (See Communication under 37 CFR § 1.98(a) (3)).
Office Action received for Japanese Patent Application No. 2014-513715, mailed on Jan. 16, 2015, 8 pages (5 pages of English Translation and 3 pages of Official Copy).
Apple.Com, "Keyboards", Catamount Software, Available at <http://www.apple.com/webapps/utilities/keyboards.html>, Oct. 23, 2007, 1 page.
Bier et al., "Toolglass and Magic Lenses: The See-Through Interface", Computer Graphics (SIGGRAPH '93 Proceedings), vol. 27, 1993, pp. 73-80.
Greenberg, Saul, "A Fisheye Text Editor for Relaxed-WYSIWIS Groupware", CHI '96 Companion, Vancouver, Canada, Apr. 13-18, 1996, 2 pages.
Leganchuk et al., "Manual and Cognitive Benefits of Two-Handed Input: An Experimental Study", Transactions on Human-Computer Interaction, vol. 5, No. 4, Dec. 1998, 45 pages.
Mackenzie, I. Scott, "Input Devices and Interaction Techniques for Advanced Computing", W. Barfield, & T.A. Furness III (Eds.), Virtual environments and advanced interface design, Oxford University Press, 1995, 24 pages.
Perez, B., "Palm Reader", LexisNexis, South China Morning Post, Nov. 1, 2005, 1 page.
Ritchie, Rene, "App Review +Q&A: MagicPad Brings Rich Text and Cut and Paste to the iPhone", available at <http://www.imore.com/app-review-qa-magicpad-brings-rich-text-and-cut-and-paste-to-the-iphone>, Aug. 05, 2008, 6 pages.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
"Visual Disabilities", Available at <http://depts.stcc.edu/ods/Access/bpvisual.htm>, Oct. 25, 2005, 3 pages.
"Ai Squared Products", Available at <http://www.aisquared.com/Products/index.cfm>, Oct. 25, 2005, 2 pages.
"Ai Squared Products—ZoomText Magnifier", Available at <http://www.aisquared.com/Products/zoomtextmag/index.cfm>, Oct. 26, 2005, 4 pages.
Apple Inc. vs. Samsung Electronics Co. Ltd. et al., Judgment in Interlocutory proceeding, Case No. 396957/KG ZA 11-730, civil law sector, Aug. 24, 2011, pp. 1-65.
Apple Inc. vs. Samsung Electronics Co. Ltd., et al., Samsung's Motion to Supplement Invalidity Contentions, Case No. 11-cv-01846-LHK, filed Jan. 27, 2012 together with Exhibit 6, Jan. 27, 2012, 47 pages.
Apple Inc. vs. Samsung Electronics Co. Ltd., et al., Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
"Lunar Screen Magnifier and Lunar Plus Enhanced Screen Magnifier", Available at <http://www.dolphincomputeraccess.com/products/lunar.htm>, Oct. 25, 2005, 6 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woodman, in matter of Apple Inc. vs Samsung Electronics, Case No. KG ZA 11-730 and KG ZA 11-731, Aug. 10-11, 2010, pp. 1-16.
Pleading notes Mr Kleemans, Mr Blomme and Mr Van Oorschot, in matter of Apple Inc. vs Samsung Electronics, Case No. KG ZA 11-730 and KG ZA 11-731, Aug. 10, 2011, 35 pages.
Samsung Electronics GmbH vs Apple Inc., "List scrolling and document translation, scaling and rotation on a touch-screen display", Opposition, Jan. 30, 2012, 27 pages.
Samsung Electronics vs Apple Inc., Statement of Defense Also Counterclaim, Case No. KG ZA 2011-730, Jul. 20, 2011, 44 pages.
Samsung Electronics vs Apple Inc., Statement of Defense Also Counterclaim, Case No. KG ZA 2011-731, Jul. 20, 2011, 48 pages.
YouTube "iPhone Copy and Paste video", Available online at <http://www.youtube.com/watch?v=UXgsQhiGeag>, Nov. 21, 2011.
Office Action received for Korean Patent Application No. 201210295979.0, mailed on Mar. 23, 2015, 13 pages (6 pages of English Translation and 7 pages of Official Copy).

* cited by examiner

DEVICES, METHODS, AND GRAPHICAL USER INTERFACES FOR DOCUMENT MANIPULATION

RELATED APPLICATIONS

This application claims priority to U.S. Provisional Application Ser. No. 61/491,323, filed May 31, 20011, entitled "Devices, Methods, and Graphical User Interfaces for Document Manipulation," which is incorporated herein by reference in its entirety.

This application is a related: (1) U.S. application Ser. No. 13/243,423, filed Sep. 23, 2011, entitled "Devices, Methods, and Graphical User Interfaces for Document Manipulation," (2) U.S. application Ser. No. 13/243,506, filed Sep. 23, 2011, entitled "Devices, Methods, and Graphical User Interfaces for Document Manipulation," (3) U.S. application Ser. No. 13/243,582, filed Sep. 23, 2011, entitled "Devices, Methods, and Graphical User Interfaces for Document Manipulation," and (4) U.S. application Ser. No. 13/243,637, filed Sep. 23, 2011, entitled "Devices, Methods, and Graphical User Interfaces for Document Manipulation," which are incorporated herein by reference in their entireties.

TECHNICAL FIELD

This relates generally to electronic devices with touch-sensitive surfaces, including but not limited to electronic devices with touch-sensitive surfaces that display electronic documents.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate electronic documents on a display.

Exemplary manipulations include navigating and editing an electronic document. A user may need to perform such manipulations in any application that includes electronic document viewing and editing capabilities (e.g., a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.)).

But existing methods for navigating and editing documents are cumbersome and inefficient, especially on devices with a small form factor, such as handheld or pocket-sized devices. In addition, existing methods take longer than necessary, thereby wasting energy. This latter consideration is particularly important in battery-operated devices.

SUMMARY

Accordingly, there is a need for electronic devices with faster, more efficient methods and interfaces for navigating and editing an electronic document. Such methods and interfaces may complement or replace conventional methods for navigating and editing an electronic document. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display. The method includes: displaying at least a portion of an electronic document with a predefined page layout at a first magnification level on the display; detecting a first input indicating a first insertion point in the document, where the first insertion point is proximate to a first portion of text in the document; and in response to detecting the first input: selecting a second magnification level different from the first magnification level, where the second magnification level is selected so as to display the first portion of text at a target text display size; and while maintaining the predefined page layout of the document, displaying, at the second magnification level, a portion of the document that includes the first portion of text.

In accordance with some embodiments, an electronic device includes a display, one or more processors, memory, and one or more programs. The one or more programs are stored in the memory and configured to be executed by the one or more processors. The one or more programs include instructions for: displaying at least a portion of an electronic document with a predefined page layout at a first magnification level on the display; detecting a first input indicating a first insertion point in the document, where the first insertion point is proximate to a first portion of text in the document; and in response to detecting the first input: selecting a second magnification level different from the first magnification level, where the second magnification level is selected so as to display the first portion of text at a target text display size; and while maintaining the predefined page layout of the document, displaying, at the second magnification level, a portion of the document that includes the first portion of text.

In accordance with some embodiments, a computer readable storage medium has stored therein instructions which when executed by an electronic device with a display, cause the device to: display at least a portion of an electronic document with a predefined page layout at a first magnification level on the display; detect a first input indicating a first insertion point in the document, where the first insertion point is proximate to a first portion of text in the document; and in response to detecting the first input: select a second magnification level different from the first magnification level, where the second magnification level is selected so as to display the first portion of text at a target text display size; and while maintaining the predefined page layout of the document, display, at the second magnification level, a portion of the document that includes the first portion of text.

In accordance with some embodiments, a graphical user interface on an electronic device with a display, a memory, and one or more processors to execute one or more programs stored in the memory includes at least a portion of an electronic document with a predefined page layout at a first magnification level. A first input indicating a first insertion point in the document is detected, where the first insertion point is proximate to a first portion of text in the document. In response to detection of the first input: a second magnification level different from the first magnification level is selected, where the second magnification level is selected so as to display the first portion of text at a target text display size; and while maintaining the predefined page layout of the document, a portion of the document that includes the first portion of text is displayed at the second magnification level.

In accordance with some embodiments, an electronic device includes: a display; means for displaying at least a portion of an electronic document with a predefined page layout at a first magnification level on the display; means for detecting a first input indicating a first insertion point in the document, where the first insertion point is proximate to a first portion of text in the document; and in response to detecting the first input: means for selecting a second magnification level different from the first magnification level, where the second magnification level is selected so as to display the first portion of text at a target text display size; and means for, while maintaining the predefined page layout of the document, displaying, at the second magnification level, a portion of the document that includes the first portion of text.

In accordance with some embodiments, an information processing apparatus for use in an electronic device with a display includes: means for displaying at least a portion of an electronic document with a predefined page layout at a first magnification level on the display; means for detecting a first input indicating a first insertion point in the document, where the first insertion point is proximate to a first portion of text in the document; and in response to detecting the first input: means for selecting a second magnification level different from the first magnification level, where the second magnification level is selected so as to display the first portion of text at a target text display size; and means for, while maintaining the predefined page layout of the document, displaying, at the second magnification level, a portion of the document that includes the first portion of text.

In accordance with some embodiments, a method is performed at an electronic device with a display. The method includes: displaying at least a portion of an electronic document at a first magnification level on the display; detecting a first input indicating a first insertion point in the document, where the first insertion point is proximate to a first portion of text in the document; in response to detecting the first input: selecting a second magnification level different from the first magnification level, where the second magnification level is selected so as to display the first portion of text at a default target text display size; and displaying a portion of the document at the second magnification level; detecting a second input corresponding to a request to display a portion of the document at a third magnification level different from the second magnification level; in response to detecting the second input: displaying the portion of the document at the third magnification level; and storing a user-adjusted target text display size corresponding to a text display size of the first portion of text at the third magnification level, where the user-adjusted target text display size is different from the default target text display size; and after storing the user-adjusted target text display size: detecting a third input indicating a second insertion point in the document, where the second insertion point is proximate to a second portion of text in the document; and in response to detecting the third input, displaying the document at a respective magnification level such that the second portion of text is displayed at the user-adjusted target text display size.

In accordance with some embodiments, an electronic device includes a display, one or more processors, memory, and one or more programs. The one or more programs are stored in the memory and configured to be executed by the one or more processors. The one or more programs include instructions for: displaying at least a portion of an electronic document at a first magnification level on the display; detecting a first input indicating a first insertion point in the document, where the first insertion point is proximate to a first portion of text in the document; in response to detecting the first input: selecting a second magnification level different from the first magnification level, where the second magnification level is selected so as to display the first portion of text at a default target text display size; and displaying a portion of the document at the second magnification level; detecting a second input corresponding to a request to display a portion of the document at a third magnification level different from the second magnification level; in response to detecting the second input: displaying the portion of the document at the third magnification level; and storing a user-adjusted target text display size corresponding to a text display size of the first portion of text at the third magnification level, where the user-adjusted target text display size is different from the default target text display size; and after storing the user-adjusted target text display size: detecting a third input indicating a second insertion point in the document, where the second insertion point is proximate to a second portion of text in the document; and in response to detecting the third input, displaying the document at a respective magnification level such that the second portion of text is displayed at the user-adjusted target text display size.

In accordance with some embodiments, a computer readable storage medium has stored therein instructions which when executed by an electronic device with a display, cause the device to: display at least a portion of an electronic document at a first magnification level on the display; detect a first input indicating a first insertion point in the document, where the first insertion point is proximate to a first portion of text in the document; in response to detecting the first input: select a second magnification level different from the first magnification level, where the second magnification level is selected so as to display the first portion of text at a default target text display size; and display a portion of the document at the second magnification level; detect a second input corresponding to a request to display a portion of the document at a third magnification level different from the second magnification level; in response to detecting the second input: display the portion of the document at the third magnification level; and store a user-adjusted target text display size corresponding to a text display size of the first portion of text at the third magnification level, where the user-adjusted target text display size is different from the default target text display size; and after storing the user-adjusted target text display size: detect a third input indicating a second insertion point in the document, where the second insertion point is proximate to a second portion of text in the document; and in response to detecting the third input, display the document at a respective magnification level such that the second portion of text is displayed at the user-adjusted target text display size.

In accordance with some embodiments, a graphical user interface on an electronic device with a display, a memory, and one or more processors to execute one or more programs stored in the memory includes at least a portion of an electronic document at a first magnification level. A first input indicating a first insertion point in the document is detected, where the first insertion point is proximate to a first portion of text in the document. In response to detecting the first input: a second magnification level different from the first magnification level is selected, where the second magnification level is selected so as to display the first portion of text at a default target text display size; and a portion of the document is displayed at the second magnification level. A second input corresponding to a request to display a portion of the document at a third magnification level different from the second magnification level is detected. In response to detecting the second input: the portion of the document is displayed at the third magnification level; and a user-adjusted target text display size corresponding to a text display size of the first portion of text at the third magnification level is stored, where the user-adjusted target text display size is different from the default target text display size. After storing the user-adjusted target text display size: a third input indicating a second insertion point in the document is detected, where the second insertion point is proximate to a second portion of text in the document; and in response to detecting the third input, the document is displayed at a respective magnification level such that the second portion of text is displayed at the user-adjusted target text display size.

In accordance with some embodiments, an electronic device includes: a display; means for displaying at least a portion of an electronic document at a first magnification level on the display; means for detecting a first input indicating a first insertion point in the document, where the first insertion point is proximate to a first portion of text in the document; in response to detecting the first input: means for selecting a second magnification level different from the first magnification level, where the second magnification level is selected so as to display the first portion of text at a default target text display size; and means for displaying a portion of the document at the second magnification level; means for detecting a second input corresponding to a request to display a portion of the document at a third magnification level different from the second magnification level; in response to detecting the second input: means for displaying the portion of the document at the third magnification level; and means for storing a user-adjusted target text display size corresponding to a text display size of the first portion of text at the third magnification level, where the user-adjusted target text display size is different from the default target text display size; and after storing the user-adjusted target text display size: means for detecting a third input indicating a second insertion point in the document, where the second insertion point is proximate to a second portion of text in the document; and means for, in response to detecting the third input, displaying the document at a respective magnification level such that the second portion of text is displayed at the user-adjusted target text display size.

In accordance with some embodiments, an information processing apparatus for use in an electronic device with a display includes: means for means for displaying at least a portion of an electronic document at a first magnification level on the display; means for detecting a first input indicating a first insertion point in the document, where the first insertion point is proximate to a first portion of text in the document; in response to detecting the first input: means for selecting a second magnification level different from the first magnification level, where the second magnification level is selected so as to display the first portion of text at a default target text display size; and means for displaying a portion of the document at the second magnification level; means for detecting a second input corresponding to a request to display a portion of the document at a third magnification level different from the second magnification level; in response to detecting the second input: means for displaying the portion of the document at the third magnification level; and means for storing a user-adjusted target text display size corresponding to a text display size of the first portion of text at the third magnification level, where the user-adjusted target text display size is different from the default target text display size; and after storing the user-adjusted target text display size: means for detecting a third input indicating a second insertion point in the document, where the second insertion point is proximate to a second portion of text in the document; and means for, in response to detecting the third input, displaying the document at a respective magnification level such that the second portion of text is displayed at the user-adjusted target text display size.

In accordance with some embodiments, a method is performed at an electronic device with a display. The method includes: displaying at least a portion of an electronic document at a first magnification level on the display; detecting a first input indicating a first insertion point in the document, where the first insertion point is proximate to a first portion of text in the document, the first portion of text having a first font size; in response to detecting the first input: selecting a second magnification level different from the first magnification level, where the second magnification level is selected so as to display the first portion of text at a target text display size; and displaying a portion of the document at the second magnification level; while displaying the portion of the document at the second magnification level, detecting a second input indicating a second insertion point in the document, where the second insertion point is proximate to a second portion of text in the document, the second portion of text having a second font size different from the first font size; and in response to detecting the second input: selecting a third magnification level different from the second magnification level, where the third magnification level is selected so as to display the second portion of text at the target text display size; and displaying a portion of the document at the third magnification level.

In accordance with some embodiments, an electronic device includes a display, one or more processors, memory, and one or more programs. The one or more programs are stored in the memory and configured to be executed by the one or more processors. The one or more programs include instructions for: displaying at least a portion of an electronic document at a first magnification level on the display; detecting a first input indicating a first insertion point in the document, where the first insertion point is proximate to a first portion of text in the document, the first portion of text having a first font size; in response to detecting the first input: selecting a second magnification level different from the first magnification level, where the second magnification level is selected so as to display the first portion of text at a target text display size; and displaying a portion of the document at the second magnification level; while displaying the portion of the document at the second magnification level, detecting a second input indicating a second insertion point in the document, where the second insertion point is proximate to a second portion of text in the document, the second portion of text having a second font size different from the first font size;

and in response to detecting the second input: selecting a third magnification level different from the second magnification level, where the third magnification level is selected so as to display the second portion of text at the target text display size; and displaying a portion of the document at the third magnification level.

In accordance with some embodiments, a computer readable storage medium has stored therein instructions which when executed by an electronic device with a display, cause the device to: display at least a portion of an electronic document at a first magnification level on the display; detect a first input indicating a first insertion point in the document, where the first insertion point is proximate to a first portion of text in the document, the first portion of text having a first font size; in response to detecting the first input: select a second magnification level different from the first magnification level, where the second magnification level is selected so as to display the first portion of text at a target text display size; and display a portion of the document at the second magnification level; while displaying the portion of the document at the second magnification level, detect a second input indicating a second insertion point in the document, where the second insertion point is proximate to a second portion of text in the document, the second portion of text having a second font size different from the first font size; and in response to detecting the second input: select a third magnification level different from the second magnification level, where the third magnification level is selected so as to display the second portion of text at the target text display size; and display a portion of the document at the third magnification level.

In accordance with some embodiments, a graphical user interface on an electronic device with a display, a memory, and one or more processors to execute one or more programs stored in the memory includes at least a portion of an electronic document at a first magnification level. A first input indicating a first insertion point in the document is detected, where the first insertion point is proximate to a first portion of text in the document, the first portion of text having a first font size; in response to detecting the first input: a second magnification level different from the first magnification levels selected, where the second magnification level is selected so as to display the first portion of text at a target text display size; and a portion of the document is displayed at the second magnification level; while displaying the portion of the document at the second magnification level, a second input indicating a second insertion point in the document is detected, where the second insertion point is proximate to a second portion of text in the document, the second portion of text having a second font size different from the first font size; and in response to detecting the second input: a third magnification level different from the second magnification level is selected, where the third magnification level is selected so as to display the second portion of text at the target text display size; and a portion of the document is displayed at the third magnification level.

In accordance with some embodiments, an electronic device includes: a display; means for displaying at least a portion of an electronic document at a first magnification level on the display; means for detecting a first input indicating a first insertion point in the document, where the first insertion point is proximate to a first portion of text in the document, the first portion of text having a first font size; in response to detecting the first input: means for selecting a second magnification level different from the first magnification level, where the second magnification level is selected so as to display the first portion of text at a target text display size; and means for displaying a portion of the document at the second magnification level; means for, while displaying the portion of the document at the second magnification level, detecting a second input indicating a second insertion point in the document, where the second insertion point is proximate to a second portion of text in the document, the second portion of text having a second font size different from the first font size; and in response to detecting the second input: means for selecting a third magnification level different from the second magnification level, where the third magnification level is selected so as to display the second portion of text at the target text display size; and means for displaying a portion of the document at the third magnification level.

In accordance with some embodiments, an information processing apparatus for use in an electronic device with a display includes: means for displaying at least a portion of an electronic document at a first magnification level on the display; means for detecting a first input indicating a first insertion point in the document, where the first insertion point is proximate to a first portion of text in the document, the first portion of text having a first font size; in response to detecting the first input: means for selecting a second magnification level different from the first magnification level, where the second magnification level is selected so as to display the first portion of text at a target text display size; and means for displaying a portion of the document at the second magnification level; means for, while displaying the portion of the document at the second magnification level, detecting a second input indicating a second insertion point in the document, where the second insertion point is proximate to a second portion of text in the document, the second portion of text having a second font size different from the first font size; and in response to detecting the second input: means for selecting a third magnification level different from the second magnification level, where the third magnification level is selected so as to display the second portion of text at the target text display size; and means for displaying a portion of the document at the third magnification level.

In accordance with some embodiments, a method is performed at an electronic device with a display. The method includes: displaying a portion of an electronic document on the display; detecting a content selection input; and in response to detecting the content selection input: identifying a selected portion of the document in accordance with the content selection input; and in accordance with a determination that the selected portion of the document includes content that is outside of a currently displayed portion of the document, adjusting display of the document so that the entire selected portion of the document is displayed on the display.

In accordance with some embodiments, an electronic device includes a display, one or more processors, memory, and one or more programs. The one or more programs are stored in the memory and configured to be executed by the one or more processors. The one or more programs include instructions for: displaying a portion of an electronic document on the display; detecting a content selection input; and in response to detecting the content selection input: identifying a selected portion of the document in accordance with the content selection input; and in accordance with a determination that the selected portion of the document includes content that is outside of a currently displayed portion of the document, adjusting display of the document so that the entire selected portion of the document is displayed on the display.

In accordance with some embodiments, a computer readable storage medium has stored therein instructions which when executed by an electronic device with a display, cause the device to: display a portion of an electronic document on the display; detect a content selection input; and in response to detecting the content selection input: identify a selected portion of the document in accordance with the content selection input; and in accordance with a determination that the selected portion of the document includes content that is outside of a currently displayed portion of the document, adjust display of the document so that the entire selected portion of the document is displayed on the display.

In accordance with some embodiments, a graphical user interface on an electronic device with a display, a memory, and one or more processors to execute one or more programs stored in the memory includes a portion of an electronic document. A content selection input is detected. In response to detecting the content selection input: a selected portion of the document is identified in accordance with the content selection input; and in accordance with a determination that the selected portion of the document includes content that is outside of a currently displayed portion of the document, display of the document is adjusted so that the entire selected portion of the document is displayed on the display.

In accordance with some embodiments, an electronic device includes: a display; means for displaying a portion of an electronic document on the display; means for detecting a content selection input; and in response to detecting the content selection input: means for identifying a selected portion of the document in accordance with the content selection input; and means for, in accordance with a determination that the selected portion of the document includes content that is outside of a currently displayed portion of the document, adjusting display of the document so that the entire selected portion of the document is displayed on the display.

In accordance with some embodiments, an information processing apparatus for use in an electronic device with a display includes: means for displaying a portion of an electronic document on the display; means for detecting a content selection input; and in response to detecting the content selection input: means for identifying a selected portion of the document in accordance with the content selection input; and means for, in accordance with a determination that the selected portion of the document includes content that is outside of a currently displayed portion of the document, adjusting display of the document so that the entire selected portion of the document is displayed on the display.

In accordance with some embodiments, a method is performed at an electronic device with a display. The method includes: displaying at least a portion of an electronic document at a first magnification level on the display; detecting an input indicating a point within an object in the document; and in response to detecting the input: in accordance with a determination that the object includes respective editable text: selecting a second magnification level different from the first magnification level, where the second magnification level is selected so as to display the respective text at a target text display size; and displaying the document at the second magnification level; and in accordance with a determination that the object does not include editable text: selecting a third magnification level different from the second magnification level, where the third magnification level is selected so as to display the object at a target object display size; and displaying the document at the third magnification level.

In accordance with some embodiments, an electronic device includes a display, one or more processors, memory, and one or more programs. The one or more programs are stored in the memory and configured to be executed by the one or more processors. The one or more programs include instructions for: displaying at least a portion of an electronic document at a first magnification level on the display; detecting an input indicating a point within an object in the document; and in response to detecting the input: in accordance with a determination that the object includes respective editable text: selecting a second magnification level different from the first magnification level, where the second magnification level is selected so as to display the respective text at a target text display size; and displaying the document at the second magnification level; and in accordance with a determination that the object does not include editable text: selecting a third magnification level different from the second magnification level, where the third magnification level is selected so as to display the object at a target object display size; and displaying the document at the third magnification level.

In accordance with some embodiments, a computer readable storage medium has stored therein instructions which when executed by an electronic device with a display, cause the device to: display at least a portion of an electronic document at a first magnification level on the display; detect an input indicating a point within an object in the document; and in response to detecting the input: in accordance with a determination that the object includes respective editable text: select a second magnification level different from the first magnification level, where the second magnification level is selected so as to display the respective text at a target text display size; and display the document at the second magnification level; and in accordance with a determination that the object does not include editable text: select a third magnification level different from the second magnification level, where the third magnification level is selected so as to display the object at a target object display size; and display the document at the third magnification level.

In accordance with some embodiments, a graphical user interface on an electronic device with a display, a memory, and one or more processors to execute one or more programs stored in the memory includes at least a portion of an electronic document at a first magnification level. An input indicating a point within an object in the document is detected. In response to detecting the input: in accordance with a determination that the object includes respective editable text: a second magnification level different from the first magnification level is selected, where the second magnification level is selected so as to display the respective text at a target text display size; and the document is displayed at the second magnification level. In accordance with a determination that the object does not include editable text: a third magnification level different from the second magnification level is selected, where the third magnification level is selected so as to display the object at a target object display size; and the document is displayed at the third magnification level.

In accordance with some embodiments, an electronic device includes: a display; means for displaying at least a portion of an electronic document at a first magnification level on the display; means for detecting an input indicating a point within an object in the document; and in response to detecting the input: in accordance with a determination that the object includes respective editable text: means for selecting a second magnification level different from the first magnification level, where the second magnification level is selected so as to display the respective text at a target text display size; and means for displaying the document at the second magnification level; and in accordance with a determination that the object does not include editable text: means for selecting a third magnification level different from the second magnification level, where the third magnification level is selected so as to display the object at a target object display size; and means for displaying the document at the third magnification level.

In accordance with some embodiments, an information processing apparatus for use in an electronic device with a display includes: means for displaying at least a portion of an electronic document at a first magnification level on the display; means for detecting an input indicating a point within an object in the document; and in response to detecting the input: in accordance with a determination that the object includes respective editable text: means for selecting a second magnification level different from the first magnification level, where the second magnification level is selected so as to display the respective text at a target text display size; and means for displaying the document at the second magnification level; and in accordance with a determination that the object does not include editable text: means for selecting a third magnification level different from the second magnification level, where the third magnification level is selected so as to display the object at a target object display size; and means for displaying the document at the third magnification level.

In accordance with some embodiments, a method is performed at an electronic device with a display. The method includes: displaying at least a portion of an electronic document at a user-specified magnification level; while the document is in a document-display mode, receiving a request to enter a document-editing mode distinct from the document-display mode; and in response to receiving the request to enter the document-editing mode: entering the document-editing mode; and displaying the document at a predefined document-editing magnification level different from the user-specified magnification level; while the document is in a document-editing mode, receiving a request to exit the document-editing mode; and in response to receiving the request to exit the document-editing mode: exiting the document-editing mode; and displaying the document at the user-specified magnification level.

In accordance with some embodiments, an electronic device includes a display, one or more processors, memory, and one or more programs. The one or more programs are stored in the memory and configured to be executed by the one or more processors. The one or more programs include instructions for: displaying at least a portion of an electronic document at a user-specified magnification level; while the document is in a document-display mode, receiving a request to enter a document-editing mode distinct from the document-display mode; and in response to receiving the request to enter the document-editing mode: entering the document-editing mode; and displaying the document at a predefined document-editing magnification level different from the user-specified magnification level; while the document is in a document-editing mode, receiving a request to exit the document-editing mode; and in response to receiving the request to exit the document-editing mode: exiting the document-editing mode; and displaying the document at the user-specified magnification level.

In accordance with some embodiments, a computer readable storage medium has stored therein instructions which when executed by an electronic device with a display, cause the device to: display at least a portion of an electronic document at a user-specified magnification level; while the document is in a document-display mode, receive a request to enter a document-editing mode distinct from the document-display mode; and in response to receiving the request to enter the document-editing mode: enter the document-editing mode; and display the document at a predefined document-editing magnification level different from the user-specified magnification level; while the document is in a document-editing mode, receive a request to exit the document-editing mode; and in response to receiving the request to exit the document-editing mode: exit the document-editing mode; and display the document at the user-specified magnification level.

In accordance with some embodiments, a graphical user interface on an electronic device with a display, a memory, and one or more processors to execute one or more programs stored in the memory includes at least a portion of an electronic document at a user-specified magnification level; where: while the document is in a document-display mode, a request to enter a document-editing mode distinct from the document-display mode is received; and in response to receiving the request to enter the document-editing mode: the document-editing mode is entered; and the document is displayed at a predefined document-editing magnification level different from the user-specified magnification level; while the document is in a document-editing mode, a request to exit the document-editing mode is received; and in response to receiving the request to exit the document-editing mode: the document-editing mode is exited; and the document is displayed at the user-specified magnification level.

In accordance with some embodiments, an electronic device includes: a display; means for displaying at least a portion of an electronic document at a user-specified magnification level; means for, while the document is in a document-display mode, receiving a request to enter a document-editing mode distinct from the document-display mode; and in response to receiving the request to enter the document-editing mode: means for entering the document-editing mode; and means for displaying the document at a predefined document-editing magnification level different from the user-specified magnification level; means for, while the document is in a document-editing mode, receiving a request to exit the document-editing mode; and in response to receiving the request to exit the document-editing mode: means for exiting the document-editing mode; and means for displaying the document at the user-specified magnification level.

In accordance with some embodiments, an information processing apparatus for use in an electronic device with a display includes: means for displaying at least a portion of an electronic document at a user-specified magnification level; means for, while the document is in a document-display mode, receiving a request to enter a document-editing mode distinct from the document-display mode; and in response to receiving the request to enter the document-editing mode: means for entering the document-editing mode; and means for displaying the document at a predefined document-editing magnification level different from the user-specified magnification level; means for, while the document is in a document-editing mode, receiving a request to exit the document-editing mode; and in response to receiving the request to exit the document-editing mode: means for exiting the document-editing mode; and means for displaying the document at the user-specified magnification level.

In accordance with some embodiments, an electronic device includes a display unit configured to display at least a portion of an electronic document with a predefined page layout at a first magnification level; and a processing unit coupled to the display unit. The processing unit is configured to: detect a first input indicating a first insertion point in the document, wherein the first insertion point is proximate to a first portion of text in the document; and in response to detecting the first input: select a second magnification level different from the first magnification level, wherein the second magnification level is selected so as to display the first portion of text at a target text display size; and while maintaining the predefined page layout of the document, enable display of, at the second magnification level, a portion of the document that includes the first portion of text.

In accordance with some embodiments, an electronic device includes a display unit configured to display at least a portion of an electronic document at a first magnification level; and a processing unit coupled to the display unit. The processing unit is configured to: detect a first input indicating a first insertion point in the document, wherein the first insertion point is proximate to a first portion of text in the document; in response to detecting the first input: select a second magnification level different from the first magnification level, wherein the second magnification level is selected so as to display the first portion of text at a default target text display size; and enable display of a portion of the document at the second magnification level; detect a second input corresponding to a request to display a portion of the document at a third magnification level different from the second magnification level; in response to detecting the second input: enable display of the portion of the document at the third magnification level; and store a user-adjusted target text display size corresponding to a text display size of the first portion of text at the third magnification level, wherein the user-adjusted target text display size is different from the default target text display size; and after storing the user-adjusted target text display size: detect a third input indicating a second insertion point in the document, wherein the second insertion point is proximate to a second portion of text in the document; and in response to detecting the third input, enable display of the document at a respective magnification level such that the second portion of text is displayed at the user-adjusted target text display size.

In accordance with some embodiments, an electronic device includes a display unit configured to display at least a portion of an electronic document at a first magnification level; and a processing unit coupled to the display unit. The processing unit is configured to: detect a first input indicating a first insertion point in the document, wherein the first insertion point is proximate to a first portion of text in the document, the first portion of text having a first font size; in response to detecting the first input: select a second magnification level different from the first magnification level, wherein the second magnification level is selected so as to display the first portion of text at a target text display size; and enable display of a portion of the document at the second magnification level; while displaying the portion of the document at the second magnification level, detect a second input indicating a second insertion point in the document, wherein the second insertion point is proximate to a second portion of text in the document, the second portion of text having a second font size different from the first font size; and in response to detecting the second input: select a third magnification level different from the second magnification level, wherein the third magnification level is selected so as to display the second portion of text at the target text display size; and enable display of a portion of the document at the third magnification level.

In accordance with some embodiments, an electronic device includes a display unit configured to display a portion of an electronic document; and a processing unit coupled to the display unit. The processing unit is configured to: detect a content selection input; and in response to detecting the content selection input: identify a selected portion of the document in accordance with the content selection input; and in accordance with a determination that the selected portion of the document includes content that is outside of a currently displayed portion of the document, adjust display of the document so that the entire selected portion of the document is displayed on the display unit.

In accordance with some embodiments, an electronic device includes a display unit configured to display at least a portion of an electronic document at a first magnification level; and a processing unit coupled to the display unit. The processing unit is configured to: detect an input indicating a point within an object in the document; and in response to detecting the input: in accordance with a determination that the object includes respective editable text: select a second magnification level different from the first magnification level, wherein the second magnification level is selected so as to display the respective text at a target text display size; and enable display of the document at the second magnification level; and in accordance with a determination that the object does not include editable text: select a third magnification level different from the second magnification level, wherein the third magnification level is selected so as to display the object at a target object display size; and enable display of the document at the third magnification level.

In accordance with some embodiments, an electronic device includes a display unit configured to display at least a portion of an electronic document at a user-specified magnification level; and a processing unit coupled to the display unit. The processing unit is configured to: while the document is in a document-display mode, receive a request to enter a document-editing mode distinct from the document-display mode; and in response to receiving the request to enter the document-editing mode: enter the document-editing mode; and enable display of the document at a predefined document-editing magnification level different from the user-specified magnification level; while the document is in a document-editing mode, receive a request to exit the document-editing mode; and in response to receiving the request to exit the document-editing mode: exit the document-editing mode; and enable display of the document at the user-specified magnification level.

Thus, electronic devices with displays and touch-sensitive surfaces are provided with faster, more efficient methods and interfaces for navigating and editing an electronic document, thereby increasing the effectiveness, efficiency, and user satisfaction with such devices. Such methods and interfaces may complement or replace conventional methods for navigating and editing an electronic document.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Described below are devices and methods that allow a user to efficiently navigate and edit electronic documents. The methods are particularly useful on portable devices with small displays, including handheld or pocket-sized devices (e.g., smart phones). For such portable devices, a user may find himself (or herself) constantly needing to manually readjust the text display size as the user moves through the document, from a very small text display size to get an overview of the document to a larger text display size to clearly see the text being edited. These adjustments require multiple inputs and extensive hand-eye coordination. Such adjustments quickly become annoying and tiresome to users. The methods described herein include:

- Automatically zooming in on a user-specified insertion point when entering a document editing mode and displaying the text at the insertion point at a target text display size for easy viewing and editing;
- Easily modifying the target text display size from a default value to a user-adjusted value;
- Automatically adjusting the display magnification to maintain a target text display size as the insertion point is moved between areas in a document with different font sizes;
- Automatically zooming out at the completion of a text selection gesture to see the entire portion of text that has been selected;
- Automatically zooming to display an object at a size that accommodates the object or, when the object contains editable text, automatically zooming to display the editable text within the object at a size that accommodates the text; and
- Automatically switching back and forth from a user-specified magnification level in a document-display mode to a predefined document-editing magnification level in an editing mode.

These methods greatly reduce the number of steps that a user has to perform to navigate and edit a document, thereby increasing efficiency and ease of use when performing these tasks.

Figure 2:
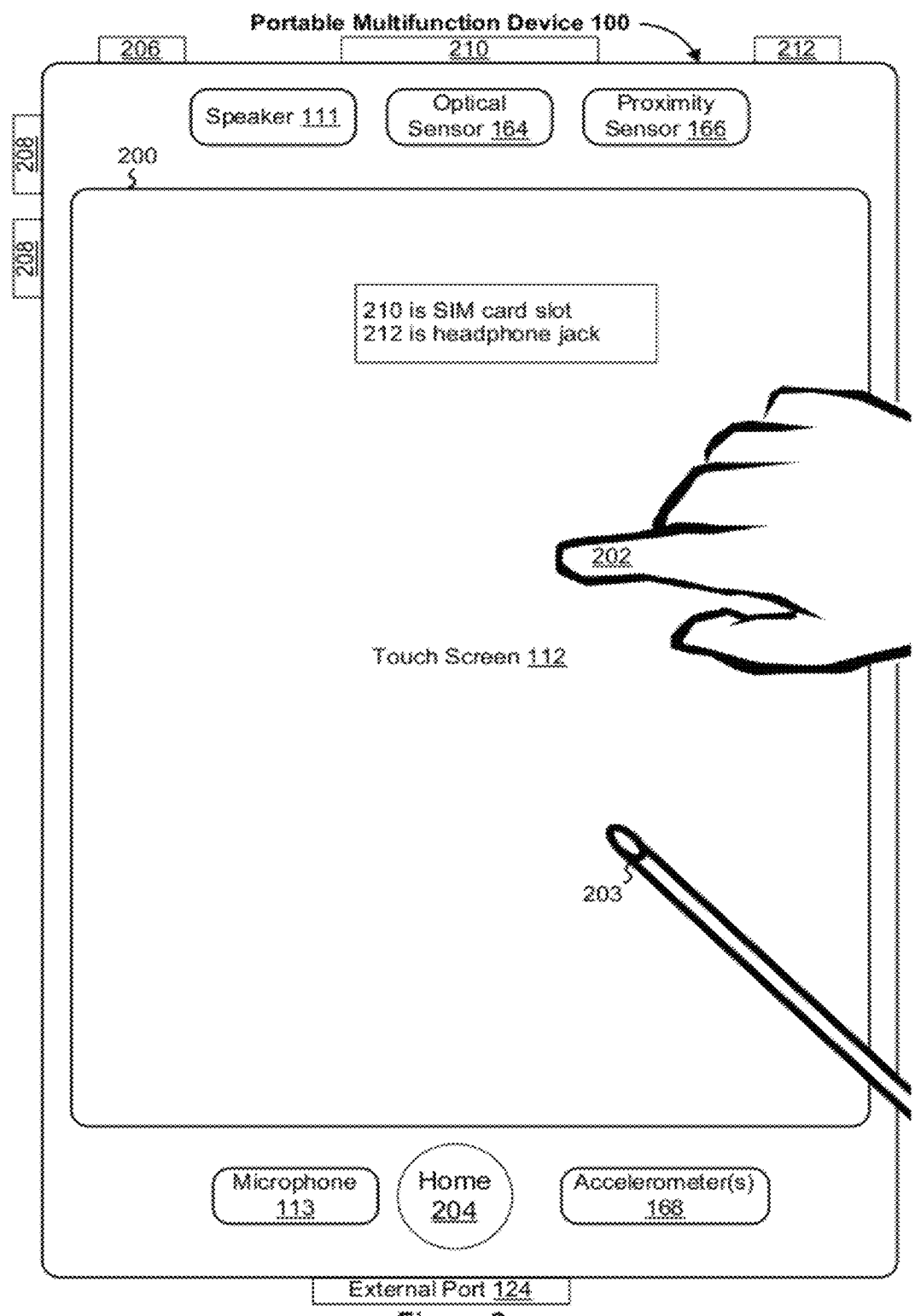
FIG. 2 illustrates a portable multifunction device having a touch screen in accordance with some embodiments.
Figure 3:
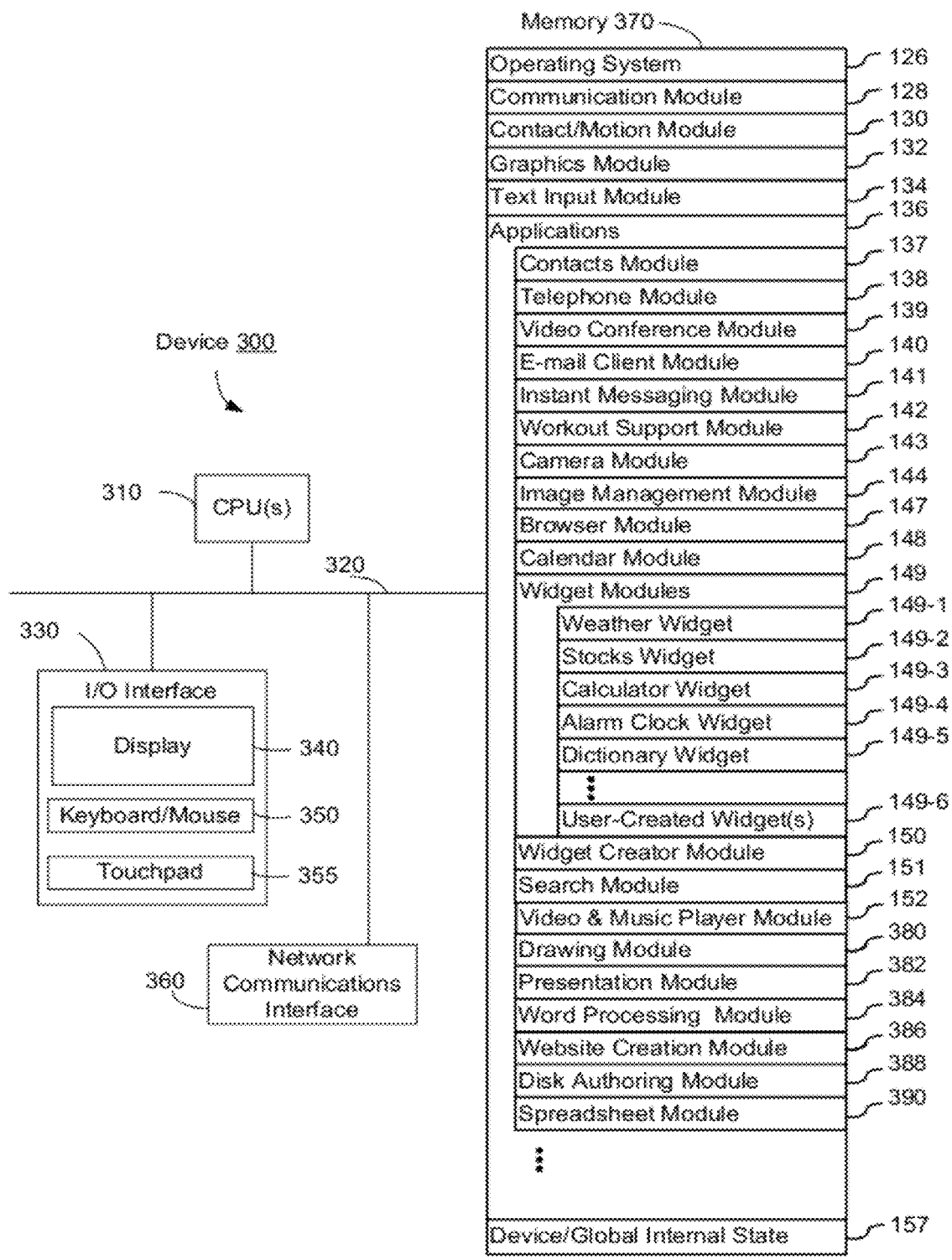
FIG. 3 is a block diagram of an exemplary multifunction device with a display and a touch-sensitive surface in accordance with some embodiments.
Figure 4A:
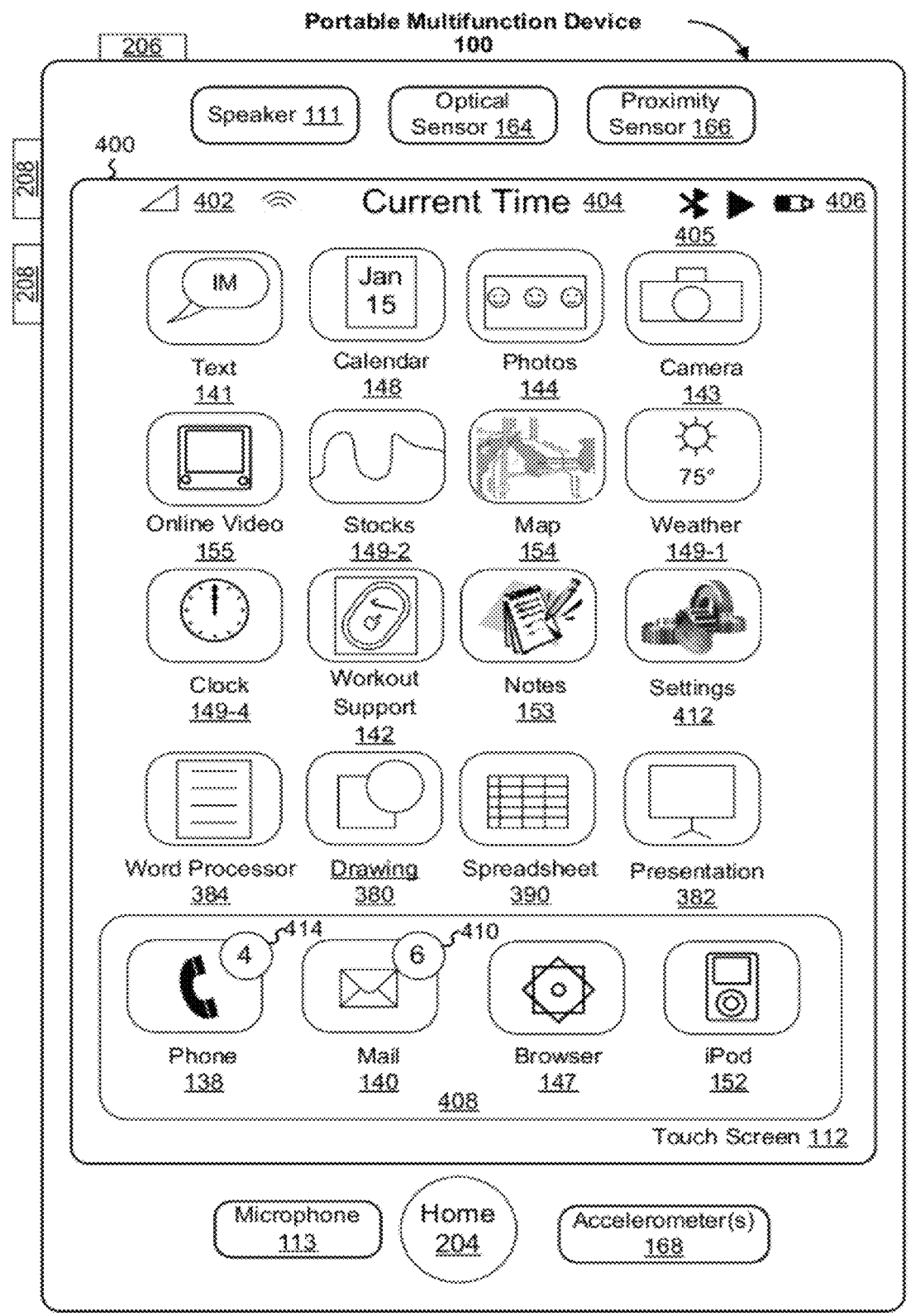
FIG. 4A illustrates an exemplary user interface for a menu of applications on a portable multifunction device in accordance with some embodiments.
Figure 4B:
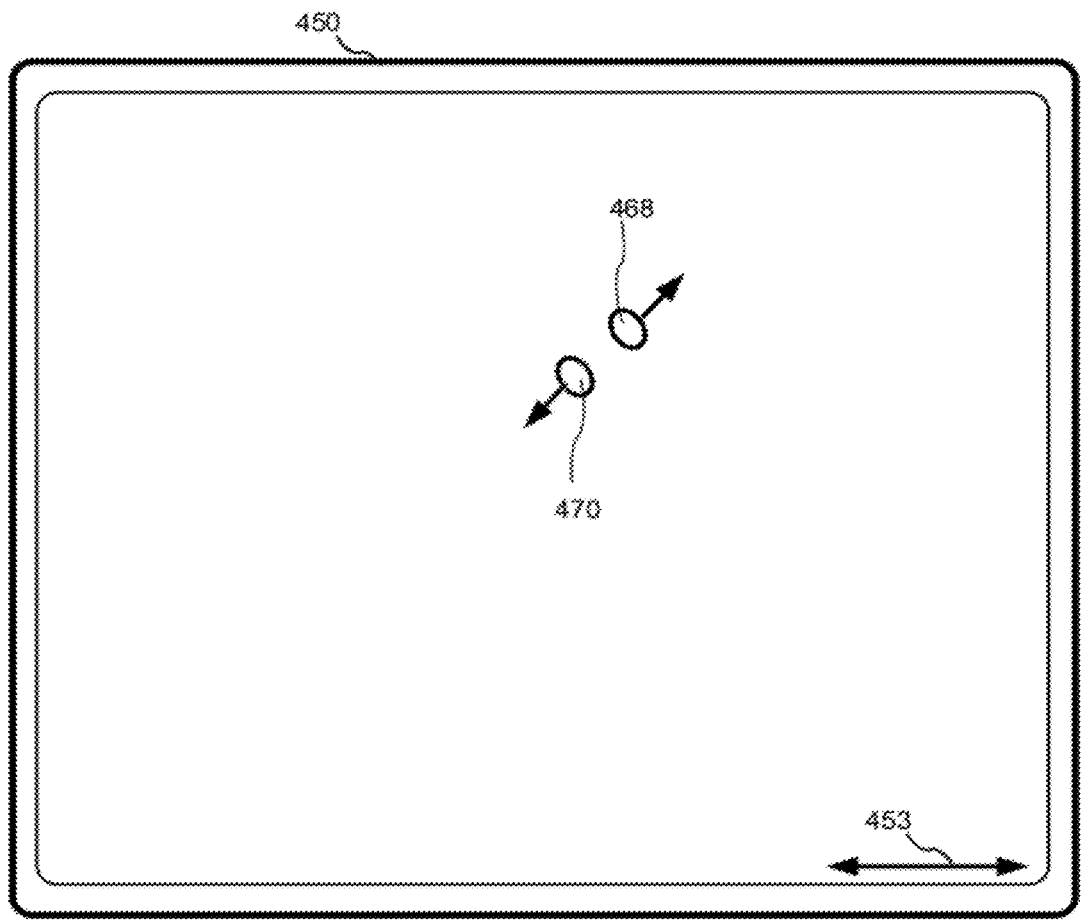
FIG. 4B illustrates an exemplary user interface for a multifunction device with a touch-sensitive surface that is separate from the display in accordance with some embodiments.
Figure 4B:
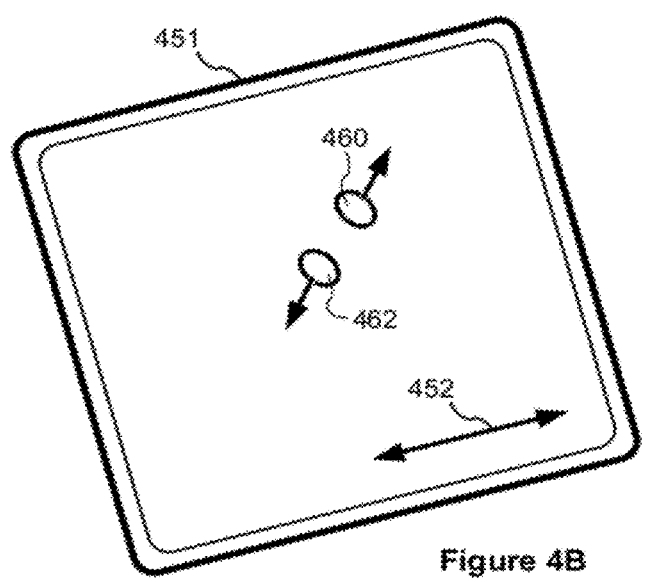
Figure 5A:
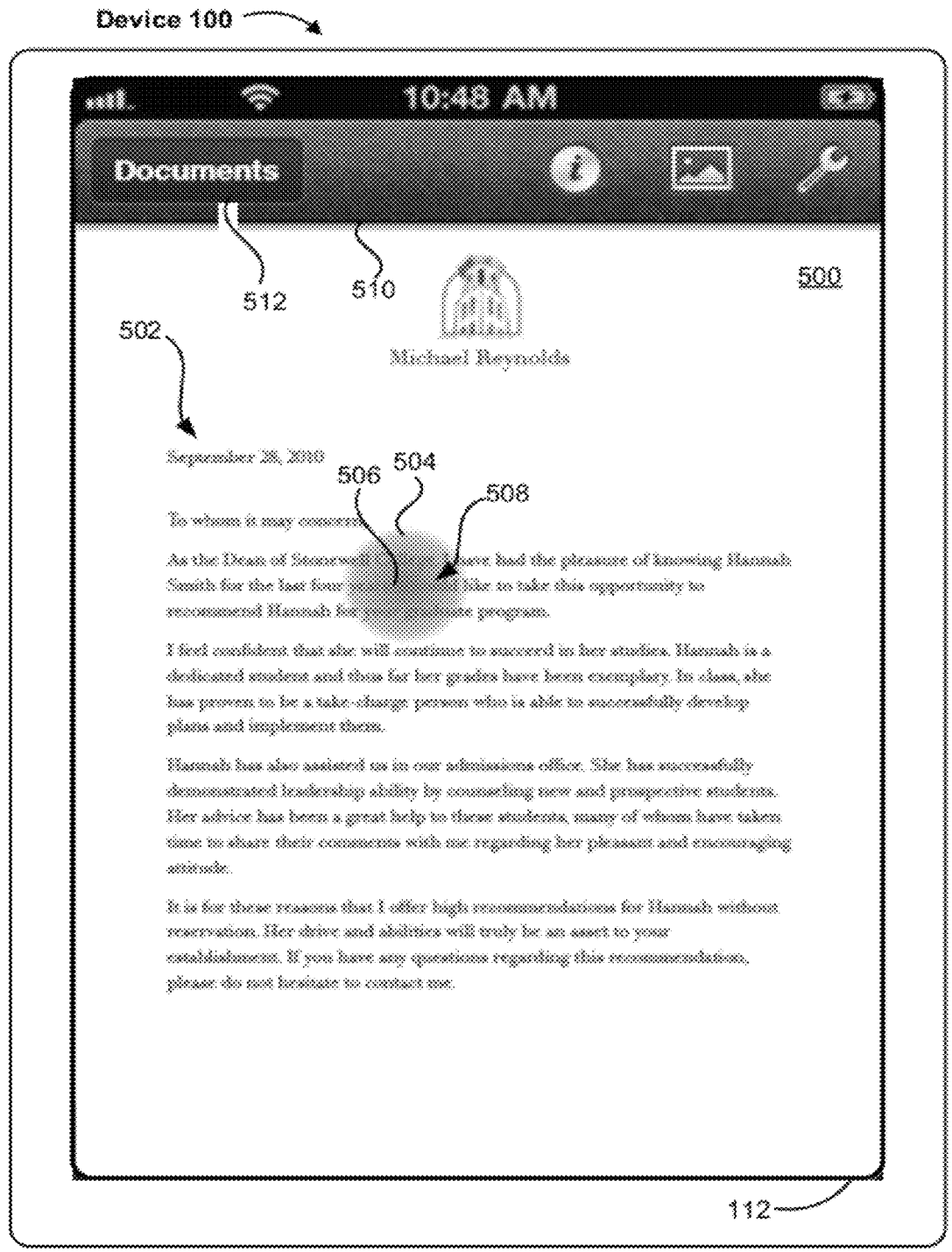
FIGS. 5A-5AA illustrate exemplary user interfaces for navigating and editing an electronic document in accordance with some embodiments.

Below, FIGS. 1A-1B, 2, 3, and 12-17 provide a description of exemplary devices. FIGS. 4A-4B and 5A-5AA illustrate exemplary user interfaces for navigating and editing an electronic document. FIGS. 6A-6E, 7A-7B, 8A-8B, 9A-9B, 10, 11A-11b are flow diagrams illustrating methods of navigating and editing an electronic document. The user interfaces in FIGS. 5A-5AA are used to illustrate the processes in FIGS. 6A-6E, 7A-7B, 8A-8B, 9A-9B, 10, 11A-11B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
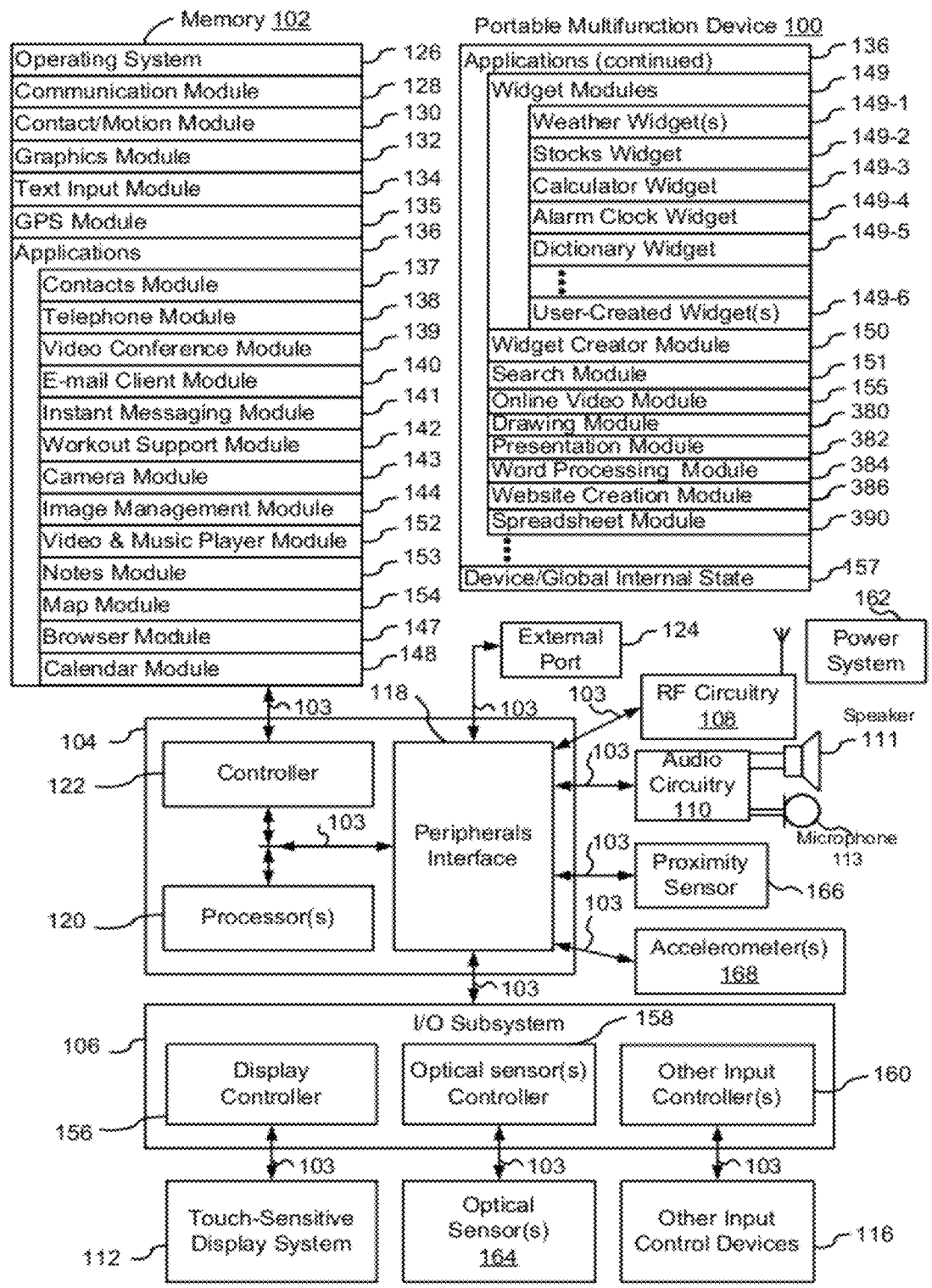
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits. Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications (e.g., word processing module 384), other image editing applications, drawing applications (e.g., drawing module 380), presentation applications (presentation module 382), spreadsheet applications (e.g., spreadsheet module 390), website creation applications (e.g., website creation module 386), JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
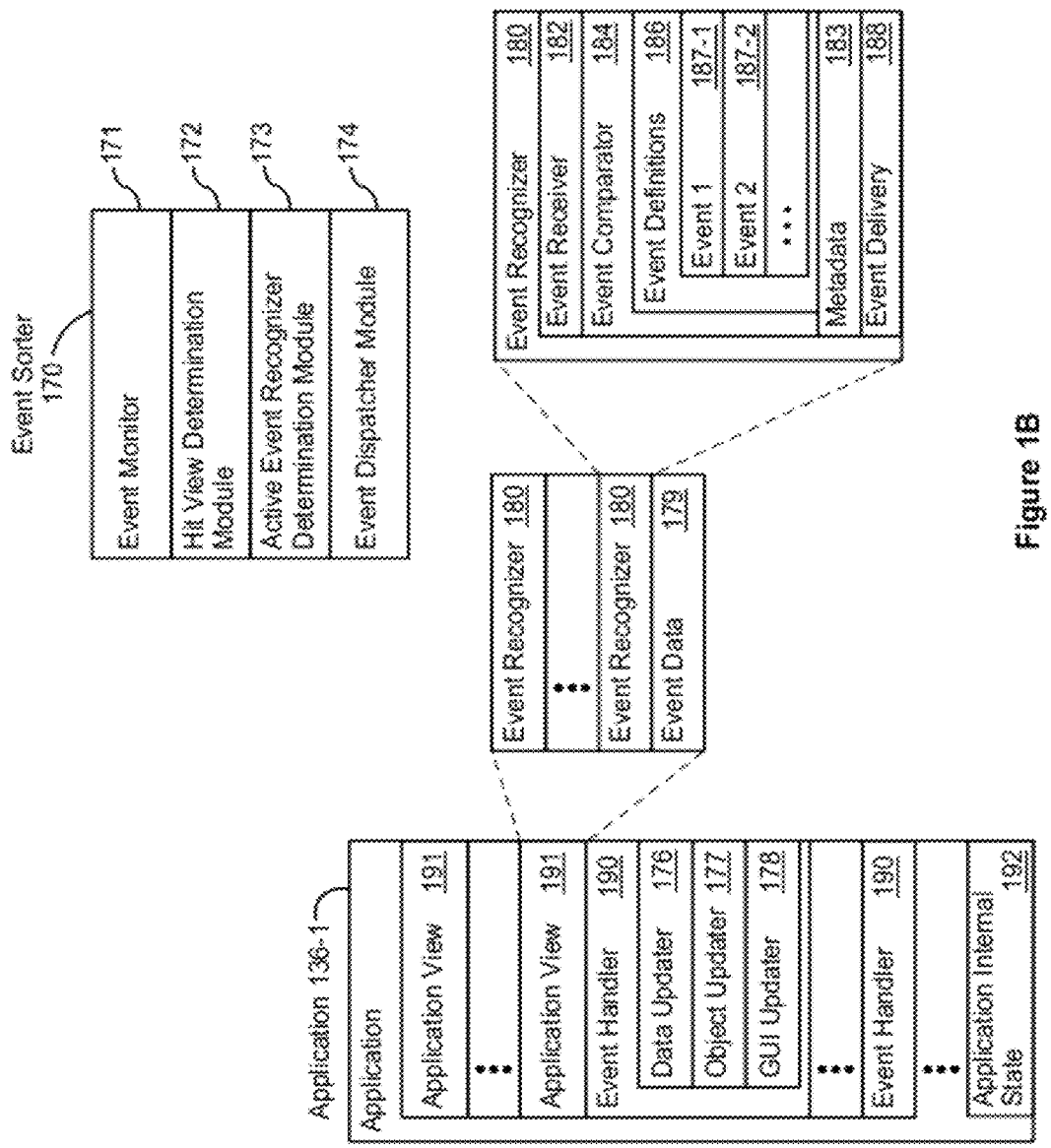
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may or may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136;
  Online video module 155, also referred to as YouTube (trademark of Google Inc.) module 155;
  Word processor 384;
  Drawing 380;
  Spreadsheet 390; and
  Presentation 382.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIG. 5A illustrates document 500 displayed on touch screen 112 of device 100. Document 500 may be displayed in the user interface of an application (e.g., a word processing application, a presentation application, a spreadsheet application, etc.). The application user interface in which document 500 is displayed may include toolbar 510 and "documents" button 512 for navigating to, if any, other documents. In some embodiments, document 500 is displayed in a document viewing or navigating mode.

Document 500 includes content, such as text 502, images, objects, tables, charts, and so on. Text 502 has a respective font size. In some embodiments, text 502 includes multiple portions with respective, different font sizes. Document 500 has a predefined page layout; the content in document 500 is laid out in a predefined way and the layout is not affected by changes in the magnification level at which document 500 is displayed on touch screen 112.

Document 500 is displayed at a first magnification level. For example, as shown in FIG. 5A, the first magnification level may be one that corresponds to fitting a whole page of document 500 on display 112. Document 500 may also be displayed at a larger or smaller magnification (e.g., in response to user input). Text 502, for the same font size, has a text display size on screen that varies with the magnification level. Thus, text 502 has a first display size at the "fit whole page" magnification level. The text display size is the size of the text as it appears on the display of a device (e.g., touch screen 112 of device 100), as opposed to the font size, which is the size of the text as it would appear if printed out on physical media (e.g., paper).

In some embodiments, the magnification level is expressed as a percentage (e.g., 100%, 200%, 50%, etc.). The fit whole page magnification level described above corresponds to a magnification level percentage that achieves the fitting of a whole page onto display 112.

Gesture 504 is detected at a location on touch screen 112 corresponding to a location on document 500. In some embodiments, gesture 504 is a single tap gesture. The location of gesture 504 indicates insertion point 506 in text 502. Insertion point 506 is proximate to text portion 508 of text 502.

Figure 5B:
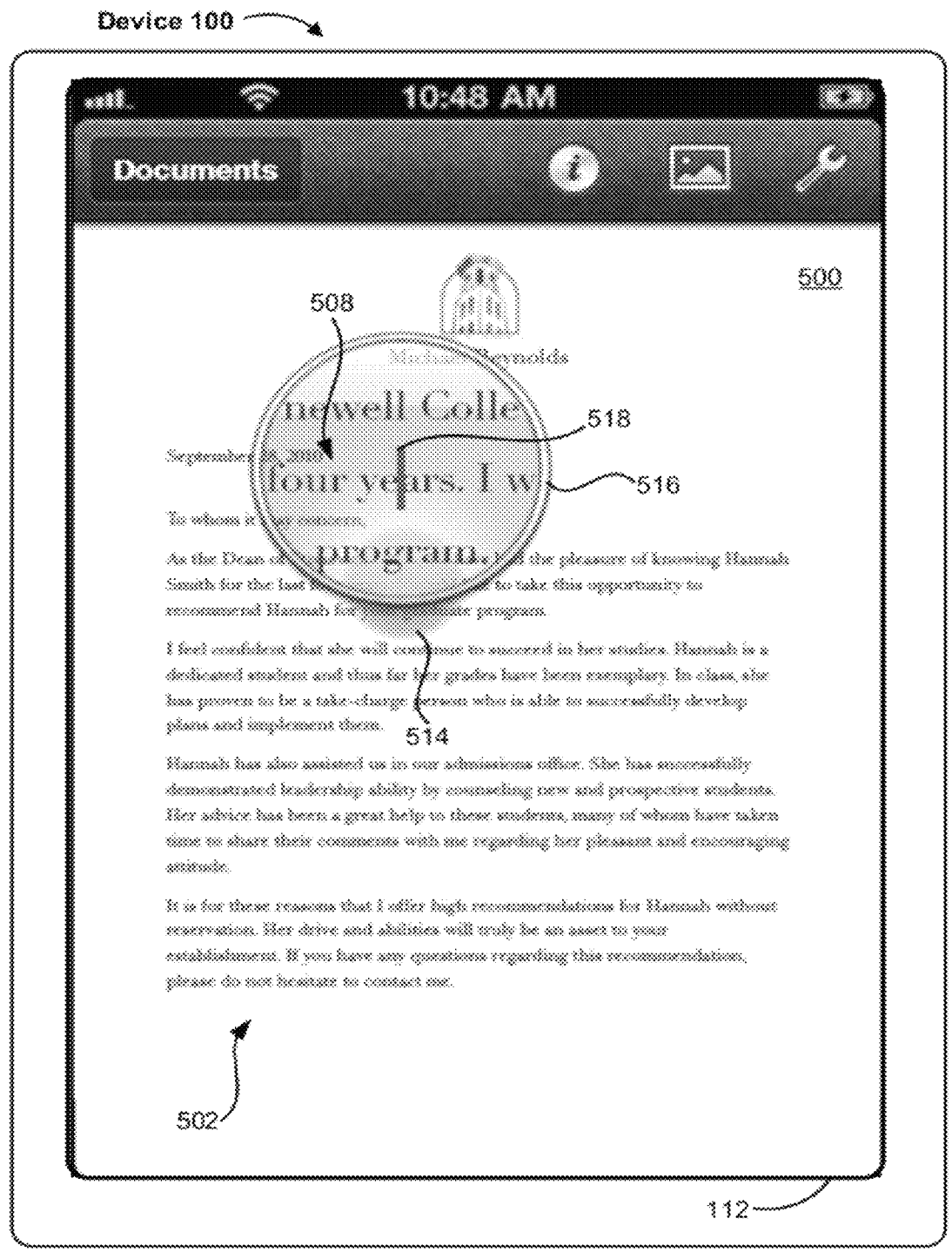

FIG. 5B shows, alternatively, gesture 514 detected at a location on touch screen 112 corresponding to a location on document 500. In some embodiments, gesture 514 includes a tap and hold of a finger contact (i.e., finger makes contact on touch screen 112 and maintains contact with touch screen 112, followed by a later liftoff of the contact). In response to the detection of gesture 514, loupe 516 is displayed, showing a magnified view of text portion 508 and insertion point marker 518 indicating an insertion point at a location in text 502 that corresponds to the location of gesture 514. While gesture 514 is active (i.e., contact with touch screen 112 is maintained), insertion point marker 518 may be moved across document 500 (e.g., by moving the finger across touch screen 112) and loupe 516 follows the movement of insertion point marker to show a magnified view of the text in proximity to insertion point marker 518.

Figure 5C:
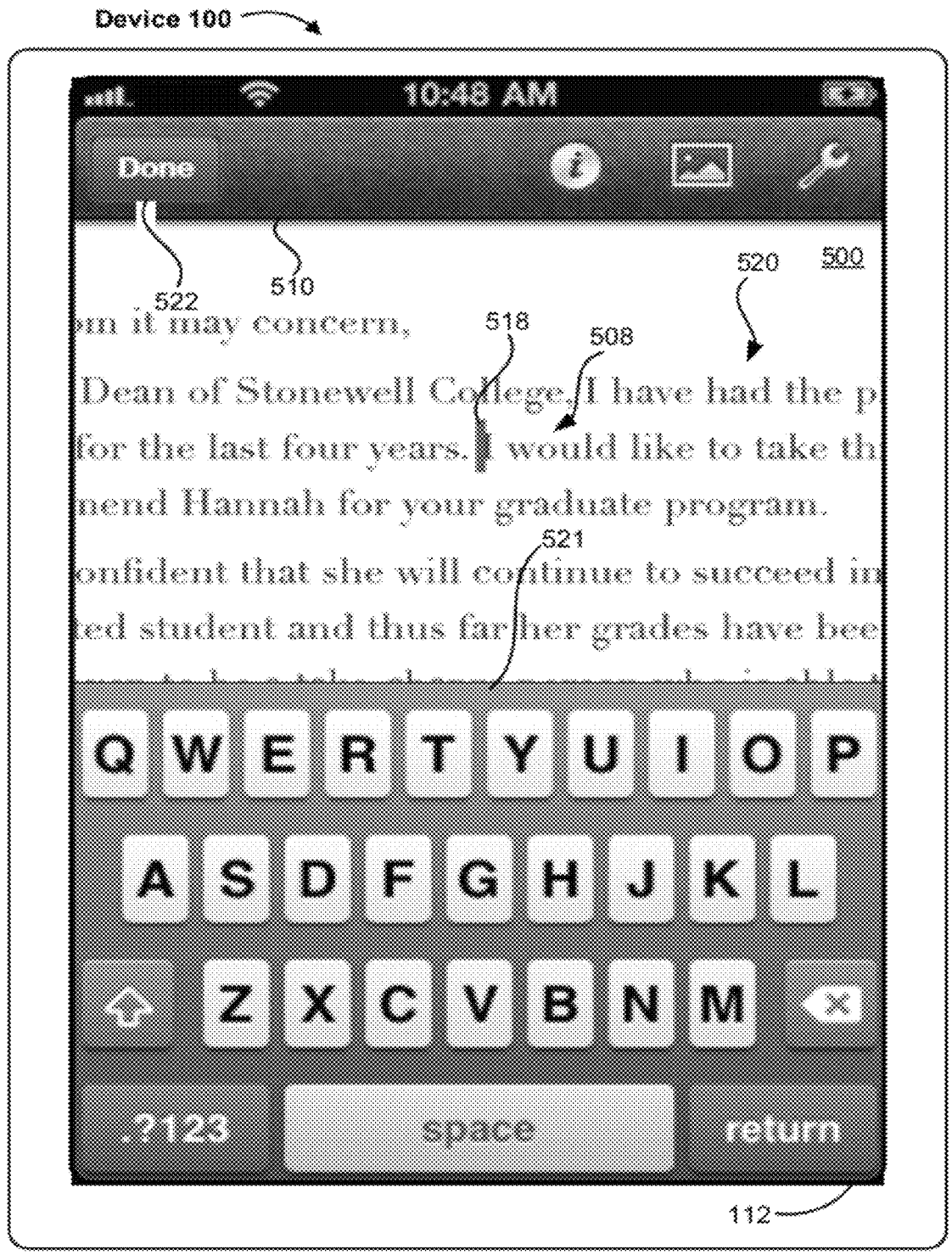

In response to the detection of gesture 504 or 514 and the completion of the respective gesture (e.g., when the finger contact of gesture 504 or 514 is lifted up from touch screen 112), portion 520 of document 500 is displayed in document editing mode, as shown in FIG. 5C. While in document editing mode, document 500 (including portion 520) is displayed at a second magnification level that is different from the first magnification level. Document portion 520 includes text portion 508. In some embodiments, the second magnification level is a magnification level at which text portion 508 is displayed on touch screen 112 at a text display size that is comfortable for reading. For example, if text portion 508 has a font size whose text display size at 100% magnification is not comfortable for reading on touch screen 112, text portion 508 may be displayed, when in document editing mode, at 200% magnification.

Insertion point marker 518 is displayed at the insertion point (e.g., insertion point 506), and text portion 508 is proximate (e.g., adjacent) to insertion point marker 518. In some embodiments, insertion point marker 518 is a text cursor.

Document portion 520 is displayed such that the predefined layout of document 500 is maintained; text 502, including text portion 508 is not re-flowed, re-wrapped, or the like. While in document editing mode, document 500 is scrollable (e.g., in response to swipe or flick gestures on touch screen 112).

Figure 5D:
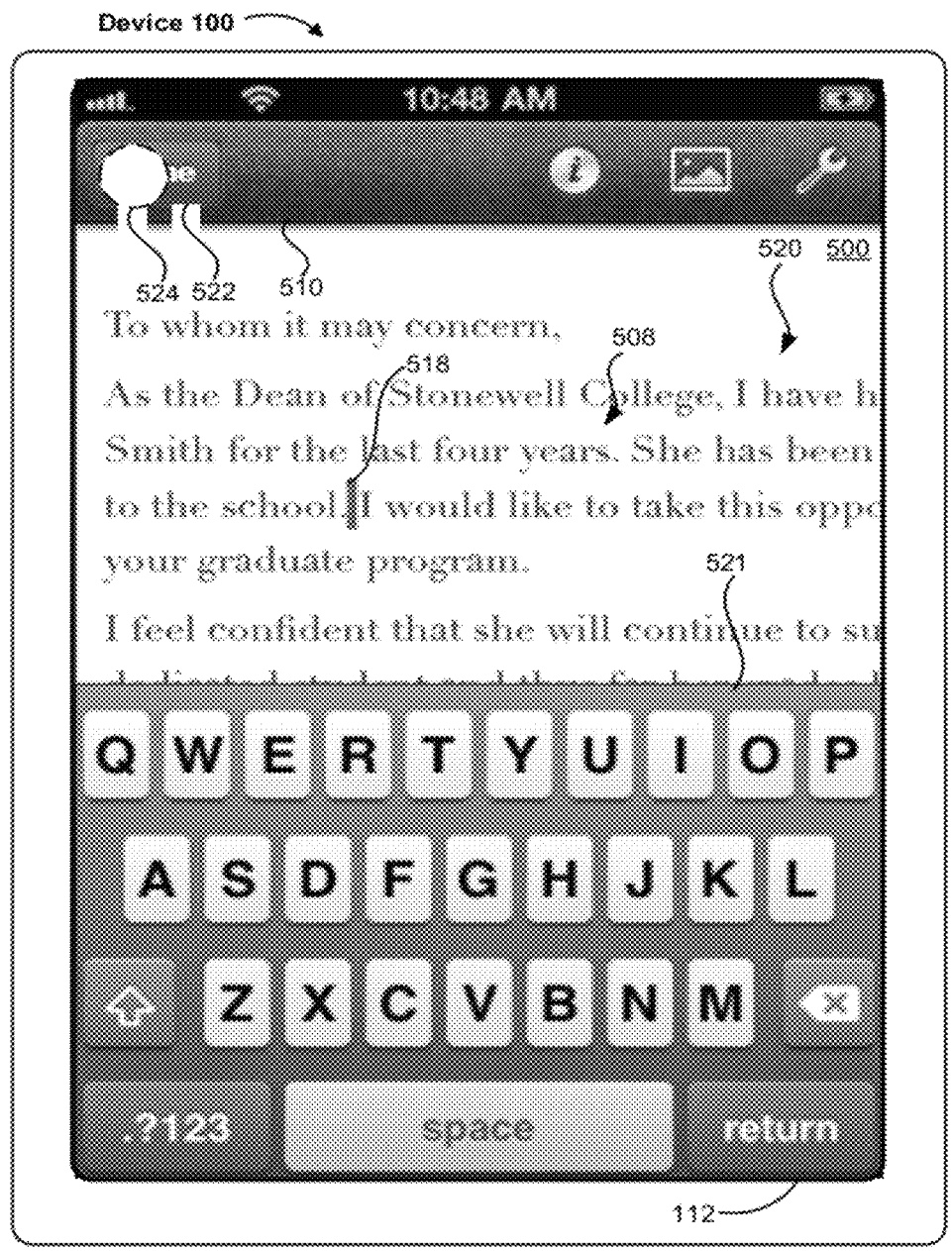

While document portion 520 is displayed in document editing mode, keyboard 521 is also displayed, and "documents" button in toolbar 510 is replaced by "done" button 522. A user may enter text into document 500 by typing on keyboard 521, and confirm completion of editing of document 500 by performing a gesture (e.g., a tap gesture) on "done" button 522. When "done" button 522 is activated by performance of a gesture on "done" button 522, the document editing mode ends and a document viewing mode resumes. For example, FIG. 5D shows gesture 524 detected on touch screen 112 at a location corresponding on "done" button 522 (gesture 524 may be said to be detected on "done" button 522).

Figure 5E:
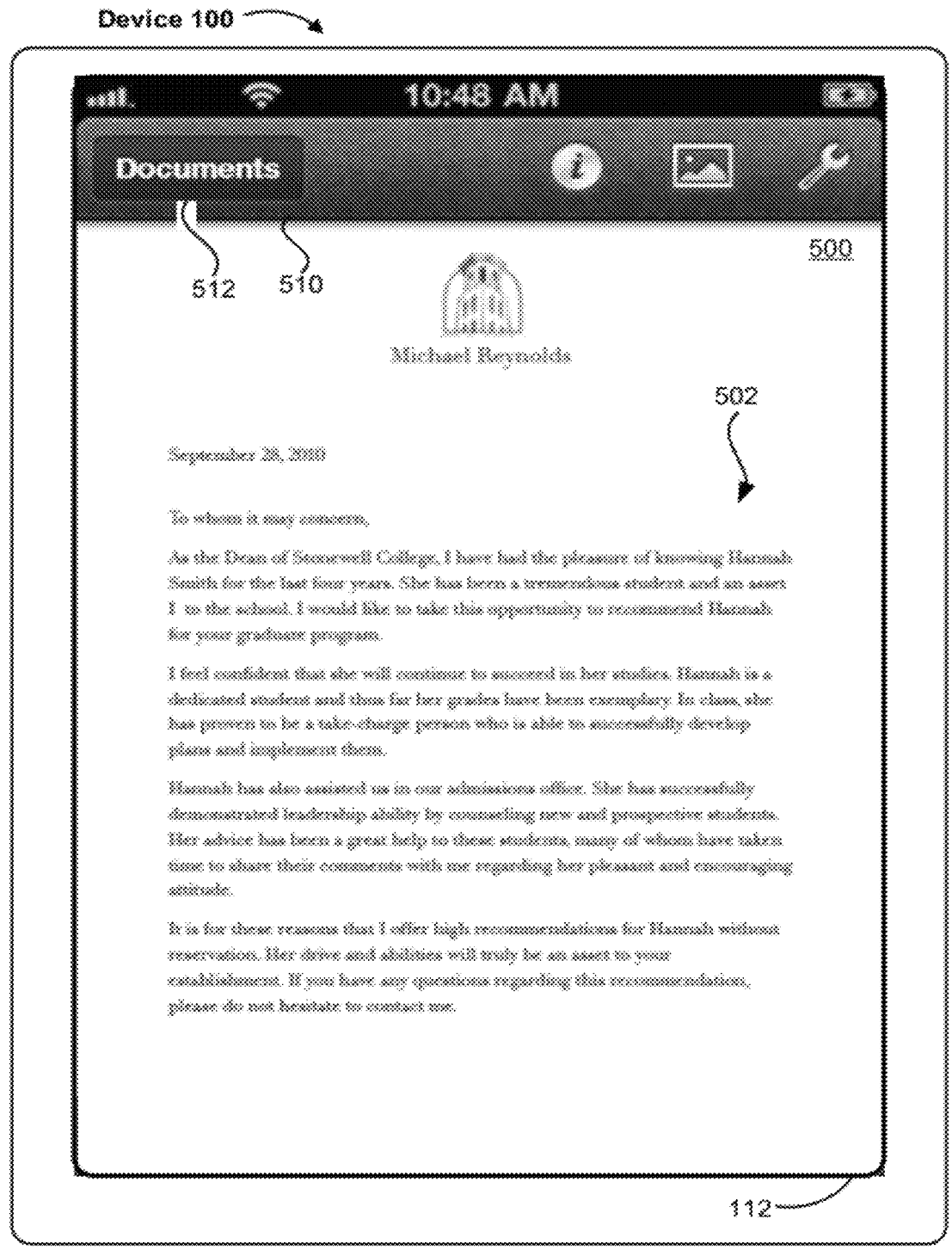

In response to the detection of gesture 524, document 500, including the revisions entered and confirmed in document editing mode, is displayed at the fit whole page magnification level and in a document viewing mode, as shown in FIG. 5E. "Done" button 522 is replaced by "documents" button 512 in toolbar 510.

Figure 5F:
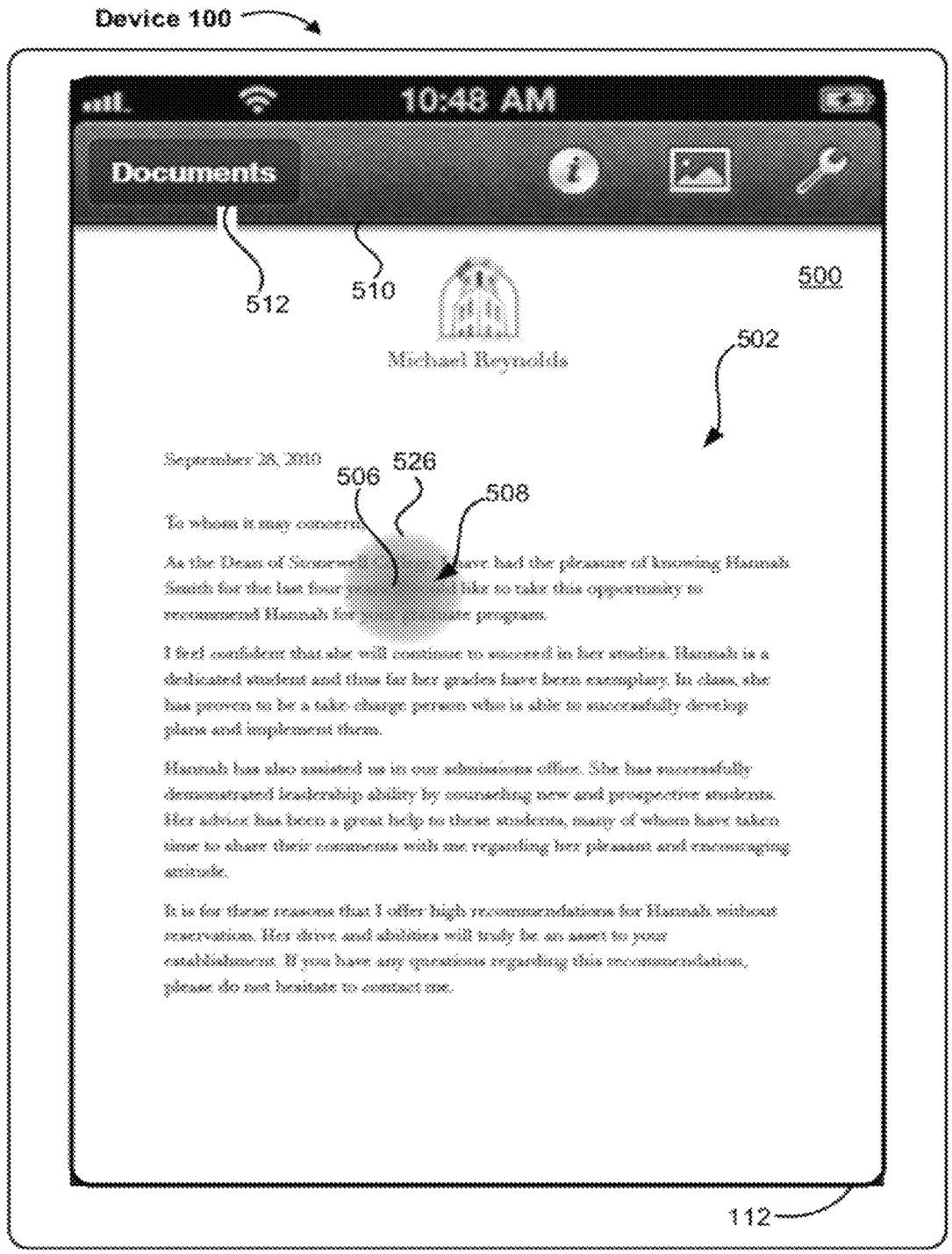

FIG. 5F shows document 500, with text 502, displayed in document viewing mode, along with toolbar 510 and "documents" button 512. Document 500 is displayed at fit whole page magnification; text 502 is displayed at a text display size corresponding to the fit whole page magnification level.

Gesture 526 is detected at a location on touch screen 112 corresponding to a location on document 500. In some embodiments, gesture 526 is a single tap gesture. The location of gesture 526 indicates insertion point 506 in text 502. Insertion point 506 is proximate to text portion 508 of text 502.

Figure 5G:
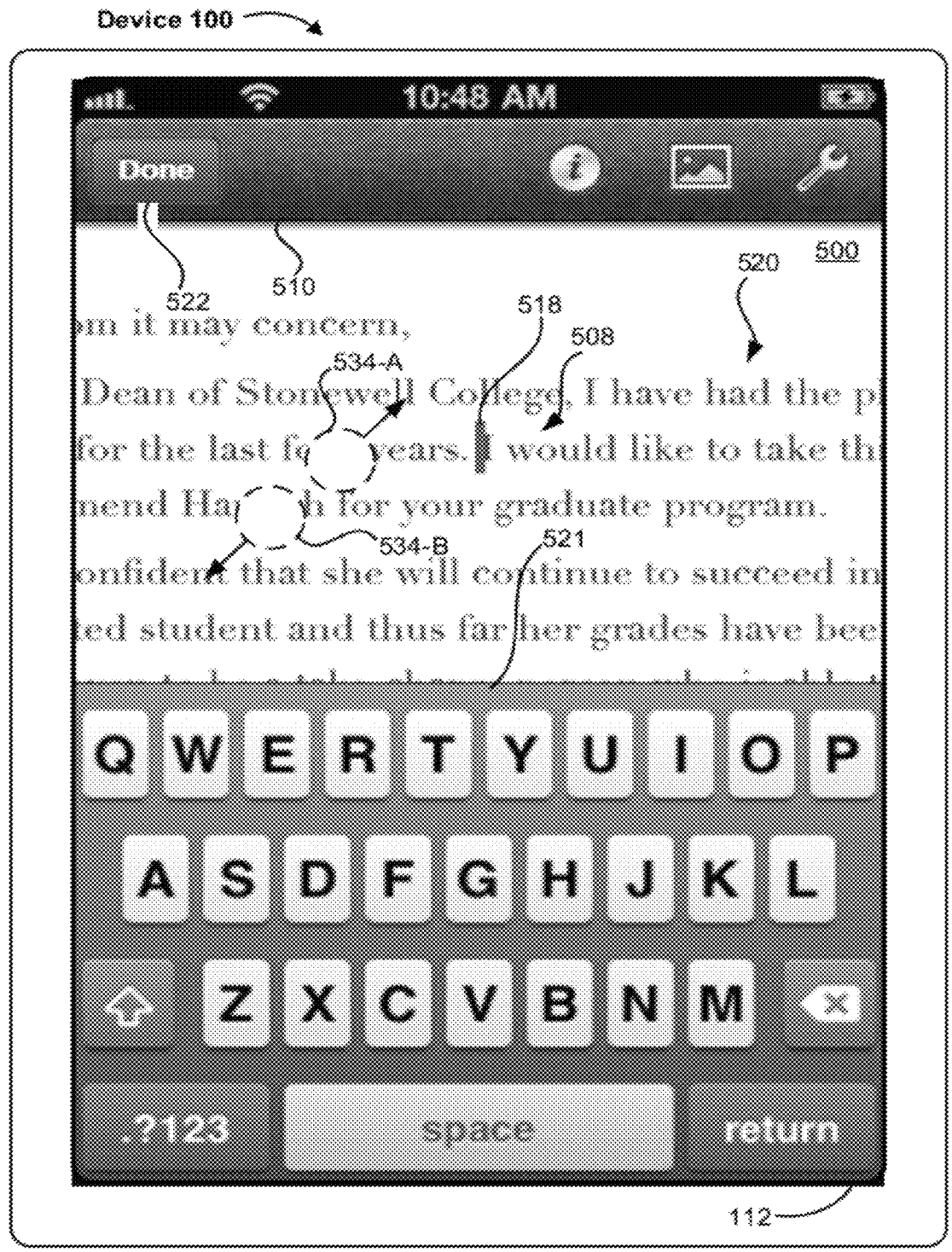

In response to the detection of gesture 526, document portion 520 of document 500 is displayed in document editing mode, as shown in FIG. 5G. Document portion 520 includes text portion 508. Document portion 520 is displayed at a magnification level such that text portion 508 is displayed at a default target text display size. Keyboard 521 is also displayed, and "documents" button 512 is replaced by "done" button 522. Insertion point marker 518 is displayed to mark insertion point 506.

Figure 5H:
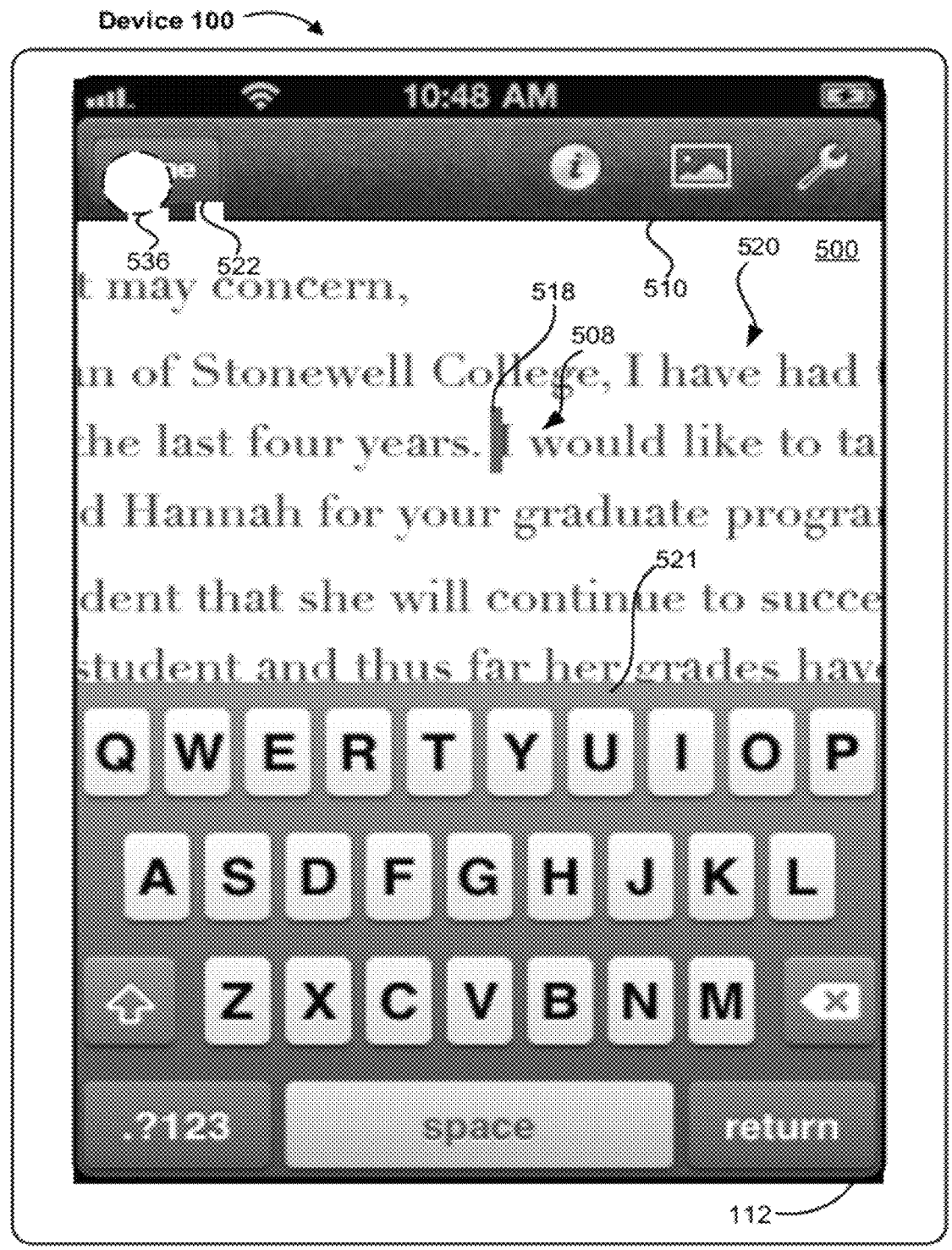

Gesture 534 is detected on touch screen 112. Gesture 534 is a gesture to adjust the magnification level at which document portion 520 is displayed. In some embodiments, gesture 534 is a depinch gesture, with contacts 534-A and 534-B moving apart. In response to the detection of gesture 534, document portion 520 is displayed, while remaining in document editing mode, at a user-adjusted magnification level, as shown in FIG. 5H, which in this case is larger than the magnification level as shown in FIG. 5G. Accordingly, text portion 520 is displayed at a user-adjusted text display size, which in this case is larger than the default target text display size as shown in FIG. 5G. The user-adjusted text display size is stored by device 100.

Figure 5I:
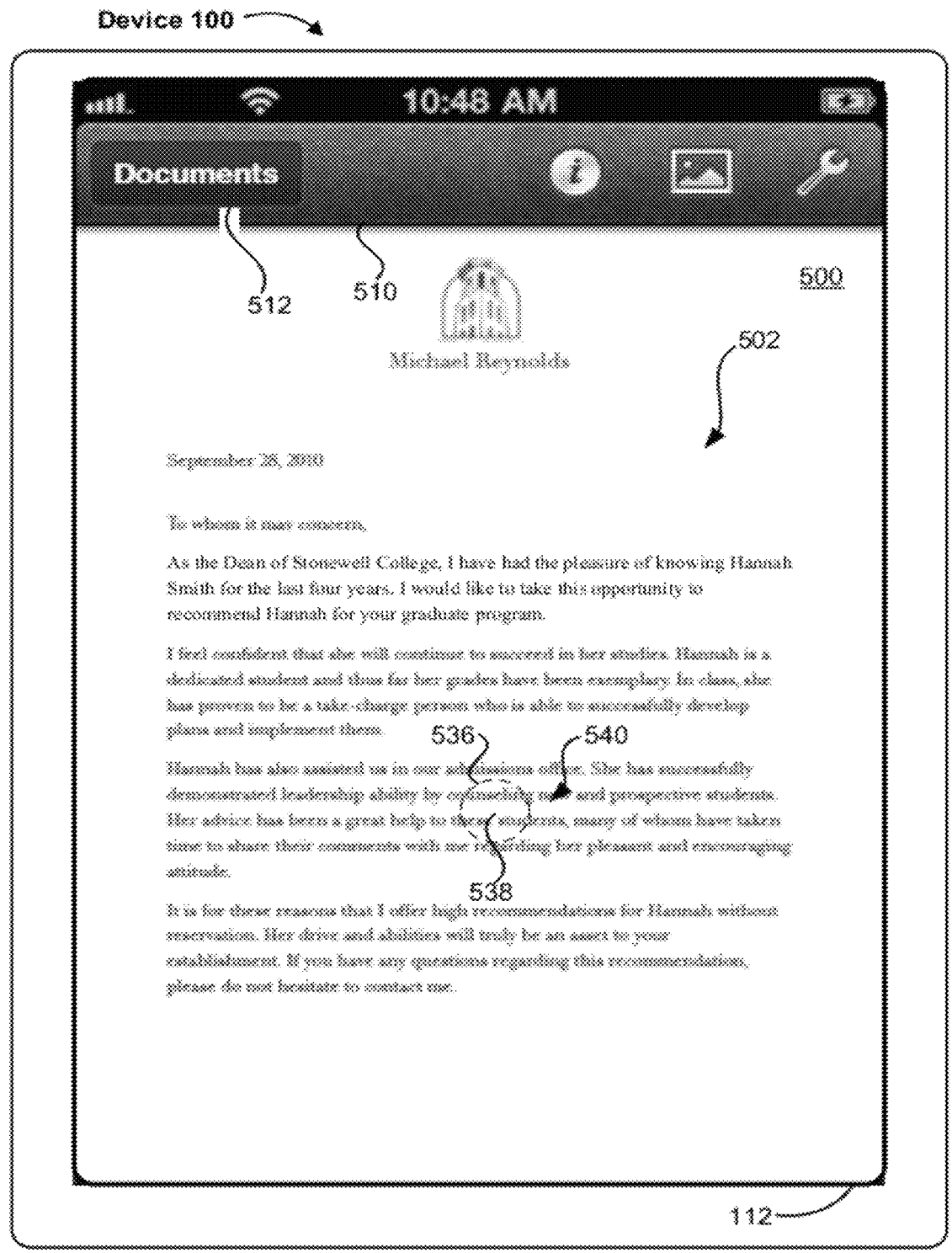

While text portion 508 is displayed at the user-adjusted text display size, gesture 536 is detected on "done" button 522, as shown in FIG. 5H. In response to the detection of gesture 536 on "done" button 522, document 500, including the revisions entered and confirmed in document editing mode, is displayed at the fit whole page magnification level and in a document viewing mode, as shown in FIG. 5I. "Done" button 522 is replaced by "documents" button 512 in toolbar 510.

In FIG. 5I, while document 500 is displayed in document viewing mode and at the fit whole page magnification level, gesture 536 is detected at a location on touch screen 112 corresponding to a location on document 500. In some embodiments, gesture 536 is a single tap gesture. The location of gesture 536 indicates insertion point 538 in text 502. Insertion point 538 is proximate to text portion 540 of text 502.

Figure 5J:
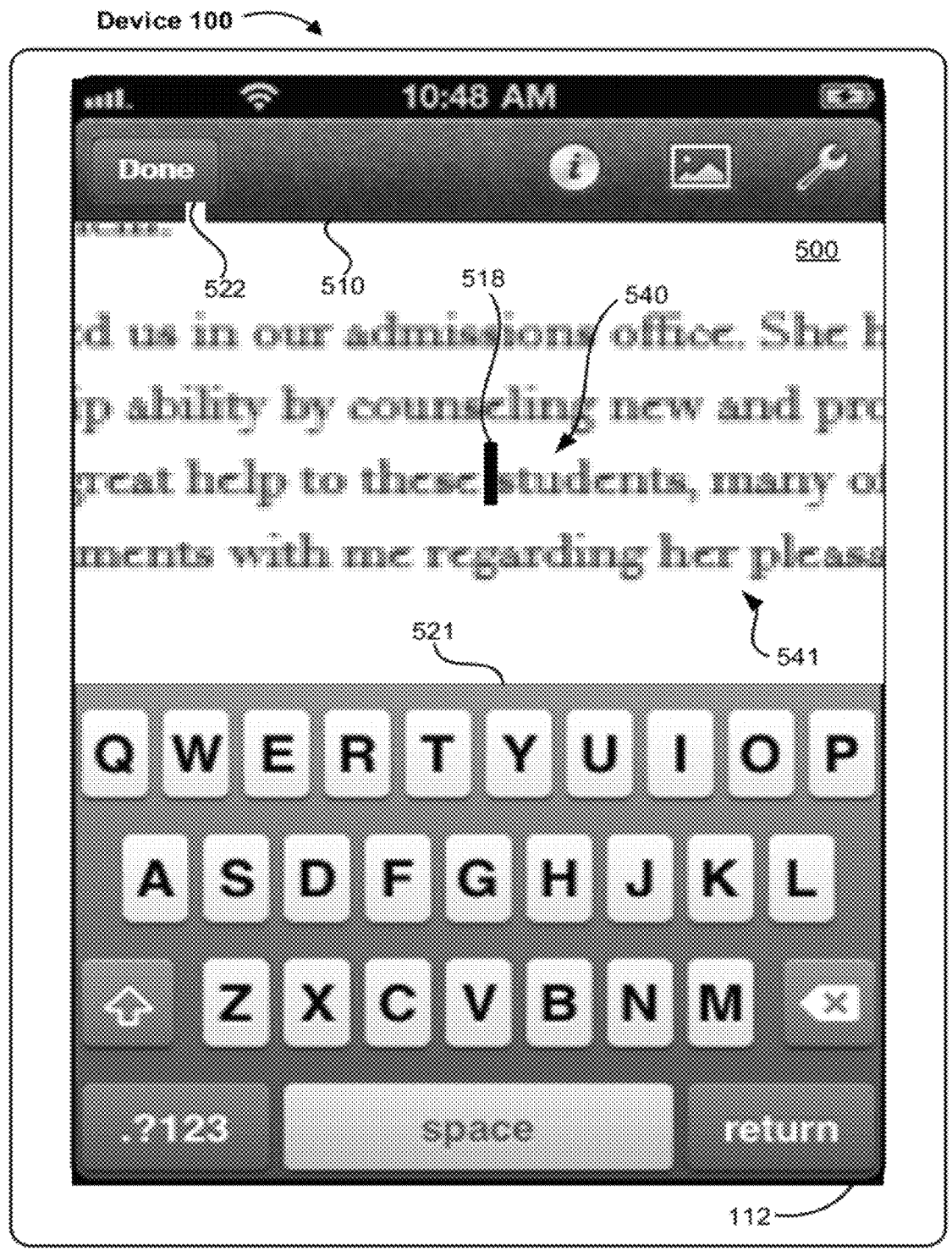

In response to the detection of gesture 536, document portion 541 of document 500, which includes text portion 540, is displayed in document editing mode, as shown in FIG. 5J. Document portion 541 is displayed at a magnification level such that text portion 540 is displayed at the user-adjusted text display size that was stored previously. Insertion point marker 518 is displayed to mark insertion point 538. Despite document portion 541 being a different portion of document 500 than document portion 520 (and text portion 540 being different from text portion 508), document portion 541 is displayed at a magnification level such that text portion 540 is displayed at the user-adjusted text display size.

Figure 5K:
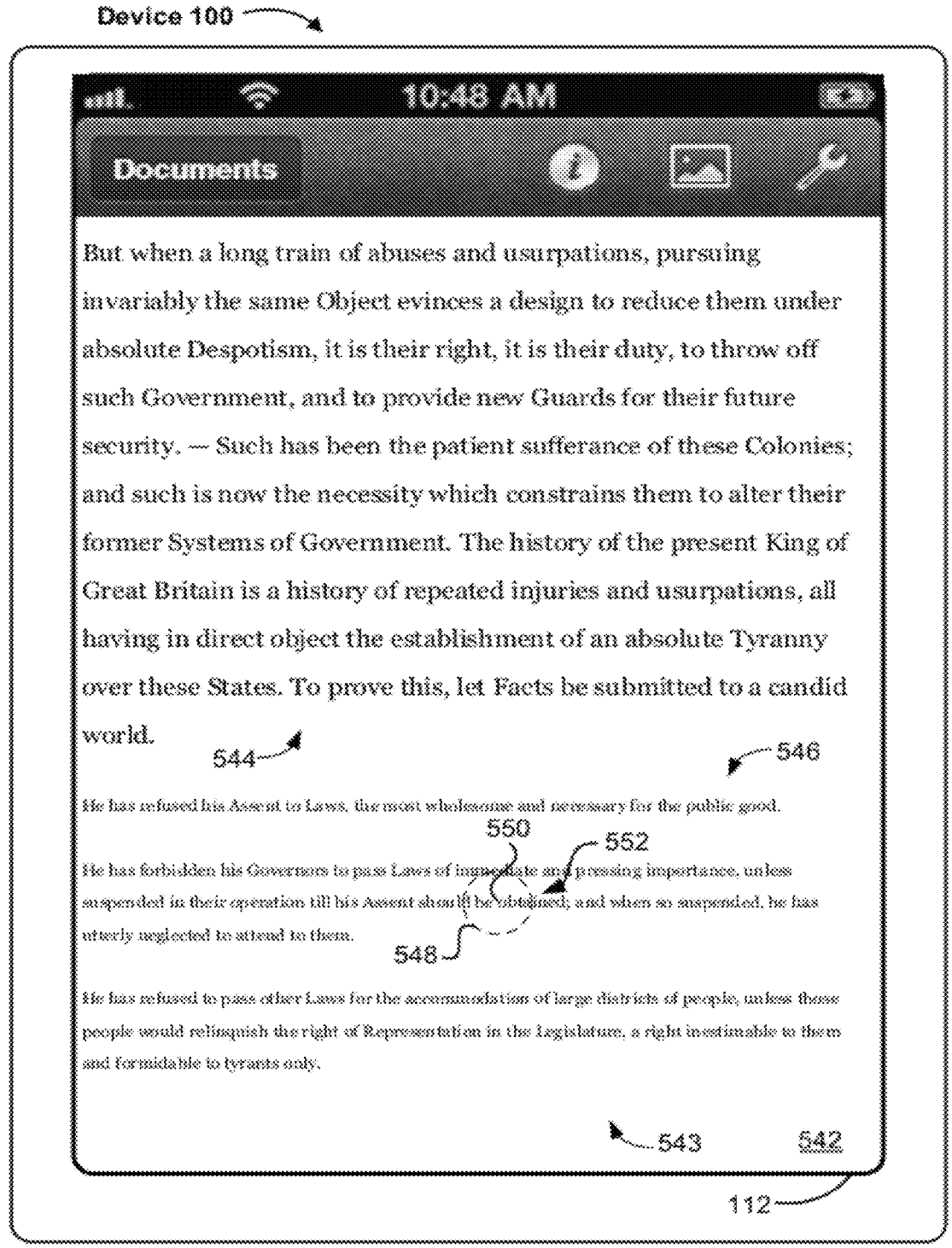

FIG. 5K illustrates document 542, which includes text 543, being displayed in document viewing mode on touch screen 112. Document 542 includes document portions 544 and 546. The text (a portion of text 543) in document portion 544 and the text (another portion of text 543) in document portion 546 have different font sizes. At a given magnification level at which document 542 is displayed, the text display size of text in document portion 544 is larger than the text display size of text in document portion 546.

Gesture 548 is detected at a location on touch screen 112 corresponding to a location on document 542. In some embodiments, gesture 548 is a single tap gesture. The location of gesture 548 indicates insertion point 550 in text 543. Insertion point 550 is proximate to text portion 552 of text 543. Text portion 552 is located in document portion 546.

Figure 5L:
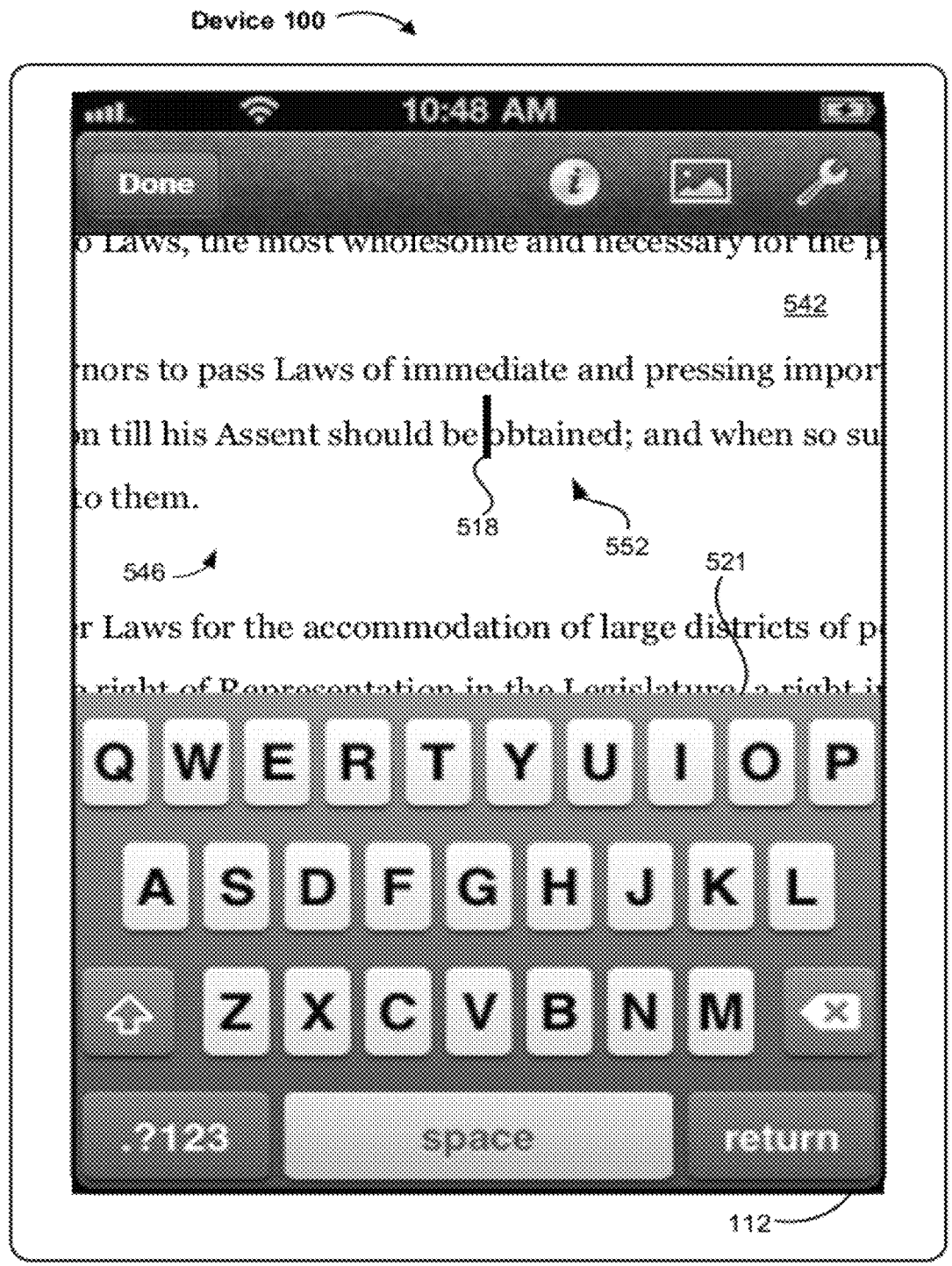

In response to the detection of gesture 548, document portion 546 is displayed in document editing mode, as shown in FIG. 5L. Document portion 546 is displayed at a certain magnification level. Accordingly, text portion 552 is displayed at a target text display size. Insertion point marker 518 is displayed to mark insertion point 550. Also displayed is keyboard 521.

Figure 5M:
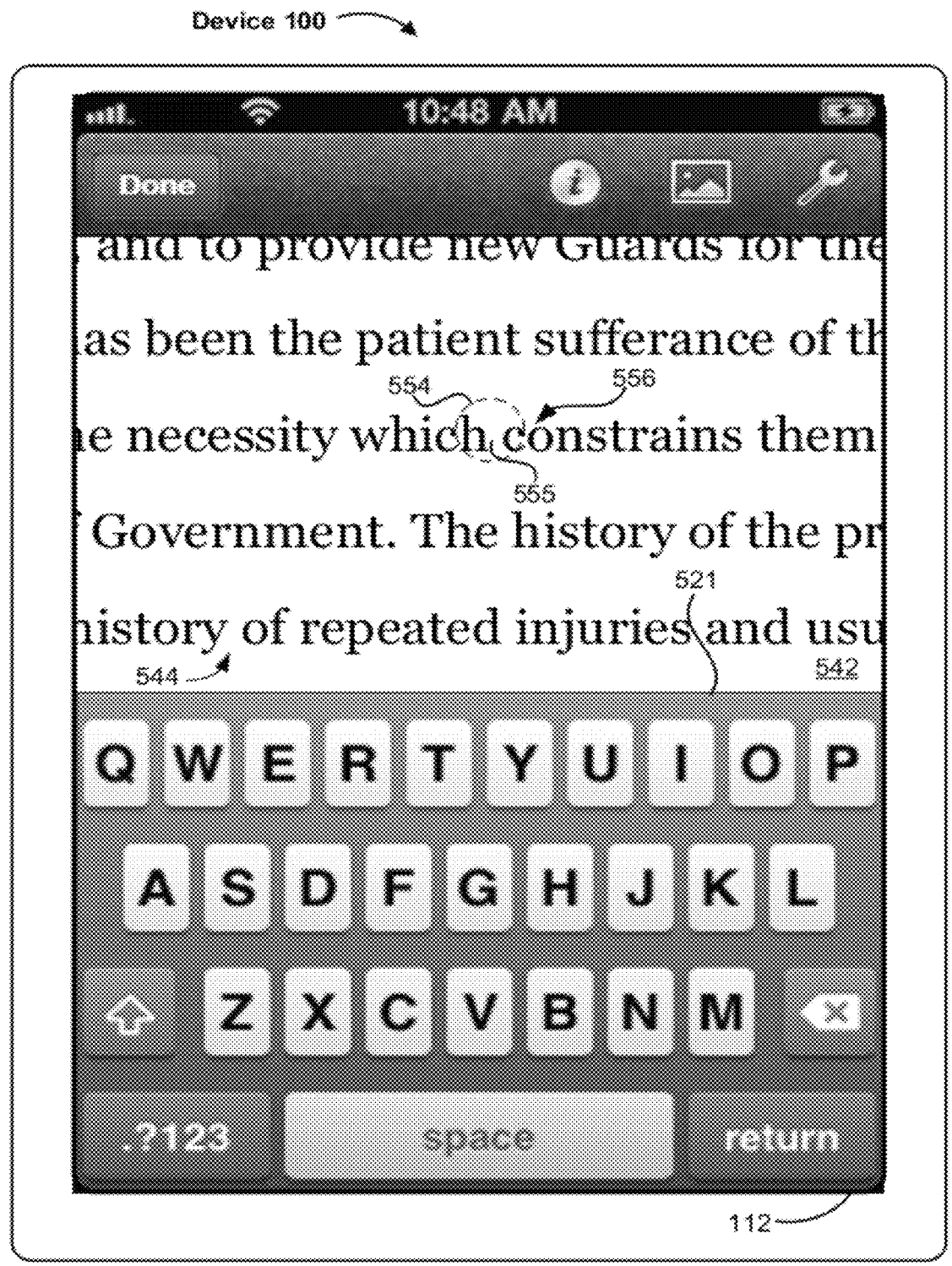

FIG. 5M shows document portion 544, which includes text portion 556 of text 543, displayed on touch screen 112 in document editing mode. Document portion 544 may be reached from document portion 546 as displayed in FIG. 5L by scrolling document 542 (e.g., using swipe gestures). Alternatively, document portion 544 may be reached from document portion 546 as displayed in FIG. 5L by dragging insertion marker 518 from document portion 546 to document portion 544 while in document editing mode. Document portion 544 is displayed at the same magnification level as document portion 546 is displayed in FIG. 5L. Text portion 556 is displayed at a larger text display size than text portion 552 is displayed in FIG. 5L. Text portion 556 has a larger font size than text portion 552 and thus has a larger text display size for the same magnification level.

Gesture 554 is detected at a location on touch screen 112 corresponding to a location in document portion 544. In some embodiments, gesture 554 is a single tap gesture. The location of gesture 554 indicates insertion point 555 in text 544. Insertion point 555 is proximate to text portion 556 of text 544.

Figure 5N:
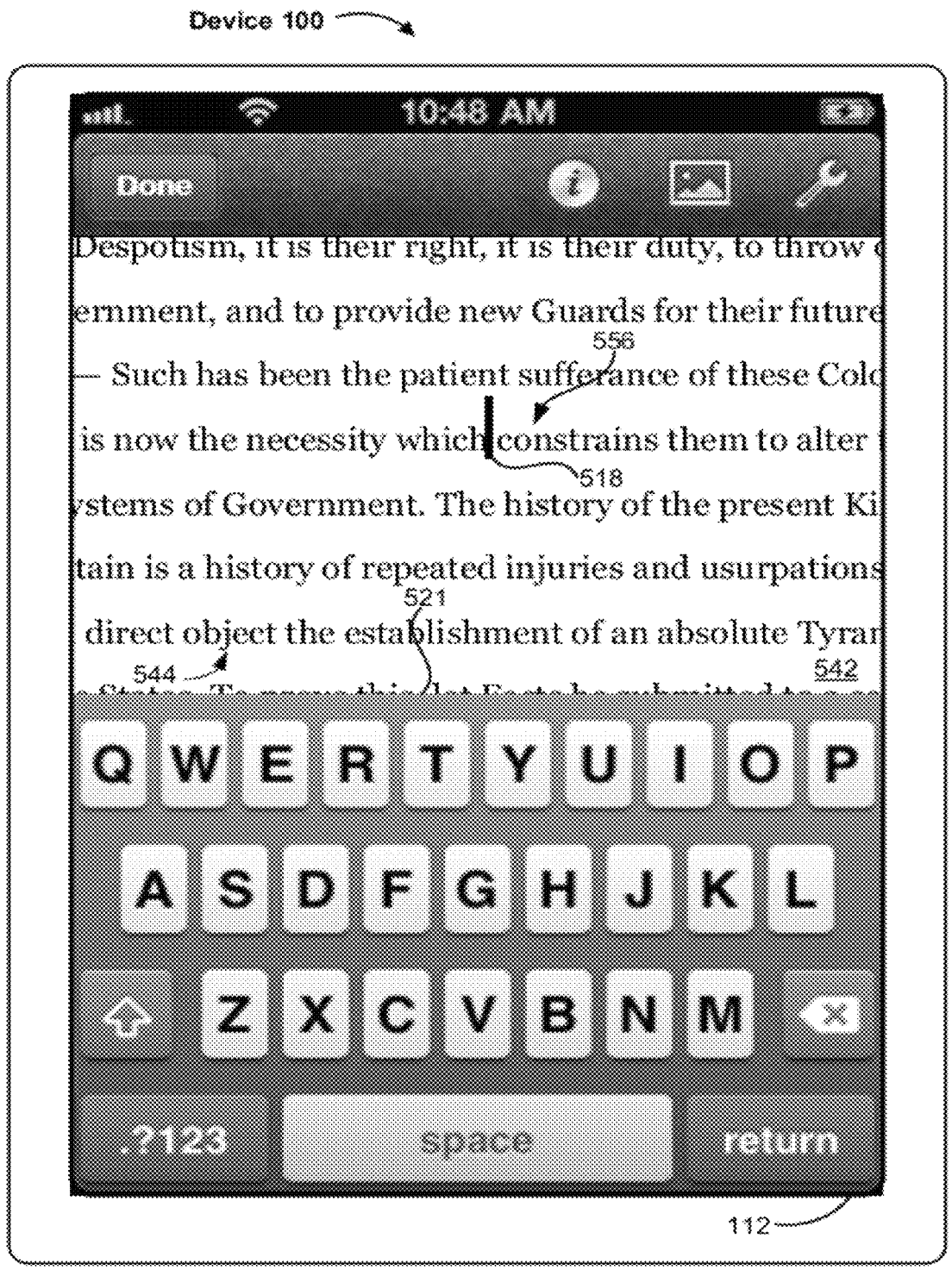

In response to the detection of gesture 554, as shown in FIG. 5M, document portion 544 is displayed in FIG. 5N at a lower magnification level than that shown in FIG. 5M. Insertion point marker 518 is displayed to mark insertion point 555. At this lower magnification level, text portion 556 is displayed at the same text display size as text portion 552 is displayed in FIG. 5L; the magnification level of the document is changed such that text of different font sizes are displayed at the same text display size as the user navigates from text of one font size to text of a different font size.

Figure 5O:
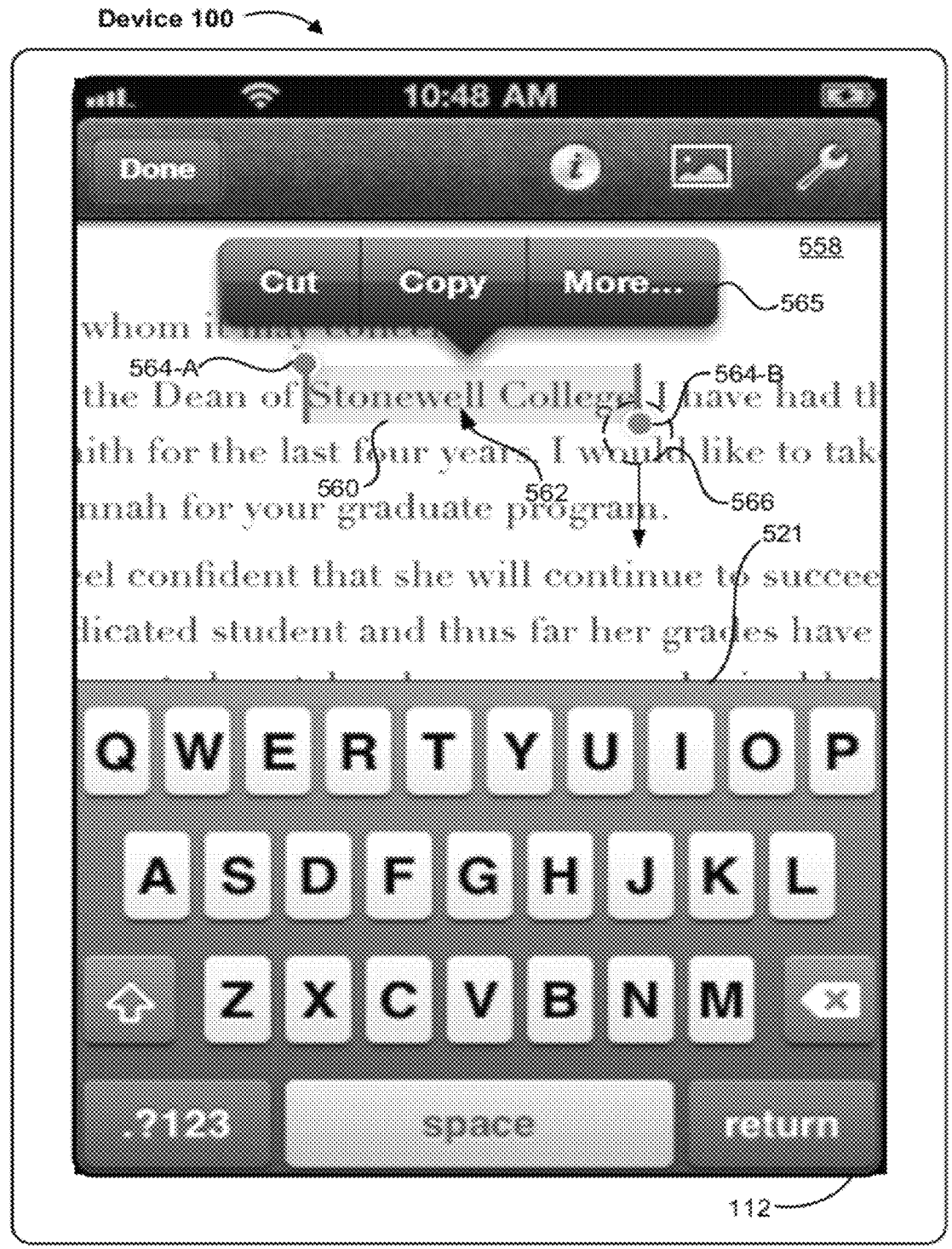

FIG. 5O illustrates a portion of document 558 being displayed, in document editing mode, at a certain magnification level. Text in document 558 is displayed at a certain text display size. Text 562 is selected, as indicated by content selection range 560. Also displayed are selection options menu 565 for manipulating the selected text 562, and content selection handles 564-A and 564-B for adjusting content selection range 560. Gesture 566 is detected on handle 564-B, dragging handle 564-B in a direction that increases content selection range 560 (e.g., downward in FIG. 5O).

Figure 5P:
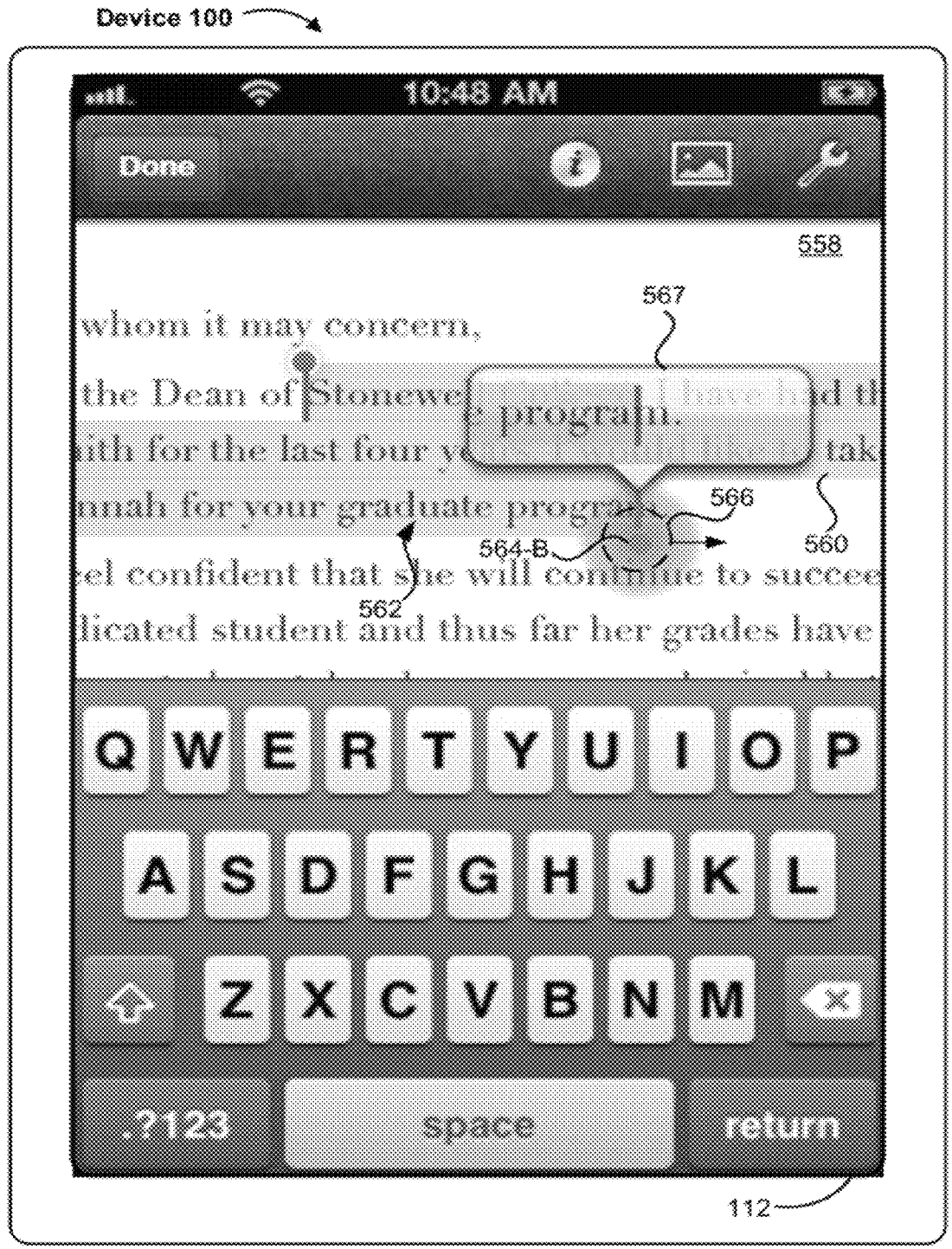

In response to the detection of gesture 566, selection range 560 is enlarged, as shown in FIG. 5P. In some embodiments, loupe 567, which shows a magnified view of text at the end of selection range 560 as handle 564-B is moved, is displayed.

With the enlarged content selection range 560, selected text 562 includes more text than is shown in FIG. 5O. Some of selected text 562 is not displayed in FIG. 5O.

Figure 5Q:
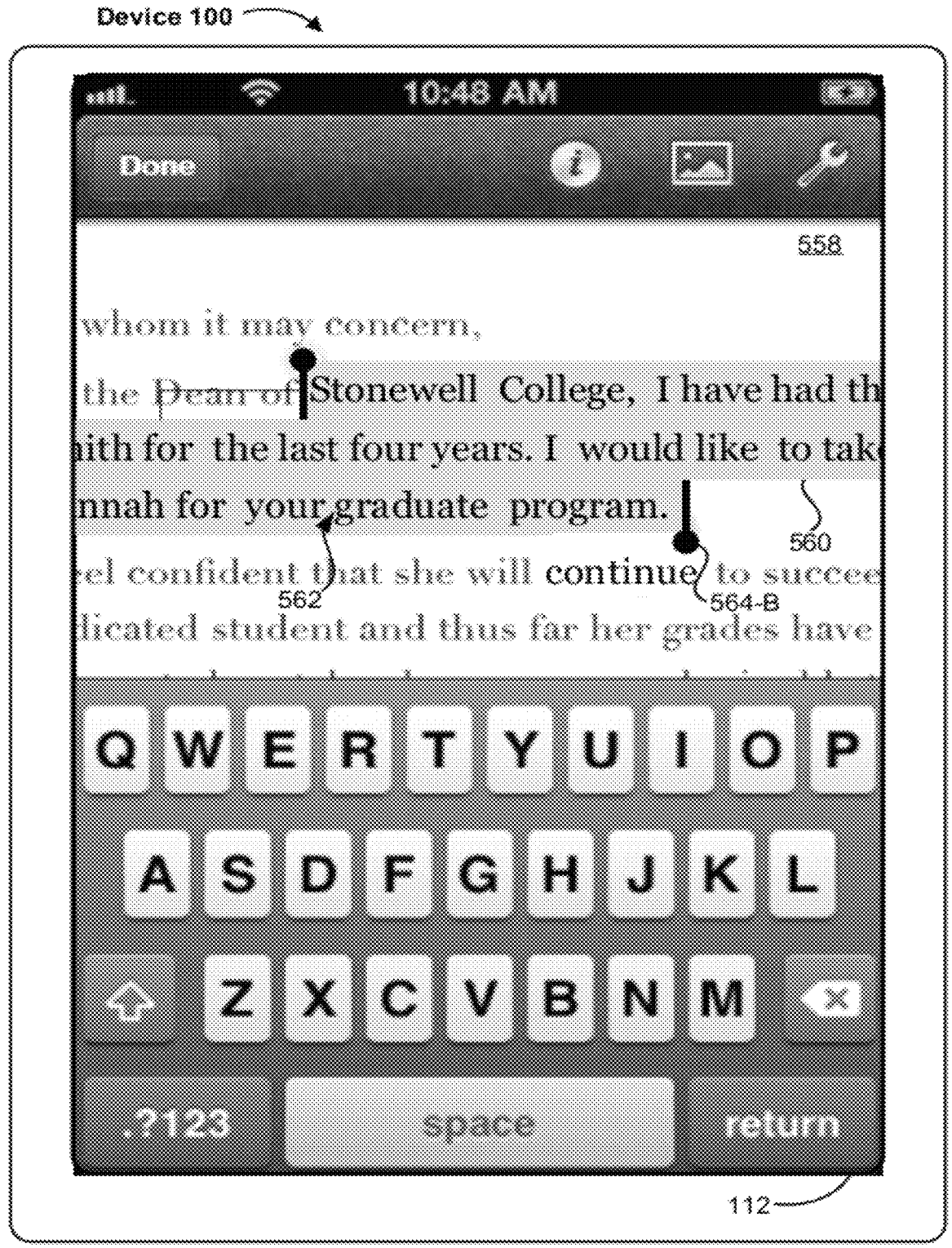
Figure 5R:
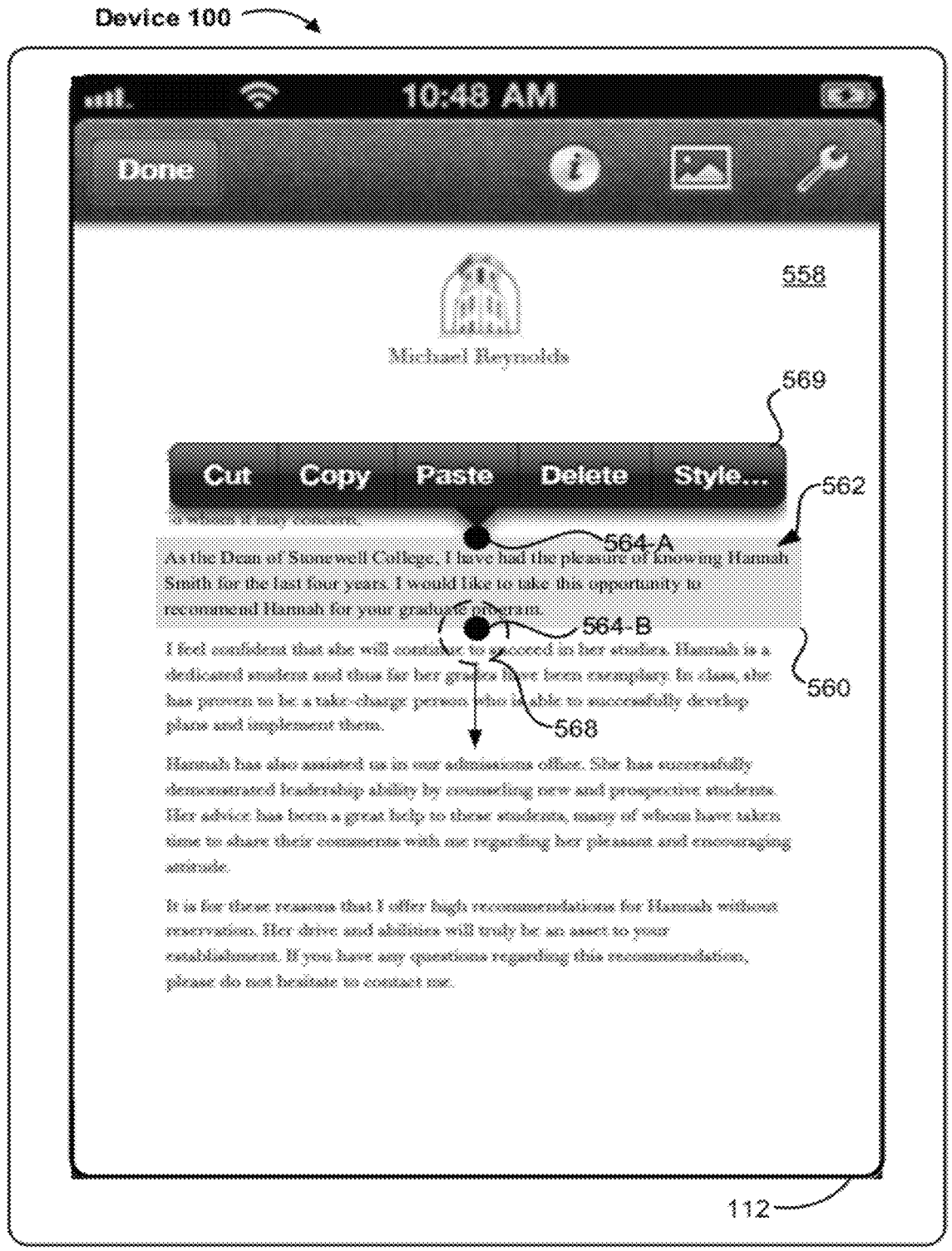

FIG. 5Q illustrates gesture 566 ceasing to be detected on touch screen 112, while selection range 560 includes an end of a paragraph in document 558. With the ceasing (lift off) of gesture 566, adjustment of content selection range 560 is completed. In response to detecting completion of gesture 566, the magnification level at which document 558 is displayed is changed, as shown in FIG. 5R. The new magnification level is chosen so that the entirety of selected text 562 in content selection range 560 is displayed on touch screen 112, rather than showing just some of selected text 562 because the magnification level is too high. For example, document 558 may be displayed at a fit whole page magnification level, as shown in FIG. 5R, or a fit page width magnification level.

Also shown in FIG. 5R, content selection range 560 is extended so that selected text 562 includes an entire paragraph. Also displayed are paragraph selection options menu 569 for manipulating the selected paragraph, and handles 564-A and 564-B for adjusting selection range 560. As shown in FIG. 5R, handles 564-A and 564-B may be dragged to adjust selection range 560 to select more paragraphs or less paragraphs; a paragraph becomes the unit of text selection, as opposed to a smaller unit such as a character or a word.

Figure 5S:
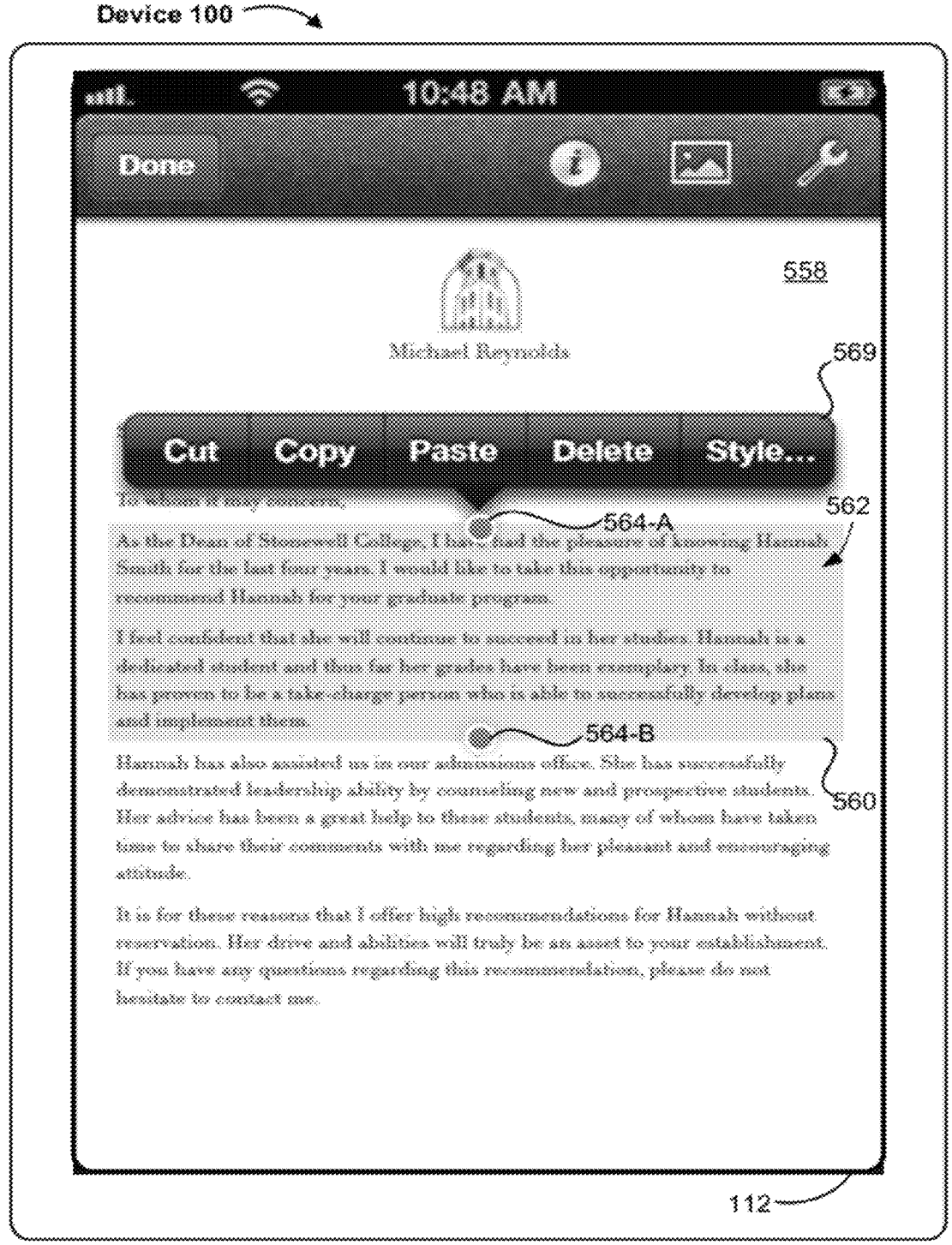

In FIG. 5R, gesture 568 is detected on handle 564-B, which drags handle 564-B downward, toward another paragraph of text in document 558. In response to the detection of gesture 568, selection range 560 is extended by a paragraph, and selected text 562 includes another paragraph, as shown in FIG. 5S.

Figure 5T:
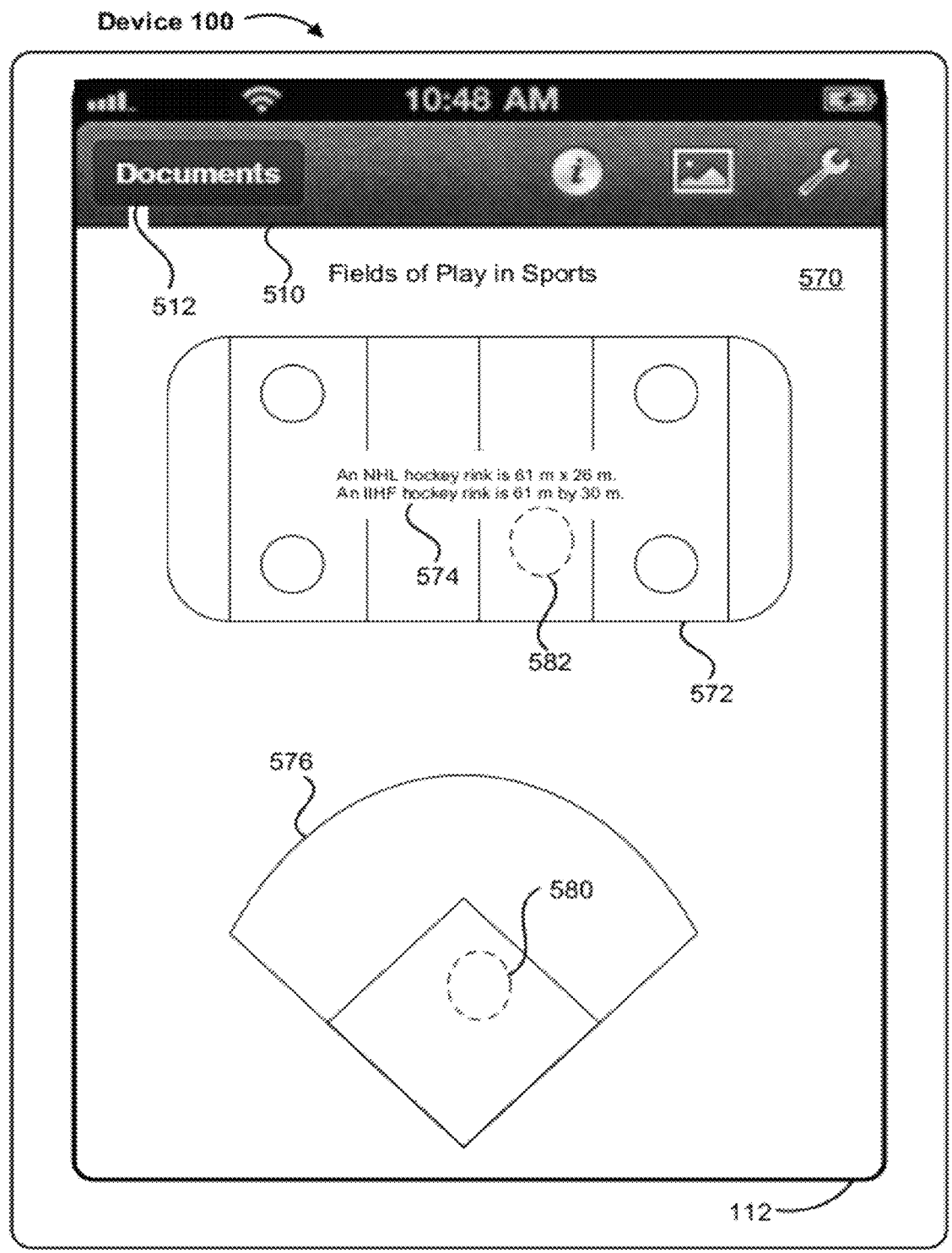

FIG. 5T shows document 570 displayed in document viewing mode on touch screen 112. Document 570 includes objects 572 and 576. In some embodiments, an object is a shape, image, or other graphical object. Object 572 includes editable text 574, and object 576 does not include editable text.

Figure 5U:
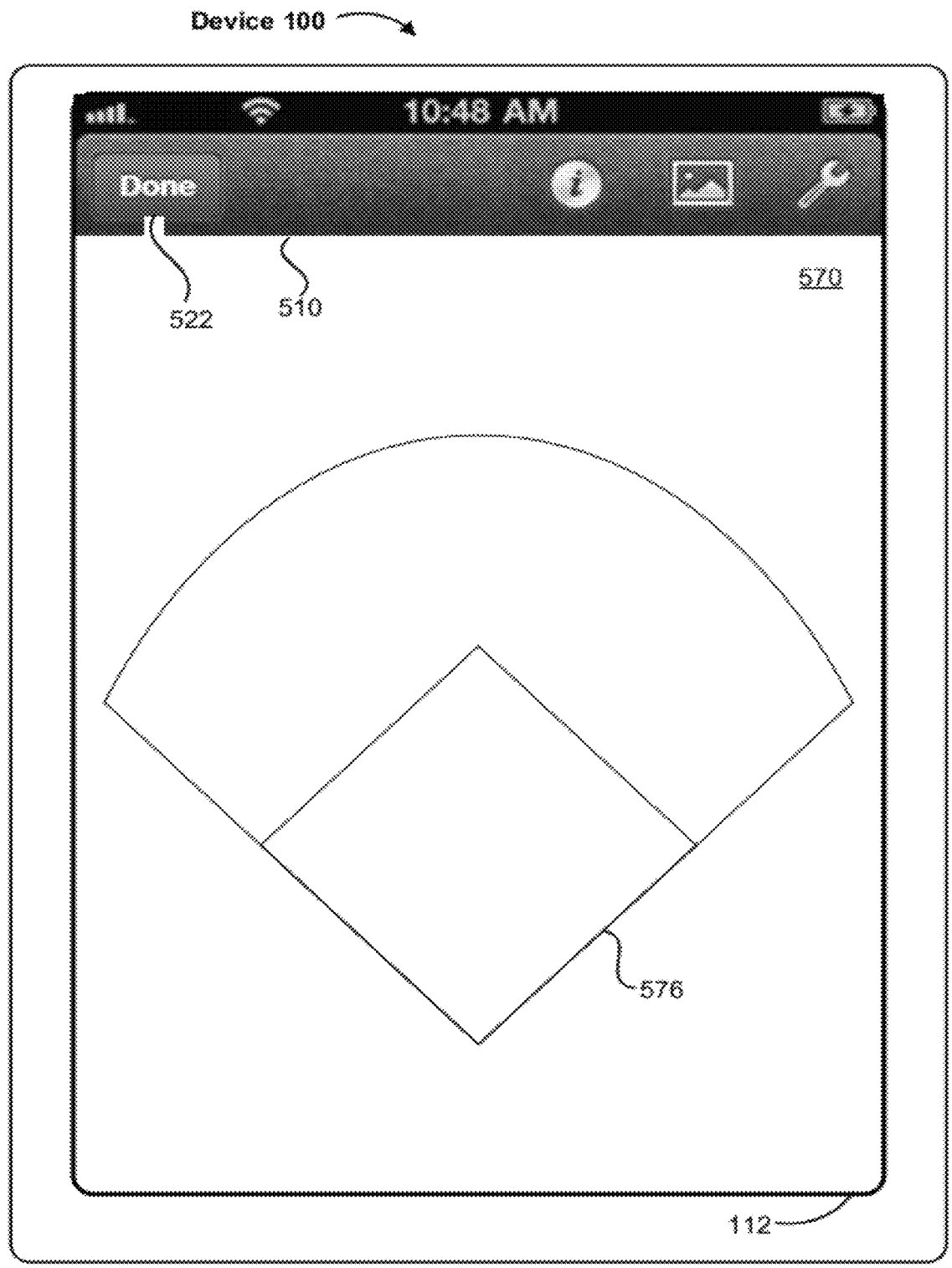

When a gesture is detected on object 576 (e.g., gesture 580, which may be a single tap gesture, on object 576, FIG. 5T), object 576 is displayed in document editing mode, at a magnification level that achieves a particular object display size, as shown in FIG. 5U. The object display size is the size of the object as is appears on the display. In some embodiments, that particular object display size is a predefined size with respect to touch screen 112. For example, the predefined size may be a size that fits the entire object 576 onto touch screen 112.

Figure 5V:
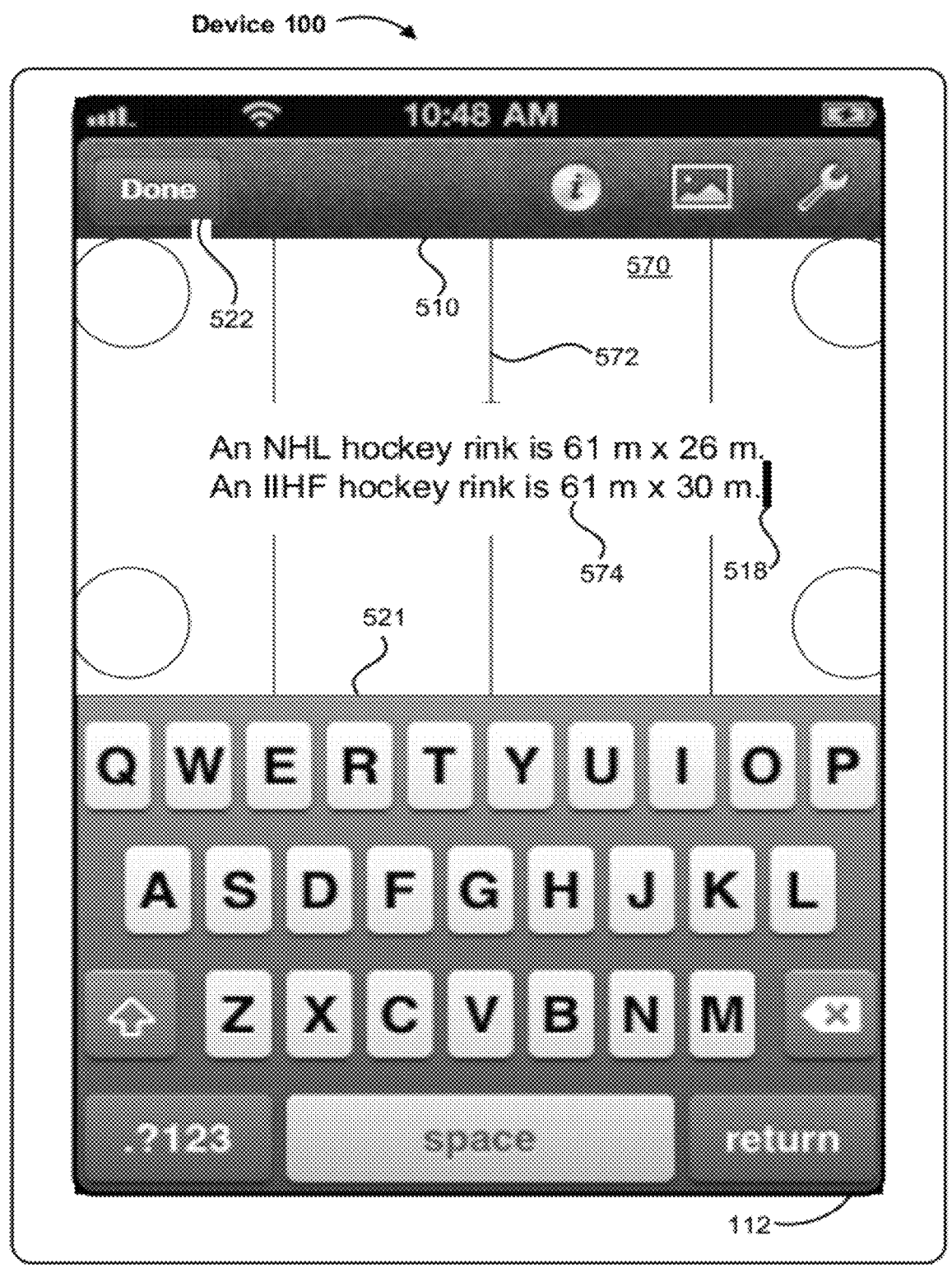

In contrast, when a gesture is detected on object 572 (e.g., gesture 582, which may be a single tap gesture, FIG. 5T), object 572 is displayed in document editing mode, at a magnification level that achieves a particular text display size for text 574, as shown in FIG. 5V. This magnification level may be selected without reference to the size of object 572. In some embodiments, that particular text display size is a default text display size or a previously-stored user-adjusted text display size. Thus, when a gesture (e.g., a single tap gesture) is detected on an object, if the object includes editable text, the new magnification level accommodates the text, and if the object does not include editable text, the new magnification level accommodates the object.

Figure 5W:
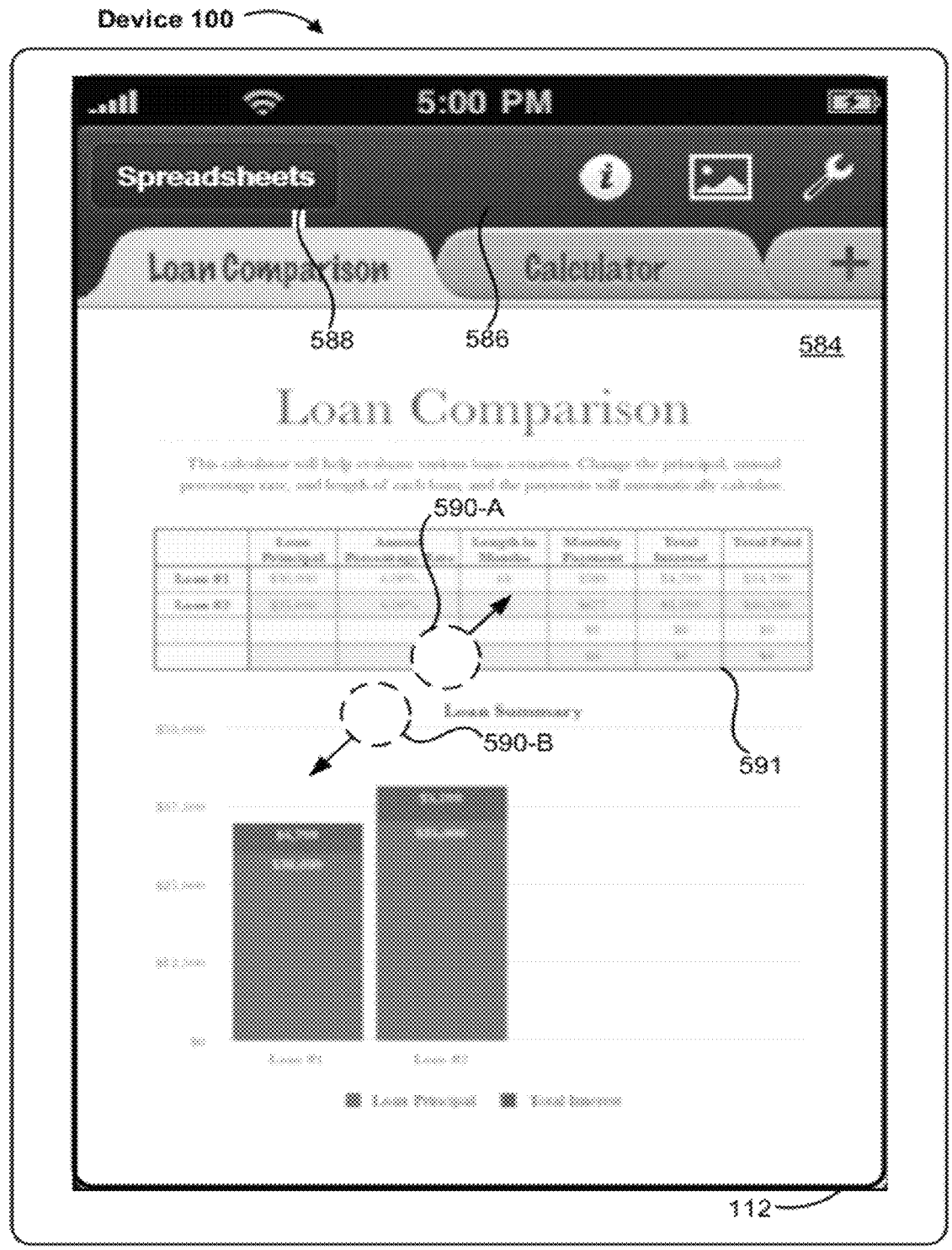

FIG. 5W illustrates document 584 being displayed, in document viewing mode, on touch screen 112. Document 584 is a spreadsheet document and includes worksheet 591. Worksheet 591 includes one or more rows and one or more columns. Document 582 is displayed at some magnification level. Also displayed are toolbar 586 and "spreadsheets" 588 for navigating to other spreadsheet documents, similar to "documents" button 512.

Figure 5X:
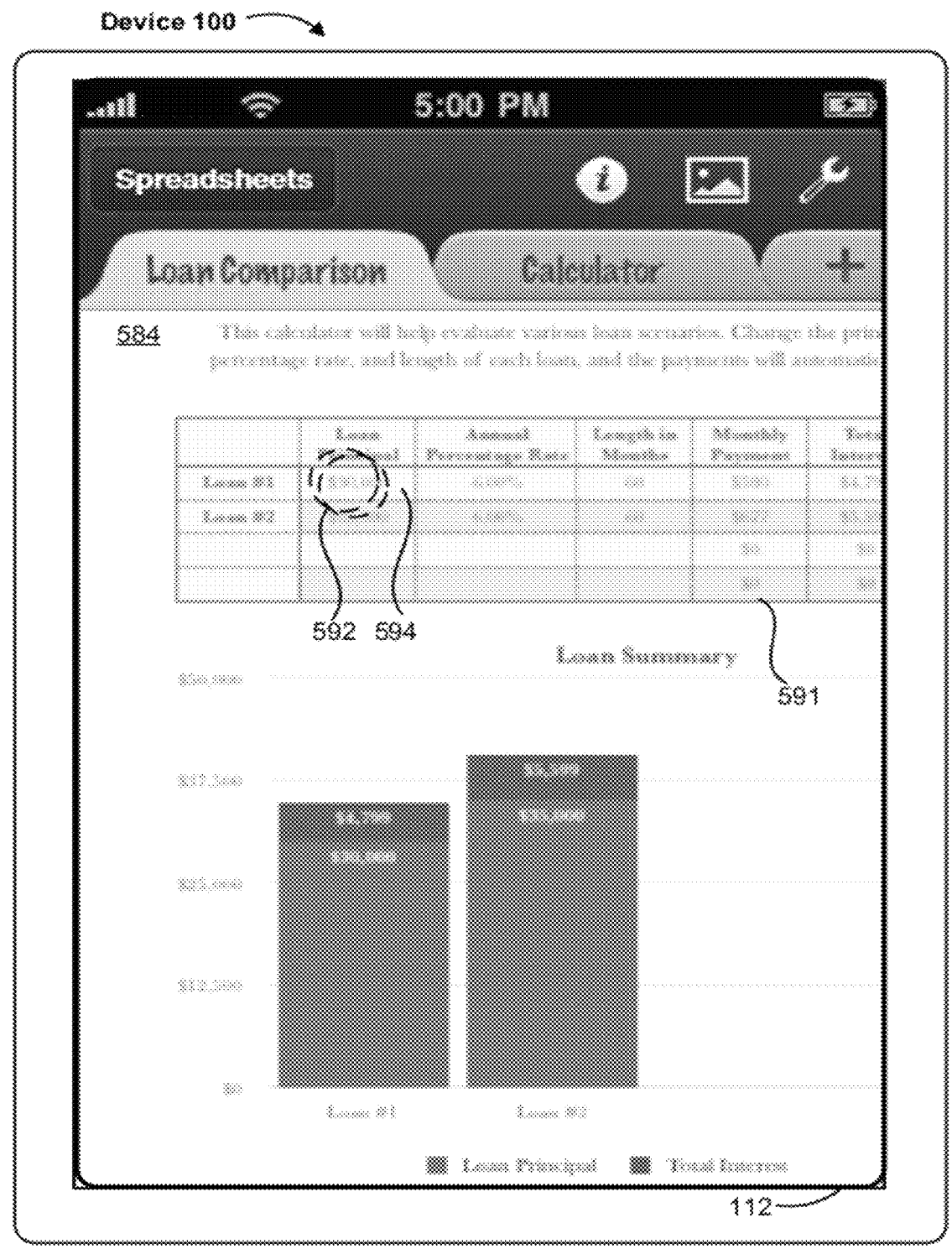

Gesture 590, for changing the magnification level of document 584, is detected on touch screen 112. Gesture 590 includes contacts 590-A and 590-B moving apart (i.e., gesture 590 is a depinch gesture). In response to the detection of gesture 590, document 584 is displayed, still in the document viewing mode, at a user-adjusted magnification level, as shown in FIG. 5X.

Figure 5Y:
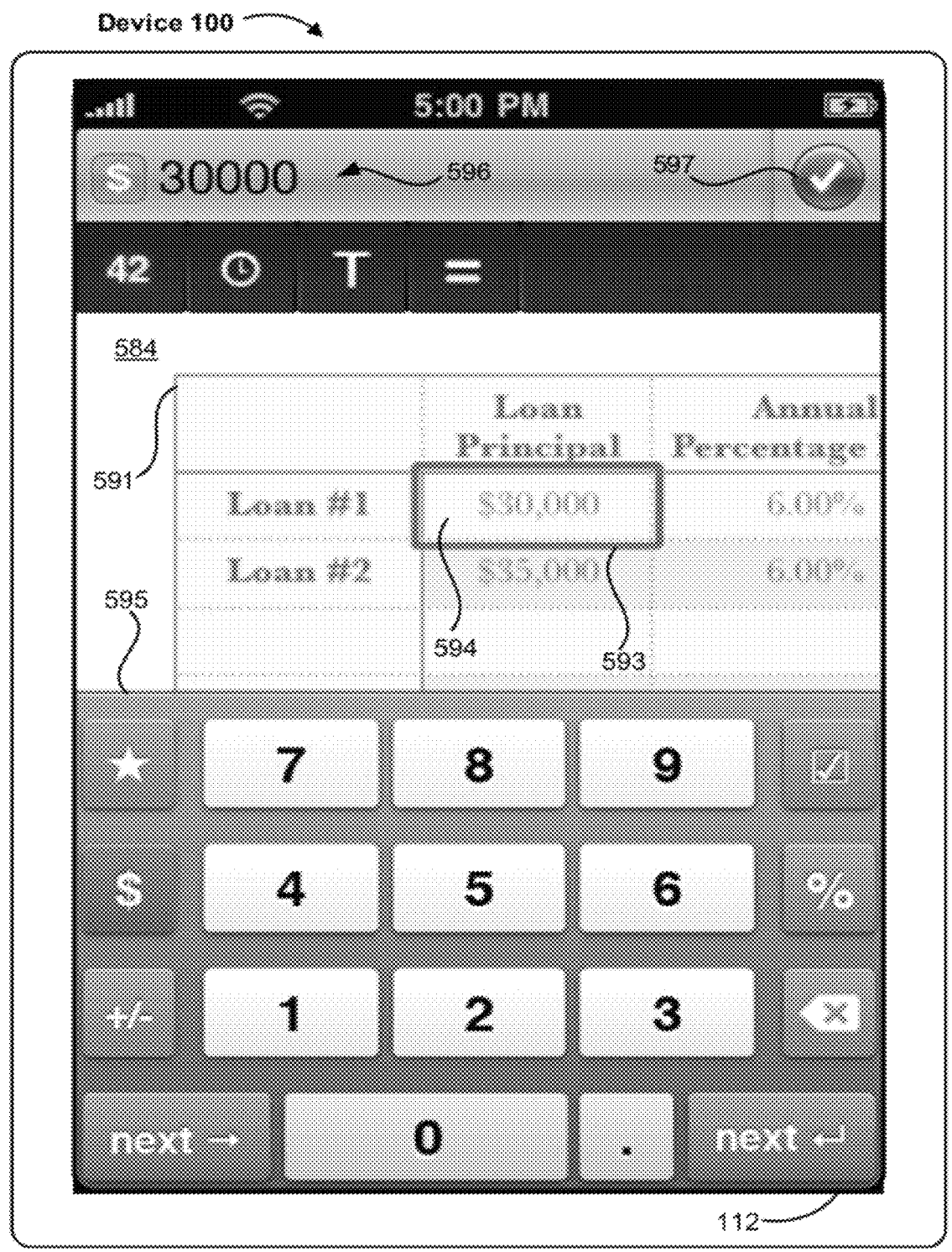

Gesture 592 is detected on touch screen 112, in proximity of cell 594 in worksheet 591. In some embodiments, gesture 592 is a double tap gesture. Cell 594 becomes the insertion point. In response to the detection of gesture 592, document 584 is displayed in a document editing mode, as shown in FIG. 5Y. Document 584 is displayed at a magnification level different from the user-adjusted magnification level. Cell 594, as the cell that is in proximity to gesture 592, becomes an editable cell and in focus (e.g., centered) and is highlighted by cell insertion point marker 593. Also displayed are keypad 595, edit field 596 showing the current contents of cell 594, and edit complete button 597. A user may enter edits into the contents of cell 594 using keypad 595, and the edits are reflected in edit field 596.

Figure 5Z:
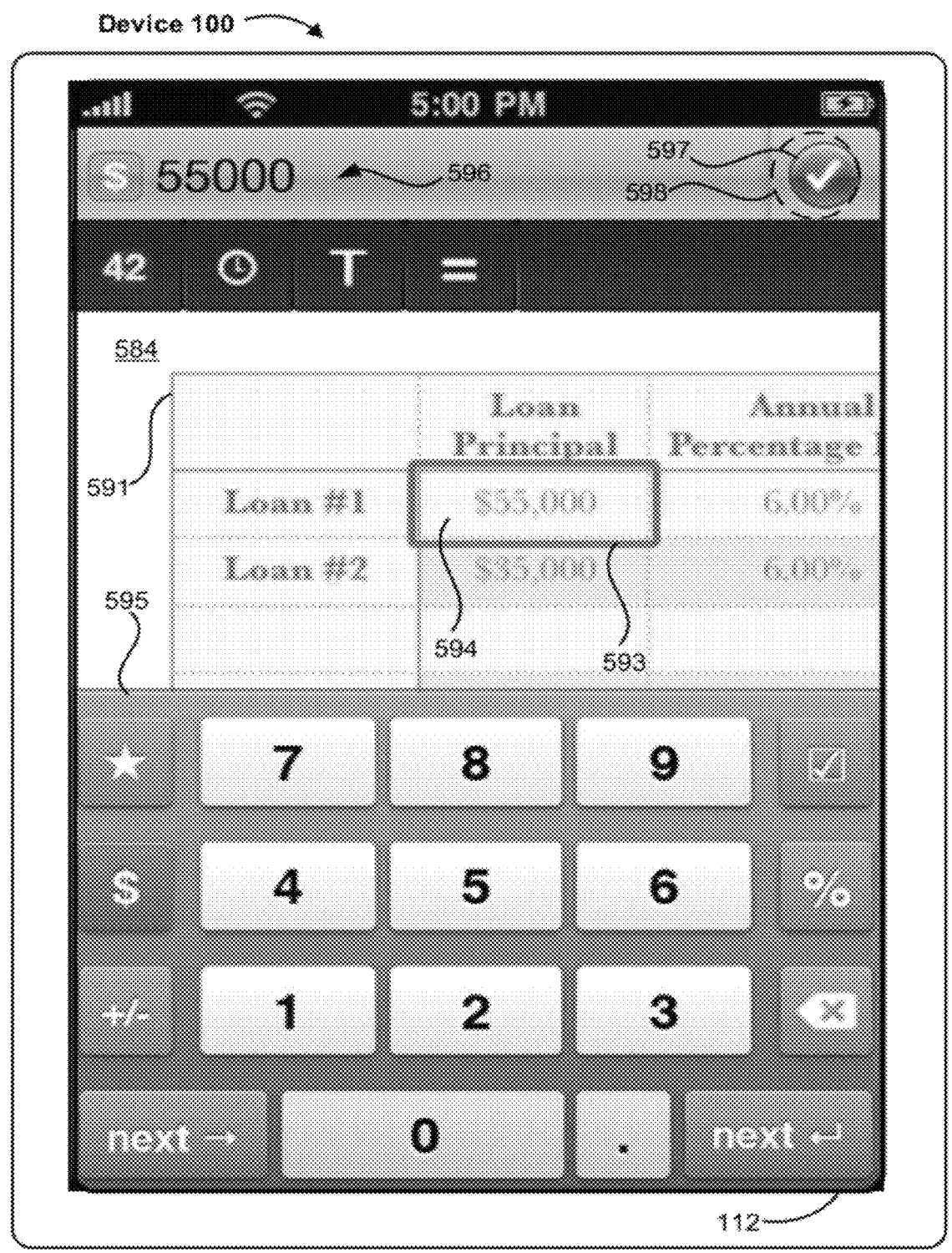
Figure 5A:
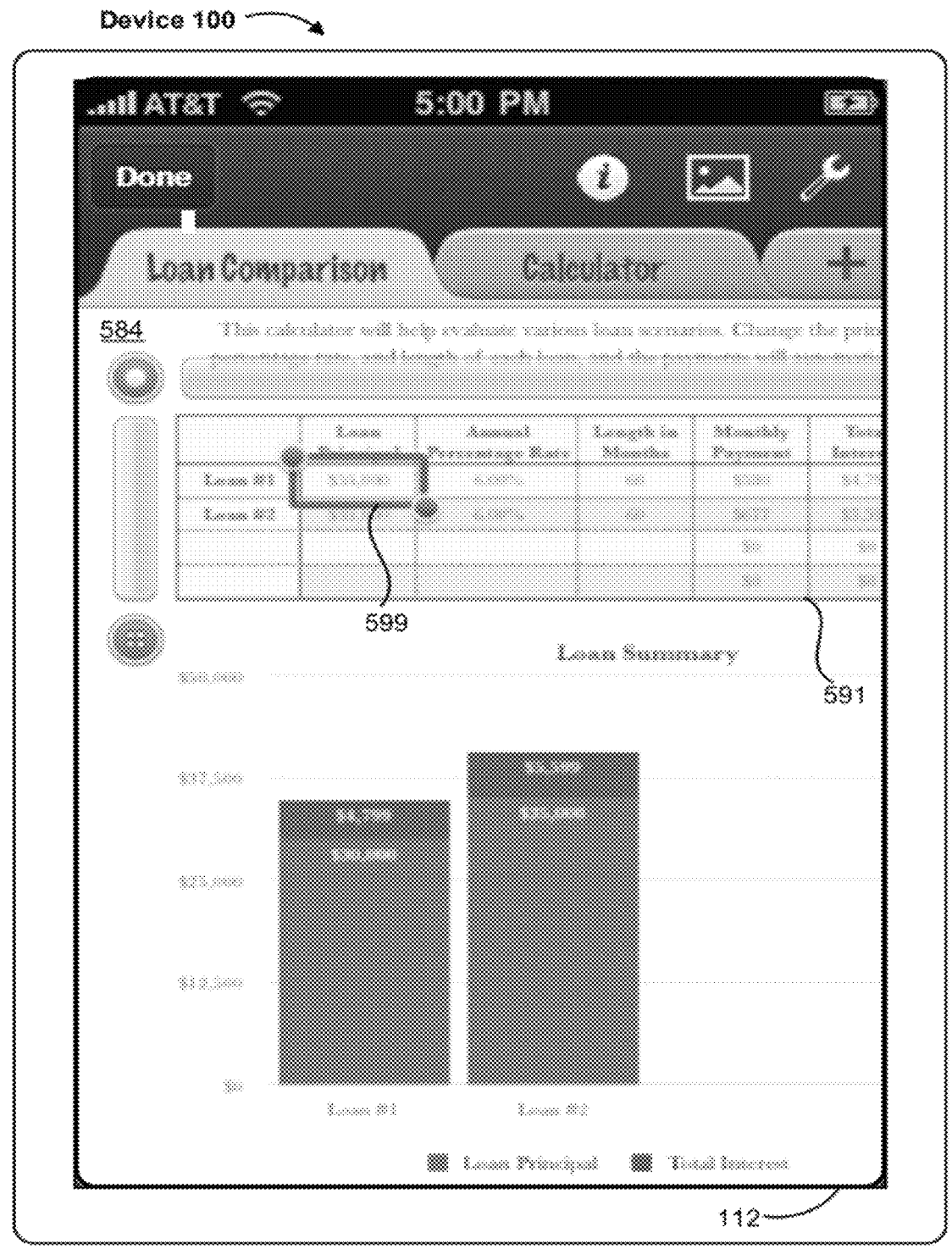
Figure 6A:
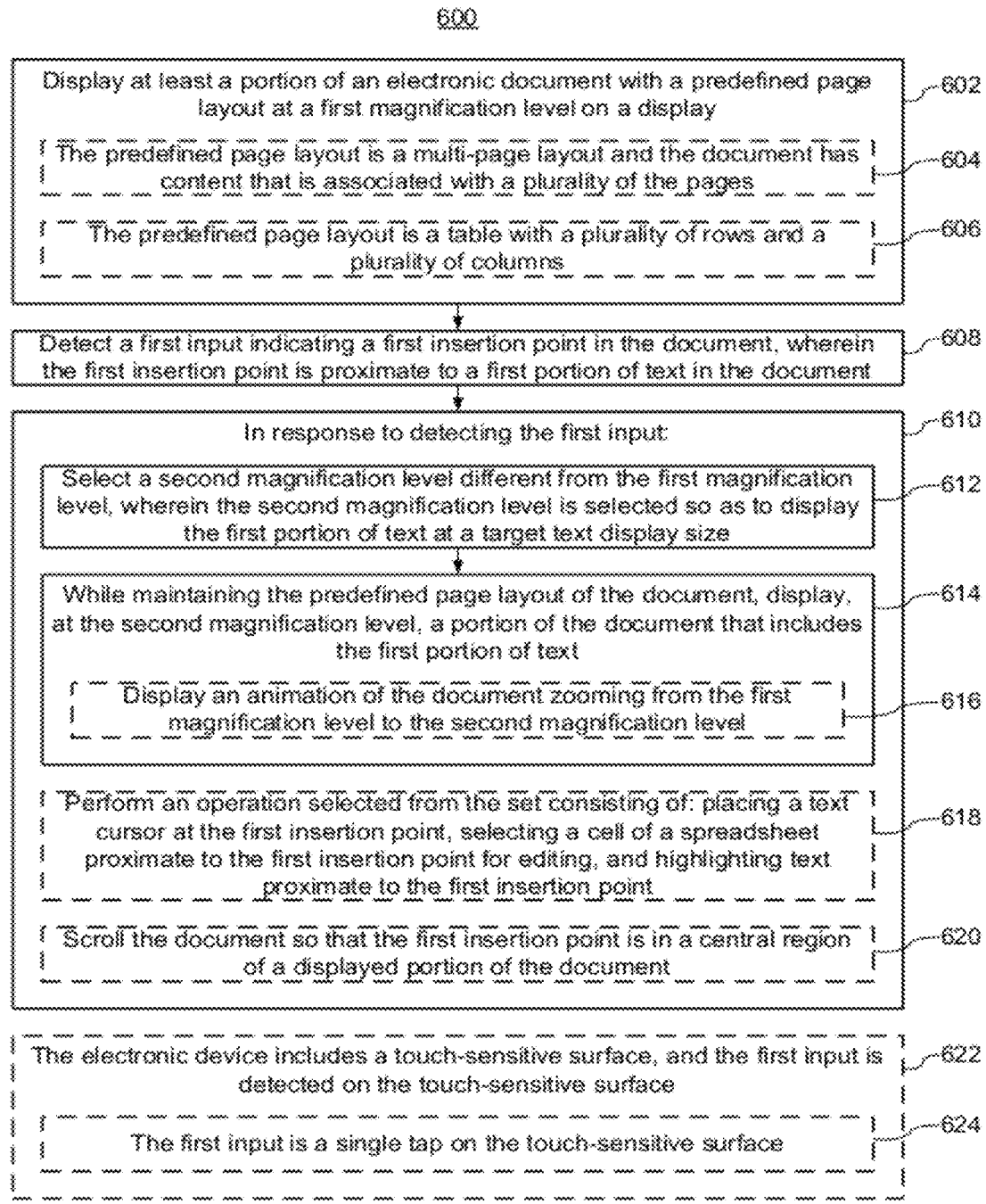
FIGS. 6A-6E are flow diagrams illustrating a method of navigating and editing an electronic document in accordance with some embodiments.
Figure 6B:
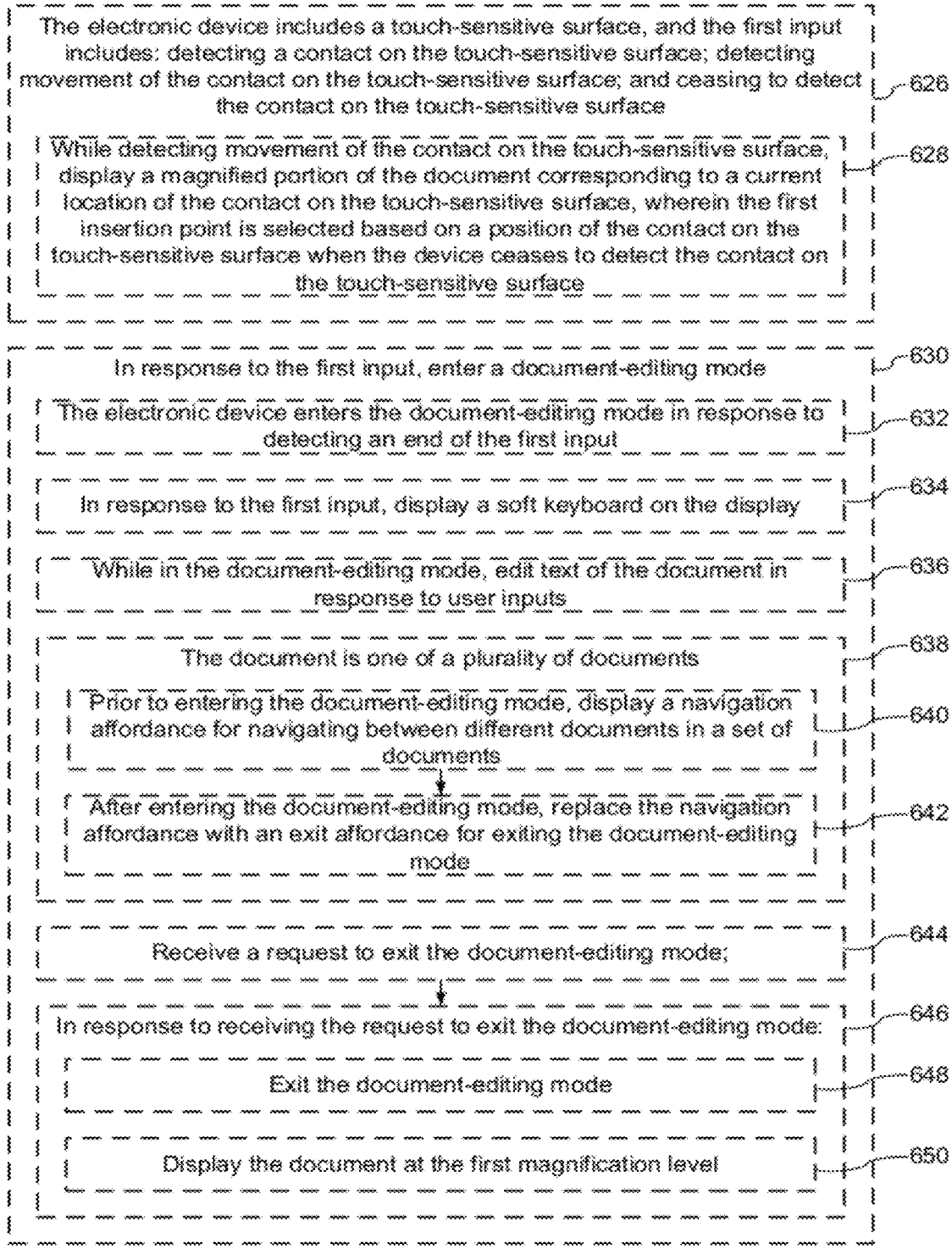
Figure 6C:
Figure 6D:
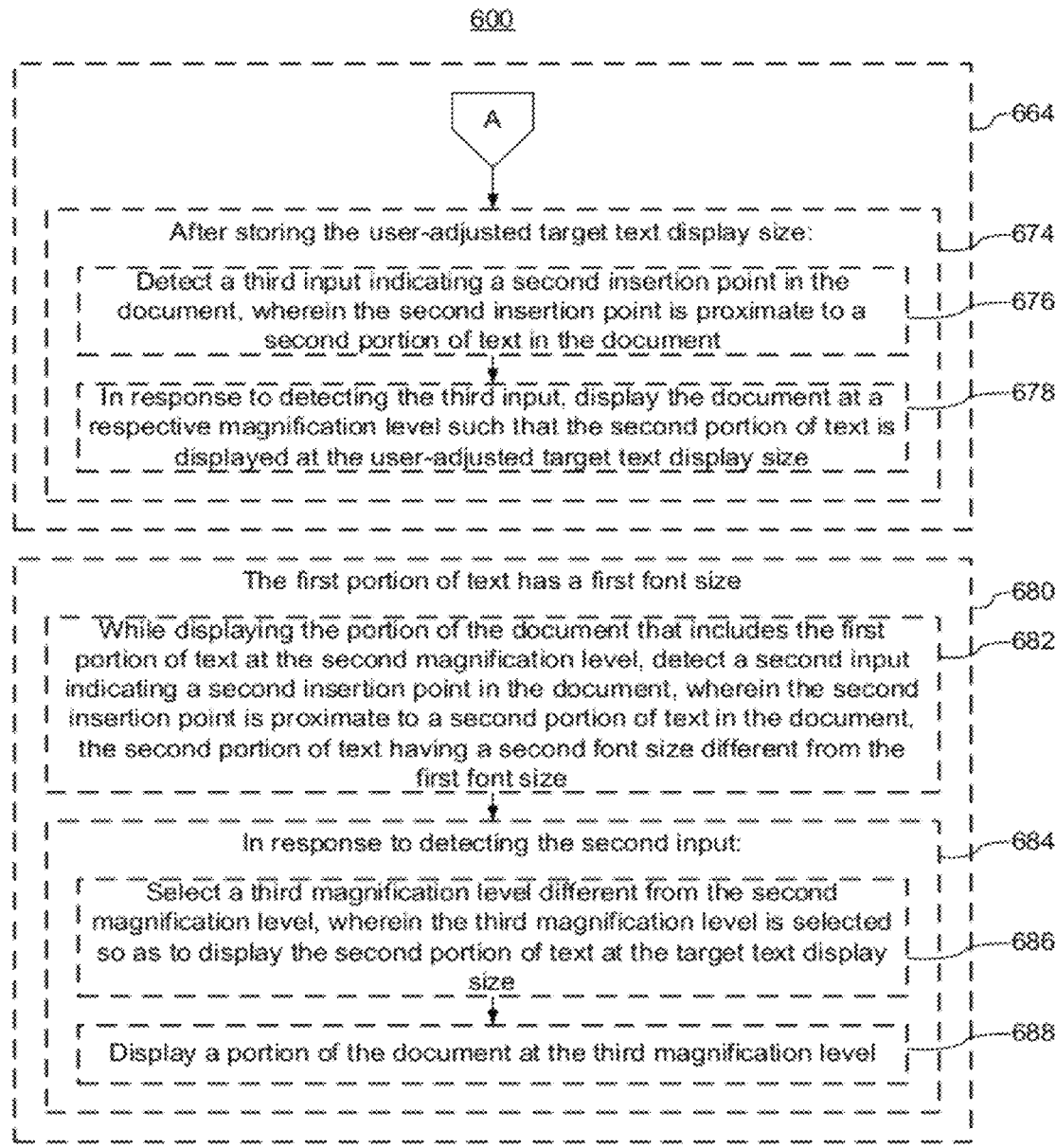
Figure 6E:
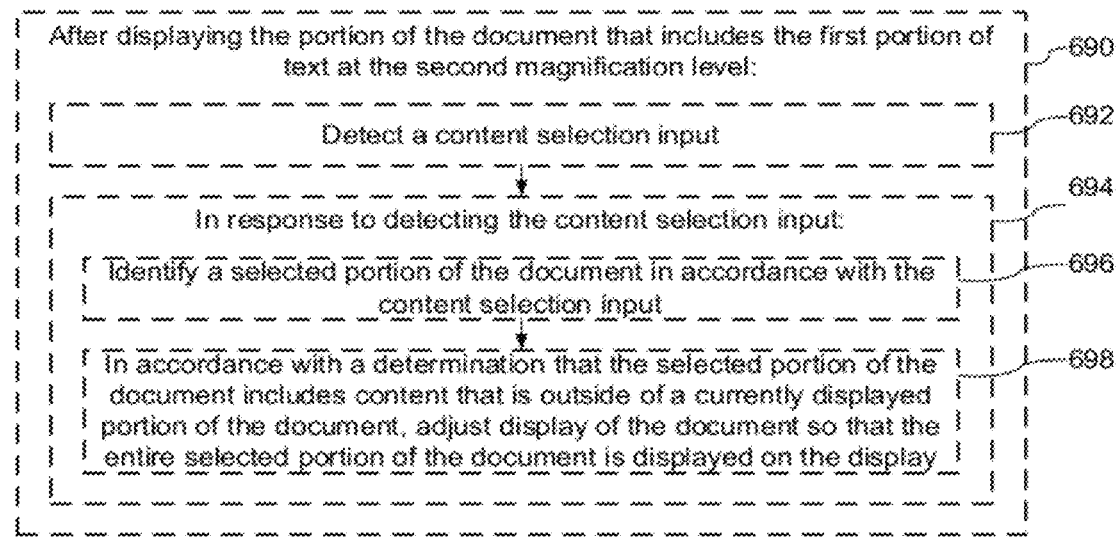

When editing is completed, a user activates edit complete button 597 with a gesture. For example, gesture 598 is detected on edit complete button 597, as shown in FIG. 5Z. In some embodiments, gesture 598 is a single tap gesture. In response to the detection of gesture 598 on edit complete button 597, document 584 is displayed at the user-adjusted magnification level (the same level as in FIG. 5X), as shown in FIG. 5AA. Edit field 596 ceases to be displayed, and in worksheet 591, cell selection marker 599 is displayed instead of cell insertion point marker 593.

FIGS. 6A-6E are flow diagrams illustrating a method 600 of navigating and editing an electronic document in accordance with some embodiments. The method 600 is performed at an electronic device (e.g., device 300, FIG. 3, or portable multifunction device 100, FIG. 1) with a display and, typically, a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to automatically zoom in on a user-specified insertion point when entering a document editing mode and display the text at the insertion point at a target text display size for easy viewing and editing. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays at least a portion of an electronic document with a predefined page layout at a first magnification level on the display (602). In other words, the electronic document has a fixed page layout and the text does not "reflow" as the magnification level of the document is changed. For example, in FIG. 5A, document 500 with predefined page layout is displayed on touch screen 112. In FIG. 5A, document 500 is displayed at the fit whole page magnification level.

In some embodiments, the predefined page layout is a multi-page layout and the document has content that is associated with a plurality of the pages (e.g., the electronic document is a word processor document, presentation document, pdf, etc.) (604). For example, document 500 may have one or more pages in addition to the one displayed in FIG. 5A.

In some embodiments, the predefined page layout is a table with a plurality of rows and a plurality of columns (e.g., the electronic document is a spreadsheet document, etc.) (606).

The device detects a first input indicating a first insertion point in the document, where the first insertion point is proximate to (e.g., adjacent to) a first portion of text in the document (608). The first portion of text is typically a word or character adjacent to the first insertion point that has a predefined font size (e.g., a font size specified by the document). For example, in FIG. 5A gesture 504 is detected. The location of gesture 504 indicates the insertion point 506. In some embodiments, the gesture is a finger gesture (e.g., a tap gesture) that has a contact area and the centroid of the contact area (or a point offset from the centroid of the contact area) is used to locate the insertion point. Insertion point 506 is proximate to text portion 508.

It should be understood that, as used herein, the term "insertion point" refers to a location within the document that may also used as a location for displaying an insertion point marker, such as a text cursor or highlighted word.

In response to detecting the first input (610), the device selects a second magnification level different from the first magnification level, where the second magnification level is selected so as to display the first portion of text at a target text display size (612); and, while maintaining the predefined page layout of the document, the device displays, at the second magnification level, a portion of the document that includes the first portion of text (614). For example, in FIGS. 5A thru 5C, in response to the detection of gesture 504 (FIG. 5A) or gesture 514 (FIG. 5B), document portion 520, which includes text portion 508, is displayed at a larger magnification level, where the larger magnification level is one that is selected so that text portion 508 is displayed at a text display size that is comfortable for reading.

In other words, a magnification level is selected such that text is displayed at a target text display size that has been determined to be a comfortable reading size (e.g., 17 pt or some other predefined text display size).

It should be understood that the target text display size may be either a predefined target text display size or a user-adjusted target text display size, as described below in greater detail with reference to method 700 and FIGS. 7A-7B.

It should be understood that, as used in the specification and claims, "text display size" is different from "font size." In particular, as used herein, the "font size" of the text corresponds to a physical dimension of the text as it would appear if the document were to be printed out. In contrast, "text display size" corresponds to a dimension of the text as it appears on the display of the electronic device and is not necessarily the physical dimension of the text as it would appear when printed. Thus, the text display size of a word may be substantially larger or substantially smaller than the font size, depending on the magnification level at which the document is displayed. For example, a word with font size of 12 pt in a document could be displayed at a text display size of 24 pt by displaying the document at a 200% magnification level.

In some embodiments, displaying the portion of the document at the second magnification level includes displaying an animation of the document zooming from the first magnification level to the second magnification level (616). For example, there may be an animated transition from the magnification level shown in FIG. 5A to the magnification level as shown in FIG. 5C.

In some embodiments, in response to detecting the first input, the device performs an operation selected from the set consisting of: placing a text cursor at the first insertion point, selecting a cell of a spreadsheet proximate to the first insertion point for editing, and highlighting text proximate to the first insertion point (618). For example, in response to the detection of gesture 504 (FIG. 5A), insertion point marker 518 is inserted at insertion point 506 (FIG. 5C).

In some embodiments, in response to detecting the first input, the device scrolls the document so that the first insertion point is in a central region of a displayed portion of the document (620). In some embodiments, the document is scrolled in one dimension (e.g., horizontally or vertically). In some embodiments, the document is scrolled or translated in two dimensions (e.g., horizontally and vertically). For example, in FIG. 5C, insertion point marker 518 (marking insertion point 506) is approximately centered in the displayed part of document portion 520. Scrolling of document 500 may be needed, when transitioning from the magnification level shown in FIG. 5A to the magnification level shown in FIG. 5C, to achieve the centering.

In some embodiments, the electronic device includes a touch-sensitive surface, and the first input is detected on the touch-sensitive surface (622). In some embodiments, the touch-sensitive surface is separate from the display. In some embodiments, the touch-sensitive surface and the display are combined as a touchscreen display. For example, display 112 on device 100 is a touch screen, and gesture 504 is detected on touch screen 112.

In some embodiments, the first input is a single tap on the touch-sensitive surface (624). For example, gesture 504 (FIG. 5A) may be a single tap gesture.

In some embodiments, the electronic device includes a touch-sensitive surface, and the first input includes detecting a contact on the touch-sensitive surface, detecting movement of the contact on the touch-sensitive surface, and ceasing to detect the contact on the touch-sensitive surface (626). For example, in FIG. 5B, gesture 514 includes a contact on touch screen 112, any movement as needed to move insertion point marker 518 to the desired insertion point location, and liftoff of the contact from touch screen 112.

In some embodiments, while detecting movement of the contact on the touch-sensitive surface, the device displays a magnified portion of the document corresponding to a current location of the contact on the touch-sensitive surface, where the first insertion point is selected based on a position of the contact on the touch-sensitive surface when the device ceases to detect the contact on the touch-sensitive surface (628). In some embodiments, the magnified portion of the document has the appearance of a loupe and enables more accurate selection of the first insertion point. For example, in FIG. 5B, loupe 516 is displayed. Loupe 516 shows a magnified view of text 508 around insertion point marker 518, which is located at a location in document 500 corresponding to the location of the contact of gesture 514. The location of insertion point marker 518 is confirmed when the contact of gesture 514 lifts off from touch screen 112.

In some embodiments, in response to detecting the first input, the device enters a document-editing mode (630). For example, in FIG. 5C, in response to gesture 504 or 514, document portion 520 is displayed in document editing mode. Keyboard 521 is displayed, and "documents" button 512 is replaced by "done" button 522. Thus, a single input (e.g., a tap gesture or a tap and hold gesture) results in: entering edit mode, placing a text cursor, zooming to a different magnification level with a comfortable text display size, scrolling the document to place the insertion point in a central region of the display, and displaying a soft keyboard.

In some embodiments, the electronic device enters the document-editing mode in response to detecting an end of the first input (e.g., when the display is a touchscreen display, detecting the end of the input is typically detecting liftoff of a contact from the touchscreen display) (632). For example, document 500 is displayed in document editing mode (as in FIG. 5C) in response to the end of gesture 504 or 514.

In some embodiments, in response to detecting the first input, the device displays a soft keyboard on the display (634). For example, in response to gesture 504, along with the display of document 500 in document editing mode, keyboard 521 is displayed (FIG. 5C).

In some embodiments, while in the document-editing mode, the device edits text of the document in response to user inputs (636). For example, in FIG. 5C-5D, text portion 508 may be edited in response to user typing on keyboard 521.

In some embodiments, the document is one of a plurality of documents (638). Prior to entering the document-editing mode, the device displays a navigation affordance (e.g., documents button) for navigating between different documents in a set of documents (640). After entering the document-editing mode, the device replaces the navigation affordance with an exit affordance (e.g., done button) for exiting the document-editing mode (642). For example, In FIG. 5A, "documents" button 512 is displayed. In FIG. 5C, when document 500 is displayed in document editing mode, "documents" button 512 is replaced by "done" button 522.

In some embodiments, the device receives a request to exit the document-editing mode (644); and, in response to receiving the request to exit the document-editing mode (646), exits the document-editing mode (648) and displays the document at the first magnification level. (e.g., returns to prior magnification level) (650). For example, in FIG. 5D, gesture 524 is detected on "done" button 522. In response to the detection of gesture 524 on "done" button 522, document 500 is displayed in document viewing mode at fit whole page magnification (as shown in FIG. 5E), which is the same magnification level as in FIG. 5A.

In some embodiments, the device receives a request to exit the document-editing mode (652); and, in response to receiving the request to exit the document-editing mode (654), exits the document-editing mode (656) and displays the document at a third magnification level that corresponds to a predefined document magnification level different from the first magnification level (e.g., a page width magnification level) (658). For example, in FIG. 5D, gesture 524 is detected on "done" button 522. In response to the detection of gesture 524 on "done" button 522, document 500 may be displayed at a magnification level different than the magnification level shown in FIG. 5A (not shown).

In some embodiments, while in the document-editing mode, the device scrolls the document in response to detecting inputs from a user (660); and, after exiting the document-editing mode, redisplays the document as it appeared when the first input was detected (662). In other words, the document is scrolled and zoomed so as to reposition the document at the same magnification level and scroll position that it was displayed at prior to entering the edit mode. It should be understood that the document may be scrolled in one or two dimensions while in edit mode. For example, in FIG. 5C, document 500 is scrollable while in document editing mode. After exiting document editing mode in response to detection of gesture 524, document 500 is displayed at the same magnification level as when gesture 504 is detected in FIG. 5A.

In some embodiments, the target text display size at which the first portion of text is displayed in response to detecting the first input is a default target text display size (664). While displaying the portion of the document that includes the first portion of text at the second magnification level, the device detects a second input corresponding to a request to display a portion of the document at a third magnification level different from the second magnification level (666). In response to detecting the second input (668), the device displays the portion of the document at the third magnification level (670) and stores a user-adjusted target text display size corresponding to a text display size of the first portion of text at the third magnification level (672), where the user-adjusted target text display size is different from the default target text display size. After storing the user-adjusted target text display size (674), the device detects a third input indicating a second insertion point in the document, where the second insertion point is proximate to a second portion of text in the document (676); and in response to detecting the third input, displays the document at a respective magnification level such that the second portion of text is displayed at the user-adjusted target text display size (678). For example, in FIGS. 5C and 5G, text portion 508 is displayed at a text display size that may be a default text display size as a result of document portion 520 being displayed at the second magnification level. In FIG. 5G, gesture 534 to adjust the magnification level is detected. In response to the detection of gesture 534, document portion 520 is displayed at a user-adjusted magnification level (as shown in FIG. 5H), and a text display size corresponding to the user-adjusted magnification level is stored. Subsequently, gesture 536 (FIG. 5I) indicating insertion point 538 is detected. In response to the detection of gesture 536, document portion 541 is displayed at the user-adjusted magnification level so that text portion 540 is displayed at the stored text display size (instead of the prior default text display size in FIGS. 5A and 5G), as shown in FIG. 5J.

In some embodiments, the first portion of text has a first font size (680). While displaying the portion of the document that includes the first portion of text at the second magnification level, the device detects a second input indicating a second insertion point in the document (682), where the second insertion point is proximate to a second portion of text in the document, and the second portion of text has a second font size different from the first font size. In response to detecting the second input (684), the device selects a third magnification level different from the second magnification level (686), where the third magnification level is selected so as to display the second portion of text at the target text display size, and displays a portion of the document at the third magnification level (688). For example, text portion 508 has a font size, and is displayed at a text display size (FIG. 5C). A gesture indicating another insertion point proximate to a text portion with a different font size, analogous to gesture 554 (FIG. 5M), may be detected. In response to the gesture, text in the text portion with the different font size is displayed at a certain magnification level so that that text is displayed at a same text display size as text portion 508.

In some embodiments, after displaying the portion of the document that includes the first portion of text at the second magnification level (690), the device detects a content selection input (692). In response to detecting the content selection input (694), the device identifies a selected portion of the document in accordance with the content selection input (696), and in accordance with a determination that the selected portion of the document includes content that is outside of a currently displayed portion of the document, the device adjusts display of the document so that the entire selected portion of the document is displayed on the display (698). For example, a content selection input similar to gesture 566 (FIG. 5O) on content selection handle 564-B may be detected. In response to the detection of gesture 566, text in document 500 may be selected. If the selected text includes portion outside of a currently displayed portion, the magnification level of document 500 may be adjusted to display the entire selected text.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700, 800, 900, 1000, and 1100 (e.g., FIGS. 7A-7B, 8A-8B, 9A-9B, 10, and 11A-11B, respectively) are also applicable in an analogous manner to method 600 described above with respect to FIGS. 6A-6E. For example, the electronic document, insertion point and various magnification levels described above with reference to method 600 may have one or more of the characteristics of the electronic document, insertion point and various magnification levels described herein with reference to methods 700, 800, 900, 1000, and 1100. For brevity, these details are not repeated here.

Figure 7A:
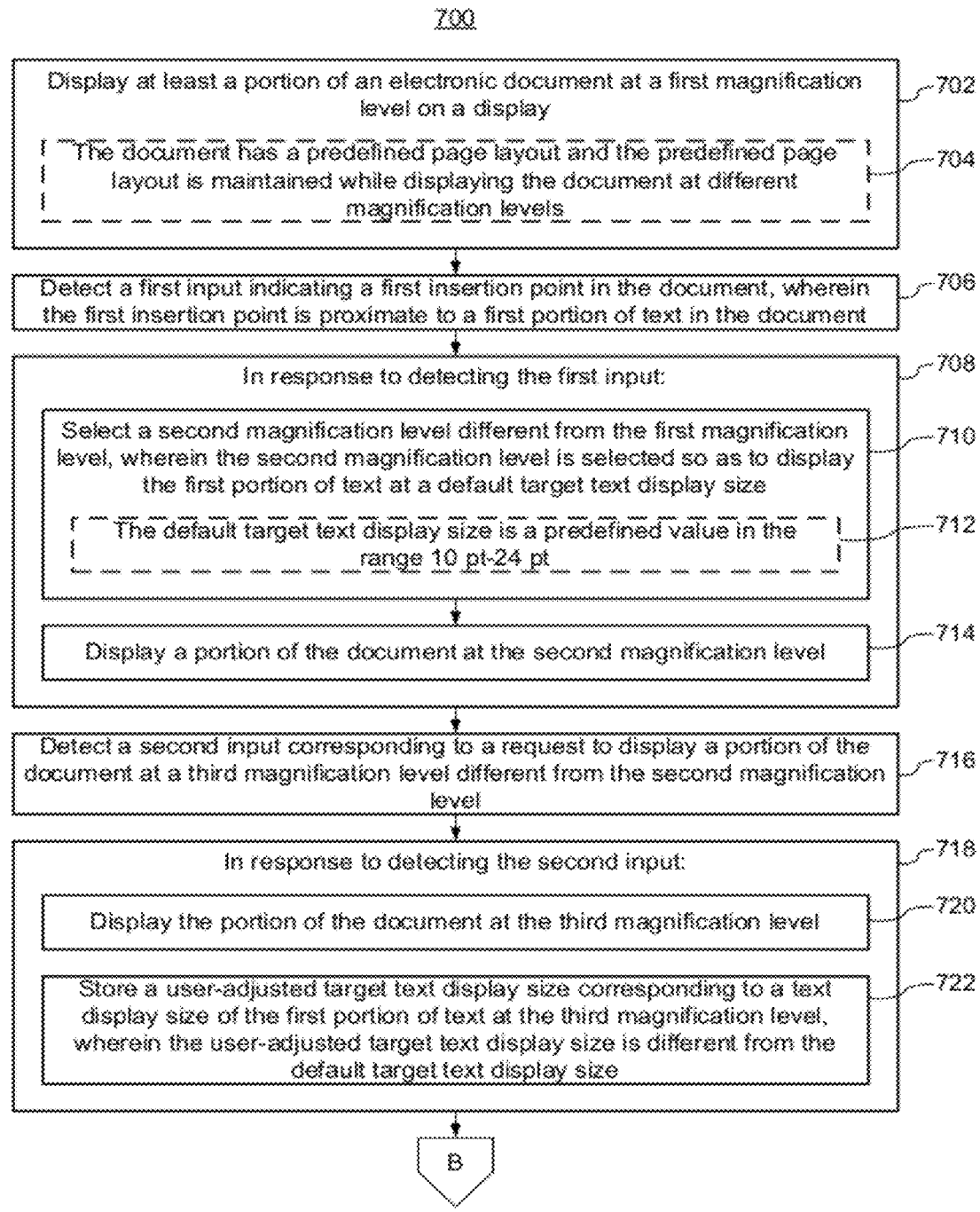
FIGS. 7A-7B are flow diagrams illustrating a method of navigating and editing an electronic document in accordance with some embodiments.
Figure 7B:
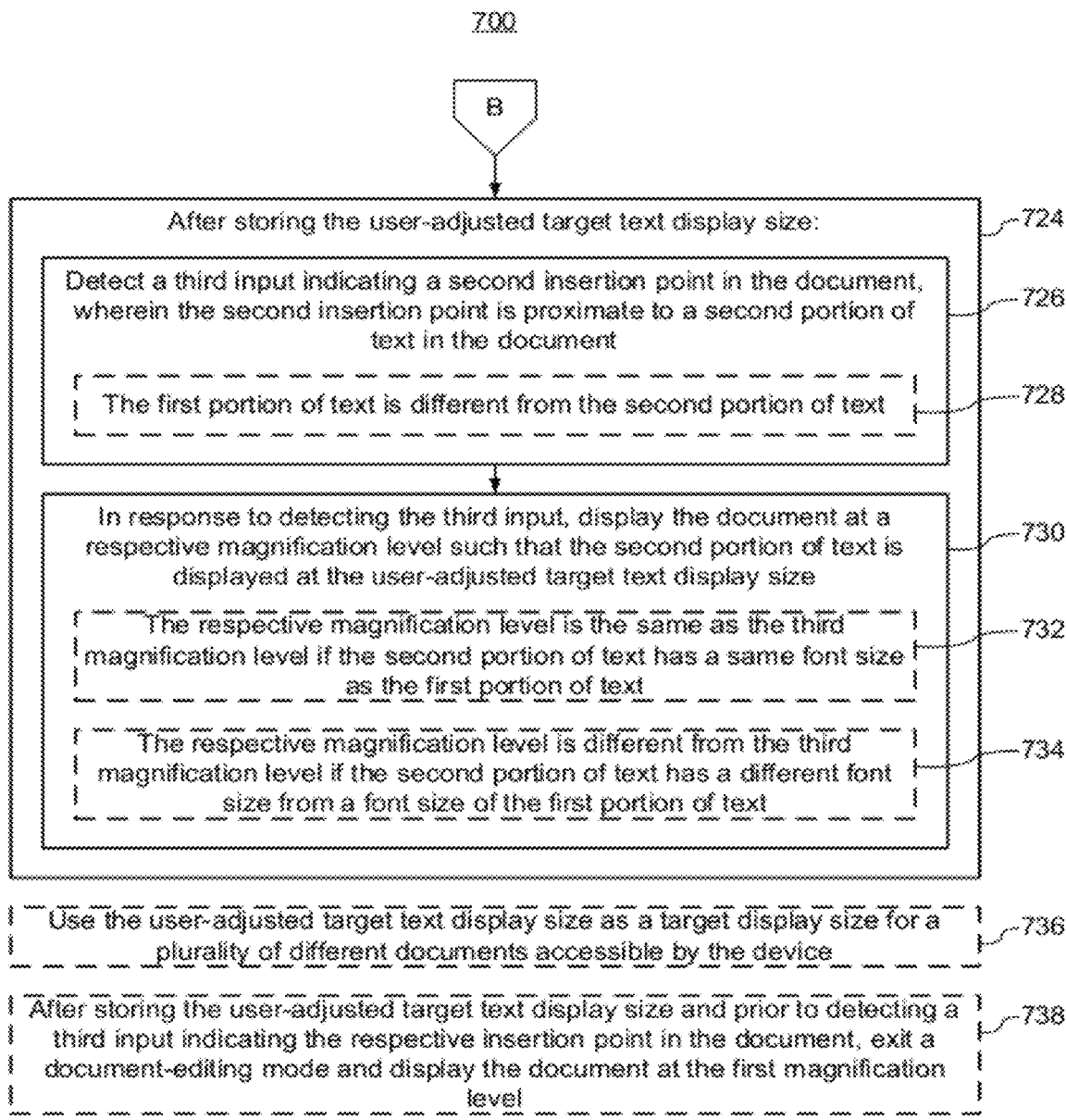

FIGS. 7A-7B are flow diagrams illustrating a method 700 of navigating and editing an electronic document in accordance with some embodiments. The method 700 is performed at an electronic device (e.g., device 300, FIG. 3, or portable multifunction device 100, FIG. 1) with a display and a, typically, touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to modify the target text display size from a default value to a user-adjusted value. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays at least a portion of an electronic document at a first magnification level on the display (702). For example, in FIG. 5F, document 500 is displayed at a fit whole page magnification level.

In some embodiments, the document has a predefined page layout and the predefined page layout is maintained while displaying the document at different magnification levels (704).

The device detects a first input indicating a first insertion point in the document, wherein the first insertion point is proximate to a first portion of text in the document (706). For example, in FIG. 5F, gesture 526 is detected. The location of gesture 526 indicates insertion point 506, which is proximate to text portion 508.

In response to detecting the first input (708), the device selects a second magnification level different from the first magnification level, where the second magnification level is selected so as to display the first portion of text at a default target text display size (710), and displays a portion of the document at the second magnification level (714). For example, in FIG. 5G, in response to detecting gesture 526, document portion 520 is displayed at a different magnification level from the fit whole page magnification level shown in FIG. 5F. The different magnification level is one that is selected by device 100 such that text portion 508 (adjacent to the insertion point) is displayed at a default target text display size.

In some embodiments, the default target text display size is a predefined value in the range 10 pt-24 pt (712).

The device detects a second input corresponding to a request to display a portion of the document at a third magnification level different from the second magnification level (716). For example, in FIG. 5G, depinch gesture 534 to change the magnification level is detected.

In response to detecting the second input (718), the device displays the portion of the document at the third magnification level (720), and stores a user-adjusted target text display size corresponding to a text display size of the first portion of text (e.g., the text adjacent to the first insertion point) at the third magnification level, where the user-adjusted target text display size is different from the default target text display size (722). For example, in response to the detection of gesture 534, document portion 520 is displayed at yet another magnification level (FIG. 5H). At this user-adjusted magnification level, text portion 508 has a particular text display size. This text display size is stored as a user-adjusted target text display size.

In some embodiments, the user-adjusted target text display size is only stored when the text display size of the first portion of text meets predefined text display size criteria (e.g., in accordance with a determination that the text display size of the first portion of text is within a range of values that are "allowable" target text display sizes). In other words, the input is ignored for the purposes of storing a user-adjusted target display size if the user zooms to a magnification level at which text is either too large (e.g., greater than 72 pt) or too small (e.g., smaller than 10 pt) for a typical user to comfortably read, because the user is likely zooming the document for some purpose other than editing text proximate to the insertion point.

After storing the user-adjusted target text display size (724), the device detects a third input indicating a second insertion point in the document, where the second insertion point is proximate to a second portion of text in the document (726), and, in response to detecting the third input, displays the document at a respective magnification level such that the second portion of text is displayed at the user-adjusted target text display size (730). It should be understood that the first portion of text may be the same as or different from the second portion of text. For example, in FIG. 5I, gesture 536 is detected. Gesture 536 indicates insertion point 538, which is proximate to text portion 540. In response to the detecting gesture 536, document portion 541 is displayed at a magnification level such that text portion 540 is displayed at the stored user-adjusted target text display size (FIG. 5J).

It should be understood that this process could be repeated any number of times to set a new user-adjusted target text display size. However, typically, a user will determine a preferred target text display size and thus the user will not need to continually adjust the user-adjusted target text display size. Rather, the user will find that the target text display size used for the whole document (or set of documents) is the user's preferred target text display size, which will improve user efficiency and enhance user productivity.

In some embodiments, the user-adjusted target text display size is ignored or discarded when the user-adjusted target text display size is not within predefined text display size criteria. Optionally, the predefined text display size criteria include an upper bound (e.g., a text display size between 48 pt-80 pt) and a lower bound of (e.g., a text display size between 10 pt-18 pt). Thus, in these embodiments, when the text display size of the first portion of text at the third magnification level is outside of the predefined text display size criteria (e.g., above the upper bound or below the lower bound), the device continues to use the default target text display size or the last user-adjusted target text display size that was within the predefined text display size criteria. For example, if a user zooms out to display a whole page (e.g., at 4 pt text display size) of a document in a document-editing mode immediately prior to exiting the document-editing mode, the device either reverts to the default target text display size (e.g., 17 pt) or a prior user-adjusted target text display size (e.g., 15 pt). Thus, in this example, when the device re-enters document-editing mode, the device displays the document at a respective magnification level such that the respective portion of text is comfortably readable (e.g., 17 pt or 15 pt rather than 4 pt).

In some embodiments, the first portion of text is different from the second portion of text (728). For example, text portion 508 (FIG. 5H) is different from text portion 540 (FIG. 5J). In other words, the user-adjusted target text display size may be used as a target text display size for many different locations within the same document.

In some embodiments, the device uses the user-adjusted target text display size as a target display size for a plurality of different documents accessible by the device (736). In other words, the user-adjusted target text display size may also be used as a target text display size for many different documents on the device.

In some embodiments, the respective magnification level is the same as the third magnification level if the second portion of text has a same font size as the first portion of text (732). In other words, when the cursor moves between text with the same font size, the document is not zoomed to a different magnification level.

In some embodiments, the respective magnification level is different from the third magnification level if the second portion of text has a different font size from a font size of the first portion of text (734). In other words, when the cursor moves between text with different font sizes, the document is zoomed to a different magnification level.

In some embodiments, after storing the user-adjusted target text display size and prior to detecting a third input indicating the respective insertion point in the document, the device exits a document-editing mode and displays the document at the first magnification level (738). For example, in FIG. 5H, after the user-adjusted target text display size is stored, gesture 536 is detected on "done" button 522. In response to the detection of gesture 536, document 500 is displayed again at the magnification level in FIG. 5F, as shown in FIG. 5I.

It should be understood that the particular order in which the operations in FIGS. 7A-7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 800, 900, 1000, and 1100 (e.g., FIGS. 6A-6E, 8A-8B, 9A-9B, 10, and 11A-11B, respectively) are also applicable in an analogous manner to method 700 described above with respect to FIGS. 7A-7B. For example, the electronic document, insertion point and various magnification levels described above with reference to method 700 may have one or more of the characteristics of the electronic document, insertion point and various magnification levels described herein with reference to methods 600, 800, 900, 1000, and 1100. For brevity, these details are not repeated here.

Figure 8A:
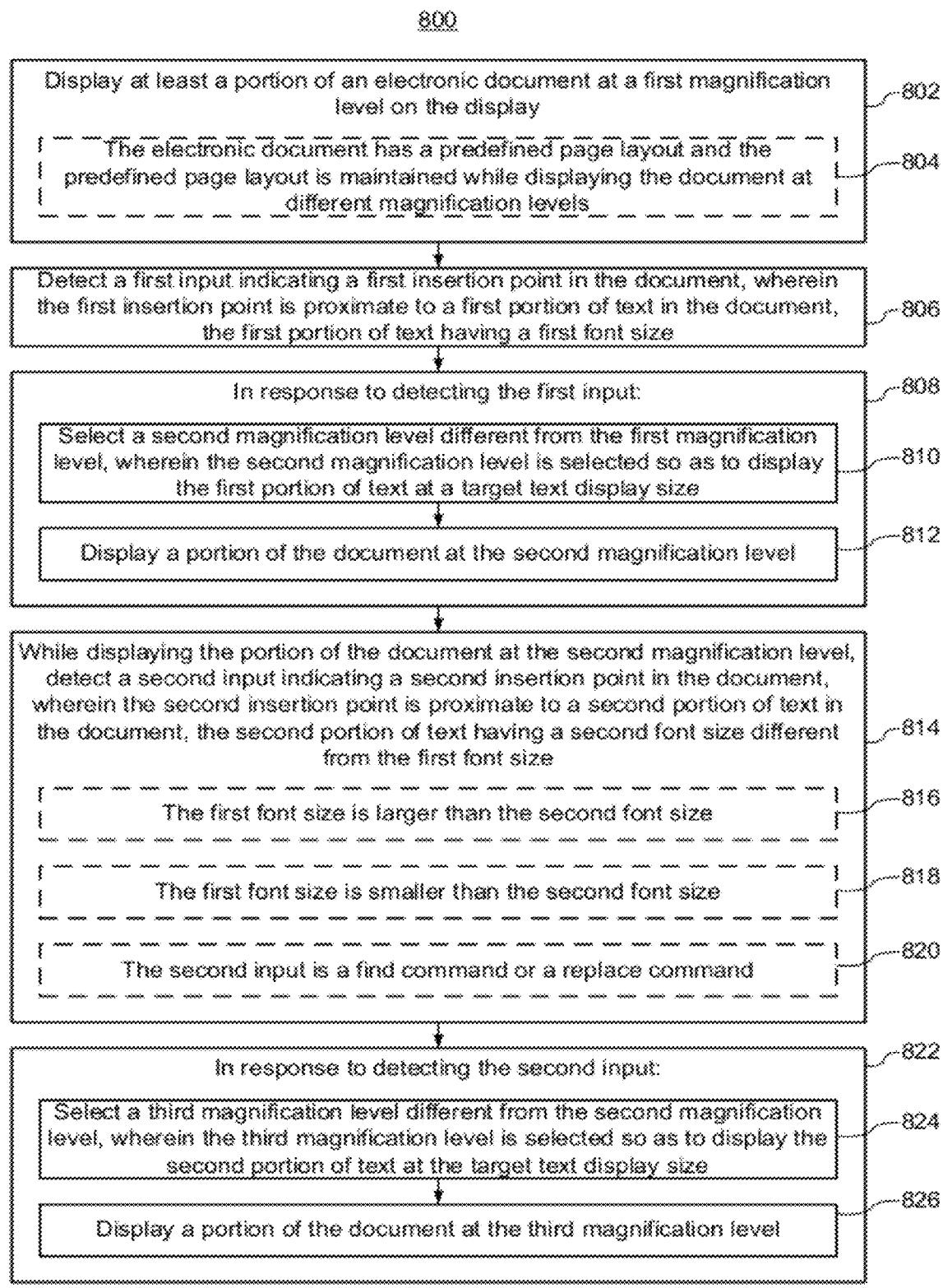
FIGS. 8A-8B are flow diagrams illustrating a method of navigating and editing an electronic document in accordance with some embodiments.
Figure 8B:
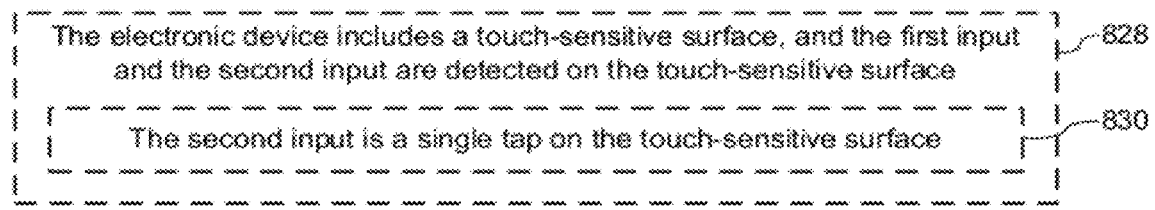

FIGS. 8A-8B are flow diagrams illustrating a method 800 of navigating and editing an electronic document in accordance with some embodiments. The method 800 is performed at an electronic device (e.g., device 300, FIG. 3, or portable multifunction device 100, FIG. 1) with a display, typically, and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to automatically adjust the display magnification to maintain a target text display size as the insertion point is moved between areas in a document with different font sizes. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays at least a portion of an electronic document at a first magnification level on the display (802).

For example, in FIG. 5K, document 542 is displayed at some magnification level on touch screen 112.

In some embodiments, the electronic document has a predefined page layout and the predefined page layout is maintained while displaying the document at different magnification levels (804). For example, document 542 has a predefined layout that is maintained across different magnification levels.

The device detects a first input indicating a first insertion point in the document (806), where the first insertion point is proximate to a first portion of text in the document, the first portion of text having a first font size. Alternatively, the first font size is a font size at the insertion point (e.g., when there is an insertion point marker such as a text cursor, the first font size is a font size that would be used for text entered at the text cursor). For example, in FIG. 5K, gesture 548 is detected. The location of gesture 548 indicates insertion point 550, which is in proximity to text portion 552.

In response to detecting the first input (808), the device selects a second magnification level different from the first magnification level, where the second magnification level is selected so as to display the first portion of text at a target text display size (810); and displays a portion of the document at the second magnification level (812). For example, in FIG. 5L, in response to the detection of gesture 548 (FIG. 5K), document portion 546 is displayed at a magnification level different from the level at which document 542 is displayed in FIG. 5K. The magnification level at which document portion 546 is displayed in FIG. 5L is selected so that text portion 552 is displayed at a target text display size.

It should be understood that the target text display size is a predefined target text display size (e.g., either a default target text display size or a previously stored user-adjusted target text display size, as described in greater detail above with reference to method 700 and FIGS. 7A-7B).

While displaying the portion of the document at the second magnification level, the device detects a second input indicating a second insertion point in the document (814), where the second insertion point is proximate to a second portion of text in the document, the second portion of text having a second font size different from the first font size. For example, in FIG. 5M, gesture 554 is detected. Gesture 554 indicates insertion point 555, which is in proximity to text portion 556 in document portion 544. Text in document portion 544, including text portion 556, have a different font size from text portion 552 (FIG. 5L). The second input may include, in addition to gesture 554, gestures to scroll from document portion 546, where text portion 552 is located, to document portion 544.

In some embodiments, the first font size is larger than the second font size (816).

In some embodiments, the first font size is smaller than the second font size (818).

In response to detecting the second input (822), the device selects a third magnification level different from the second magnification level (824), where the third magnification level is selected so as to display the second portion of text at the target text display size; and displays a portion of the document at the third magnification level (826). For example, in response to detection of gesture 554 (FIG. 5M), document portion 544 is displayed at a different magnification level (FIG. 5N), such that text portion 556 is displayed at the same text display size as text portion 552 is displayed (the target text display size) in FIG. 5L.

In some embodiments, if the difference between first font size and second font size is below a predefined threshold (e.g., <3 pt difference), in response to detecting the second input, the device maintains display of the document at the second magnification level (e.g., so as to prevent frequent small changes to the magnification level of the document that could appear as unnecessary jitter to a user).

In some embodiments, the second input is a find command or a replace command (820). In other words, as the device switches from one occurrence of a term to a next occurrence of the term in the document, the device changes the magnification level at which the document is displayed in accordance with a font size of the next occurrence of the term in the document.

In some embodiments, the electronic device includes a touch-sensitive surface, and the first input and the second input are detected on the touch-sensitive surface (828). In some embodiments, the second input is a single tap on the touch-sensitive surface (830). In some embodiments, the touch-sensitive surface is separate from the display. In some embodiments, the touch-sensitive surface and the display are combined as a touchscreen display. For example, gestures 550 and 554 are detected on touch screen 112.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 900, 1000, and 1100 (e.g., FIGS. 6A-6E, 7A-7B 9A-9B, 10, and 11A-11B, respectively) are also applicable in an analogous manner to method 800 described above with respect to FIGS. 8A-8B. For example, the electronic document, insertion point and various magnification levels described above with reference to method 800 may have one or more of the characteristics of the electronic document, insertion point and various magnification levels described herein with reference to methods 600, 700, 900, 1000, and 1100. For brevity, these details are not repeated here.

Figure 9A:
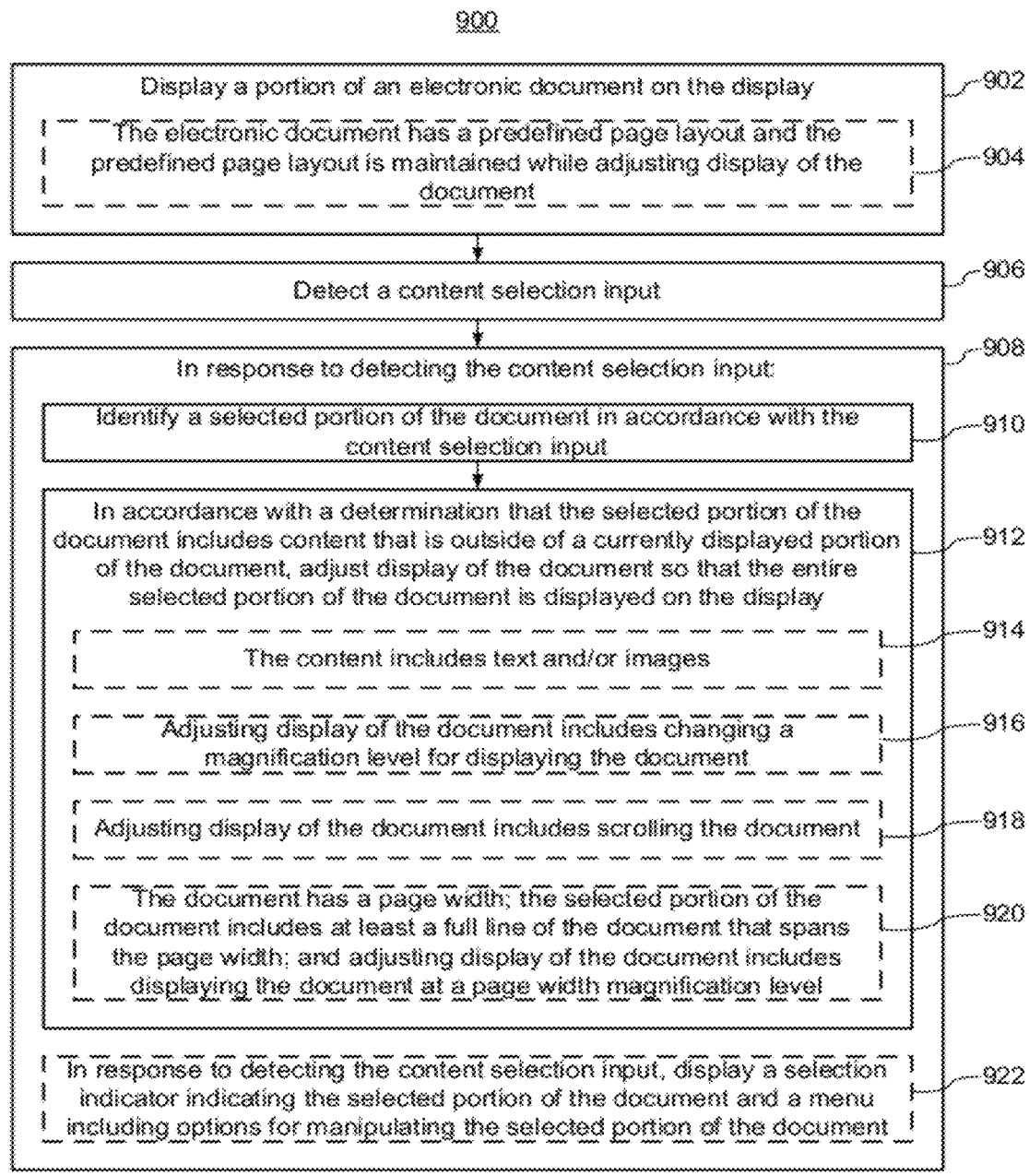
FIGS. 9A-9B are flow diagrams illustrating a method of navigating and editing an electronic document in accordance with some embodiments.
Figure 9B:
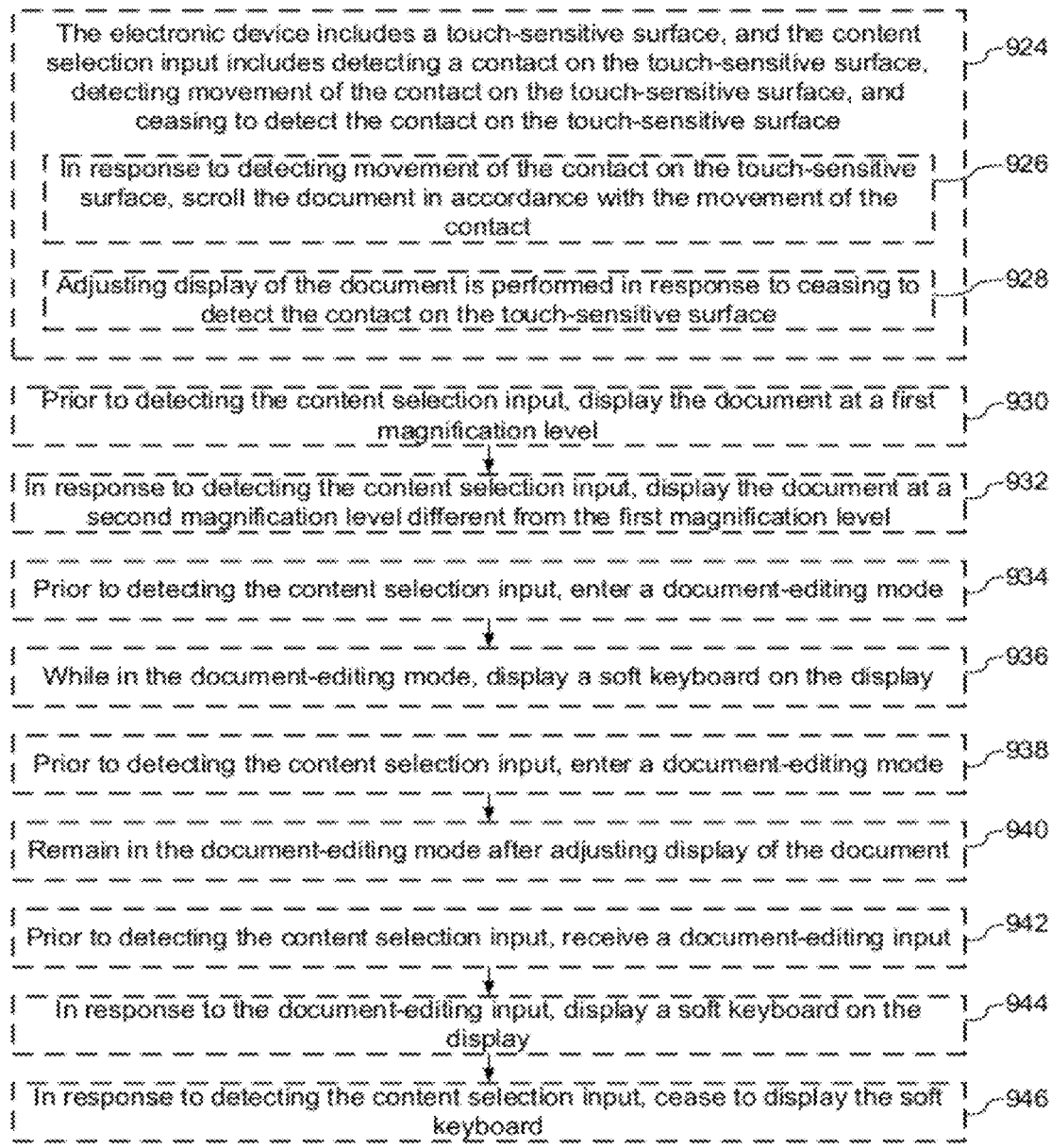

FIGS. 9A-9B are flow diagrams illustrating a method 900 of navigating and editing an electronic document in accordance with some embodiments. The method 900 is performed at an electronic device (e.g., device 300, FIG. 3, or portable multifunction device 100, FIG. 1) with a display and, typically, a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to automatically zooming out at the completion of a text selection gesture to see the entire portion of text that has been selected. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays a portion of an electronic document on the display (902). For example, in FIG. 5O, a portion of document 558 is displayed.

In some embodiments, the electronic document has a predefined page layout and the predefined page layout is maintained while adjusting display of the document (904). For example, document 558 has a predefined layout.

The device detects a content selection input (906). For example, gesture 566 dragging selection handle 564-B is detected (FIG. 5O).

In response to detecting the content selection input (908), the device identifies a selected portion of the document in accordance with the content selection input (910), and in accordance with a determination that the selected portion of the document includes content that is outside of a currently displayed portion of the document, the device adjusts display of the document so that the entire selected portion of the document is displayed on the display (912). For example, in response to the detection of gesture 566 changing selection range 560 (FIGS. 5O-5Q), the portion of document 558 that is selected by selection range 560 is identified. If it is determined that the selected portion (e.g., text 562, FIG. 5Q) includes content outside a currently displayed portion of document 558, document 558 is displayed at a different magnification level so that the entirety of selected text 562 is displayed, as shown in FIG. 5R.

It should be understood that, as used herein, "outside" means the portion of selected content that extends beyond the currently displayed portion (e.g., at least some of the selected content is not currently displayed). In some embodiments, adjusting the display of the document is performed automatically without user intervention in response to detecting the content selection input or detecting an end of the content selection input.

In some embodiments, the electronic device includes a touch-sensitive surface, and the content selection input includes detecting a contact on the touch-sensitive surface, detecting movement of the contact on the touch-sensitive surface, and ceasing to detect the contact on the touch-sensitive surface (924). For example, display 112 of device 100 is a touch screen. Gesture 566 detected on touch screen 112 includes a contact, movement of the contact, and ceasing of the contact (FIG. 5O-5Q).

In some embodiments, in response to detecting movement of the contact on the touch-sensitive surface, the device scrolls the document in accordance with the movement of the contact (926). In other words, when the display is a touchscreen display and the content selection input includes movement of a contact on the touchscreen display, when the contact moves proximate to an edge of the display, the document is scrolled so as to enable the user to select text outside of the portion of the document that was initially displayed when the contact was initially detected on the touchscreen display.

In some embodiments, adjusting display of the document is performed in response to ceasing to detect the contact on the touch-sensitive surface (928). For example, the entire selection range 560 is shown (FIG. 5R) when the contact of gesture 566 ceases to be detected.

In some embodiments, the content includes text and/or images (914).

In some embodiments, adjusting display of the document includes changing a magnification level for displaying the document (916). For example, from FIGS. 5Q-5R, the magnification level of document 558 was changed, going from a non-page-fit magnification level to a fit whole page magnification level.

In some embodiments, adjusting display of the document includes scrolling the document (918). It should be understood that the document could be scrolled horizontally, vertically, or both horizontally and vertically.

In some embodiments, the document has a page width, the selected portion of the document includes at least a full line of the document that spans the page width, and adjusting display of the document includes displaying the document at a page width magnification level (920). In other words, the document is displayed at a magnification level where the width of the document on the display is approximately equal to the width of the display.

In some embodiments, prior to detecting the content selection input, the device displays the document at a first magnification level (930), and in response to detecting the content selection input, displays the document at a second magnification level different from the first magnification level (932).

In some embodiments, prior to detecting the content selection input, the device enters a document-editing mode (934), and while in the document-editing mode, displays a soft keyboard on the display (936). For example, in FIG. 5O, document 558 is displayed in document editing mode, and keyboard 521 is displayed.

In some embodiments, prior to detecting the content selection input, the device enters a document-editing mode (938), and remains in the document-editing mode after adjusting display of the document (940).

In some embodiments, prior to detecting the content selection input, the device receives a document-editing input (942), in response to the document-editing input, displays a soft keyboard on the display (944), and in response to detecting the content selection input (e.g., after zooming out to a page width magnification level), ceases to display the soft keyboard (946). For example, in FIG. 5O, keyboard 521 is displayed prior to detection of gesture 566, and in FIG. 5R keyboard 521 ceases to be displayed in response to gesture 566.

In some embodiments, in response to detecting the content selection input, the device displays a selection indicator indicating the selected portion of the document and a menu including options for manipulating the selected portion of the document (922). For example, selection range 560 and selection options menu 569 (FIG. 5R) is displayed in response to gesture 566.

In some embodiments, prior to detecting the content selection input, the device displays a preliminary selection indicator with a first plurality of selection adjustment affordances; and after adjusting display of the document, the device displays an updated selection indicator with either one or more of the first plurality of selection adjustment affordances in different locations in the document (e.g., advanced by one or more words) or a second plurality of different selection adjustment affordances. In particular, when the preliminary selection indicator indicates a selection within a paragraph, the first plurality of selection adjustment affordances enable the preliminary selection to be expanded and/or contracted by a first unit of content; and (e.g., character by character, word by word, or line by line). However, when the updated selection indicator indicates a selection including at least one paragraph break character (e.g., a selection that extends between two adjacent paragraphs) the second plurality of selection adjustment affordances enable the selected portion of the document to be expanded and/or contracted by a second unit of content larger than the first unit of content (e.g., paragraph by paragraph, or section by section).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 1000, and 1100 (e.g., FIGS. 6A-6E, 7A-7B, 8A-8B, 10, and 11A-11B, respectively) are also applicable in an analogous manner to method 900 described above with respect to FIGS. 9A-9B. For example, the electronic document, insertion point and various magnification levels described above with reference to method 900 may have one or more of the characteristics of the electronic document, insertion point and various magnification levels described herein with reference to methods 600, 700, 800, 1000, and 1100. For brevity, these details are not repeated here.

Figure 10:
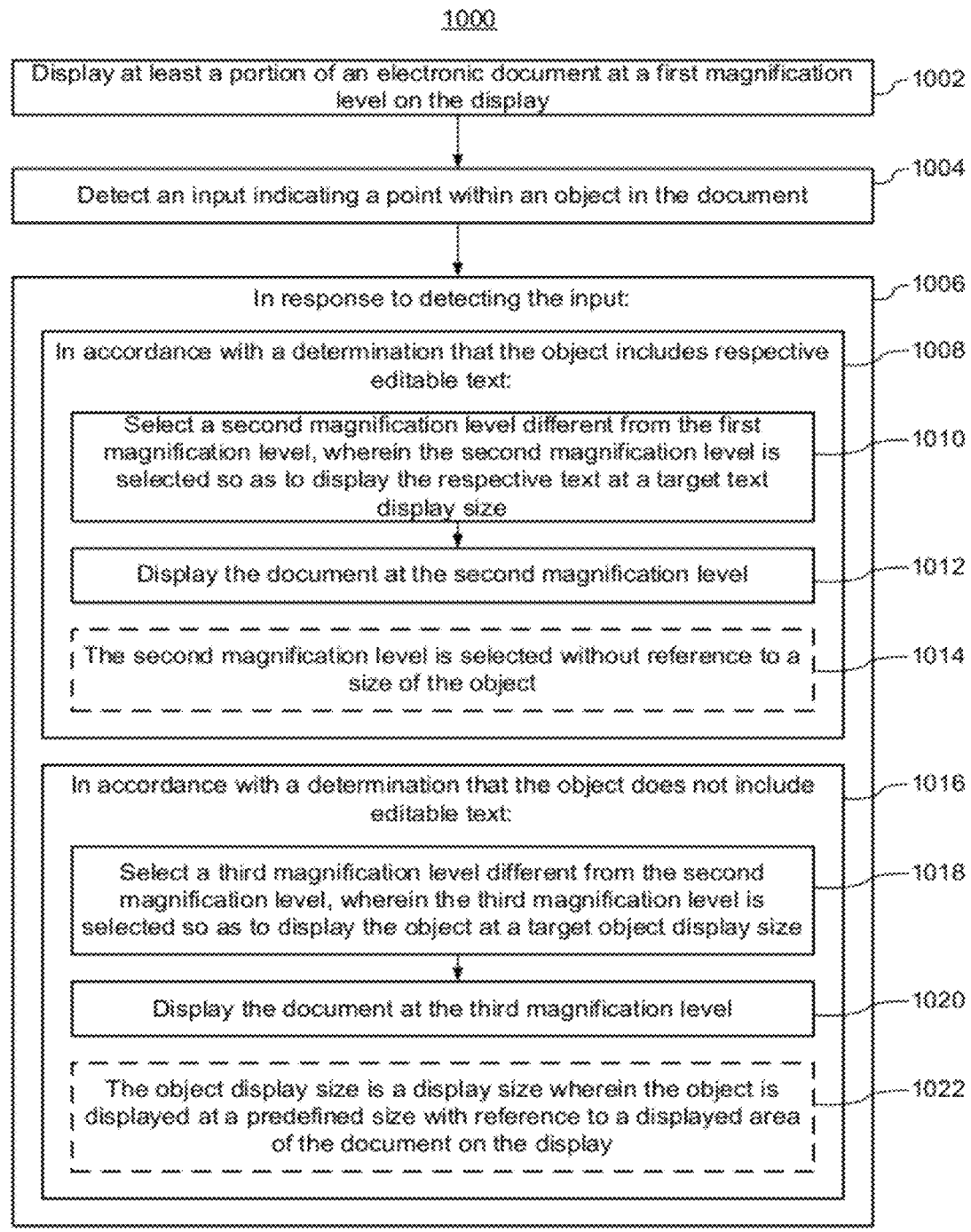
FIG. 10 is a flow diagram illustrating a method of navigating and editing an electronic document in accordance with some embodiments.

FIG. 10 is a flow diagram illustrating a method 1000 of navigating and editing an electronic document in accordance with some embodiments. The method 1000 is performed at an electronic device (e.g., device 300, FIG. 3, or portable multifunction device 100, FIG. 1) with a display and, typically, a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to automatically zoom to display an object at a size that accommodates the object or, when the object contains editable text, automatically zoom to display the editable text within the object at a size that accommodates the text. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays at least a portion of an electronic document at a first magnification level on the display (1002). For example, in FIG. 5T, document 570 is displayed at a certain magnification level.

The device detects an input indicating a point within an object in the document (1004). In some embodiments, the point is an insertion point (e.g., a point where the device will insert additional content such as text or other objects) in response to a user request to insert content. In some embodiments, the point is proximate to the object but within a hit region for the document that extends beyond the perimeter of the object. For example, in FIG. 5T, the location of gesture 582 indicates a point in object 572 in document 570, and the location of gesture 580 indicates a point in object 576.

In response to detecting the input (1006), in accordance with a determination that the object includes respective editable text (1008), the device selects a second magnification level different from the first magnification level (1010), where the second magnification level is selected so as to display the respective text at a target text display size, and displays the document at the second magnification level (1012). For example, in response to gesture 582 (FIG. 5T), object 572 is displayed at a magnification level such that text 574 in object 572 is displayed at a target text display size (FIG. 5V).

It should be understood that the target text display size may be either a predefined target text display size or a user-adjusted target text display size, as described above in greater detail with reference to method 700 and FIGS. 7A-7B.

In some embodiments, the second magnification level is selected without reference to (e.g., independently of) a size of the object (1014).

In response to detecting the input (1006), in accordance with a determination that the object does not include editable text (1016), the device selects a third magnification level different from the second magnification level (1018), where the third magnification level is selected so as to display the object at a target object display size, and displays the document at the third magnification level (1020). For example, in response to gesture 580 (FIG. 5T), object 576 is displayed at a best fit magnification level (FIG. 5U).

In some embodiments, the object display size is a display size where the object is displayed at a predefined size with reference to a displayed area of the document on the display (1022). In some embodiments, the object display size is a display size where the object is displayed so that it is as large as possible, while still being fully displayed in the display area (e.g., the object is displayed at a "best fit" size). In other embodiments, the object display size is a display size where the object is displayed so that the width of the object is substantially equal to the width of the display area (optionally, with a predefined buffer between a perimeter of the object and the edge of the display). In other embodiments, the object display size is a display size where the object is displayed so that the height of the object is substantially equal to the height of the display area (optionally, with a predefined buffer between a perimeter of the object and the edge of the display).

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 900, and 1100 (e.g., FIGS. 6A-6E, 7A-7B, 8A-8B, 9A-9B, and 11A-11B, respectively) are also applicable in an analogous manner to method 1000 described above with respect to FIG. 10. For example, the electronic document, insertion point and various magnification levels described above with reference to method 1000 may have one or more of the characteristics of the electronic document, insertion point and various magnification levels described herein with reference to methods 600, 700, 800, 900, and 1100. For brevity, these details are not repeated here.

Figure 11A:
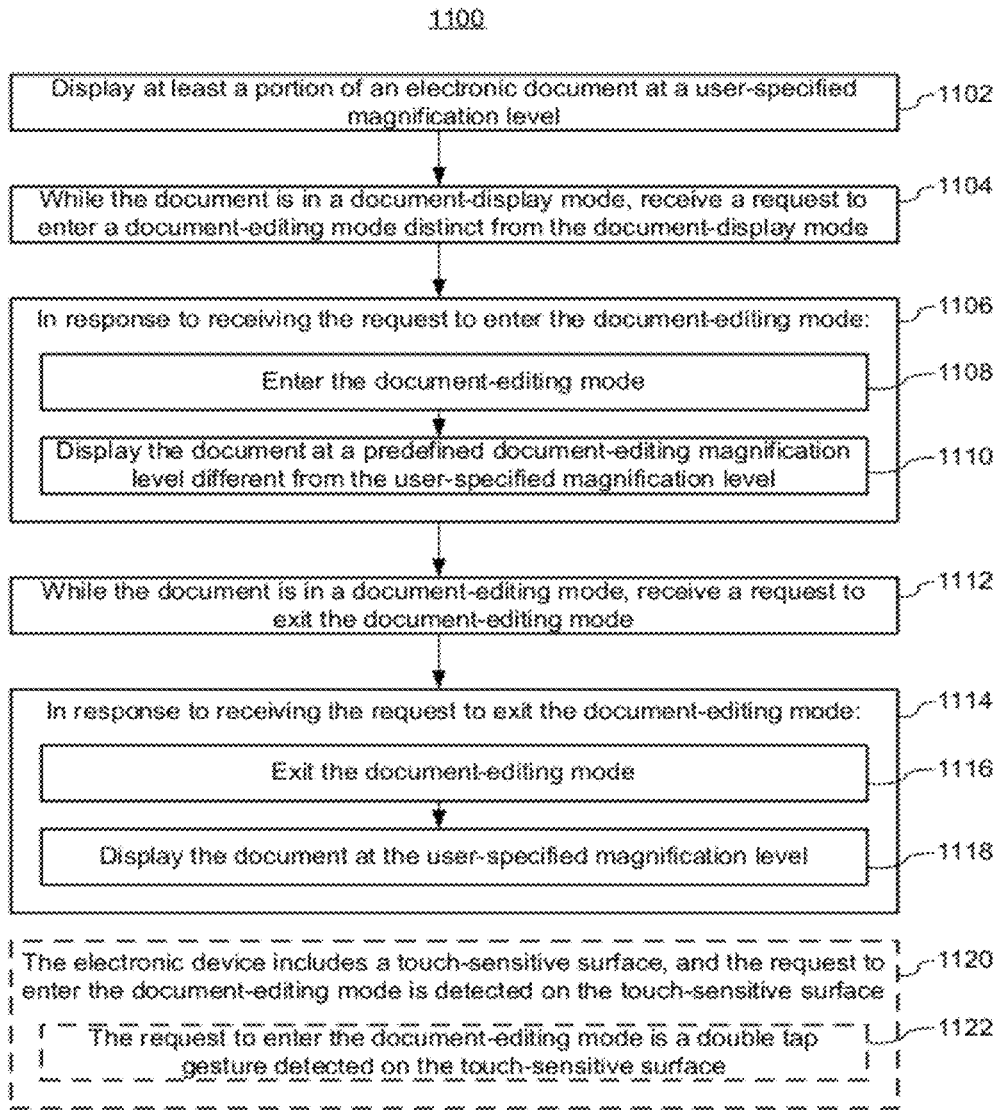
FIGS. 11A-11B are flow diagrams illustrating a method of navigating and editing an electronic document in accordance with some embodiments.
Figure 11B:
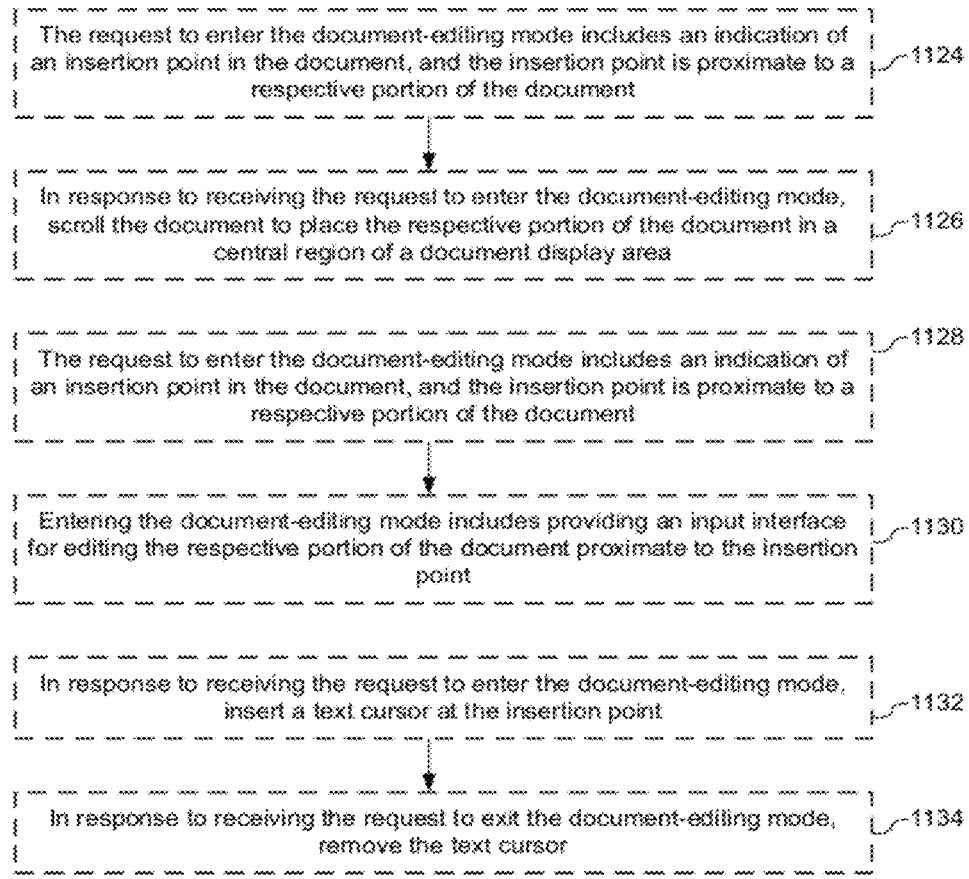

FIGS. 11A-11B are flow diagrams illustrating a method 1100 of navigating and editing an electronic document in accordance with some embodiments. The method 1100 is performed at an electronic device (e.g., device 300, FIG. 3, or portable multifunction device 100, FIG. 1) with a display and, typically, a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to automatically switching back and forth from a user-specified magnification level in a document-display mode to a predefined document-editing magnification level in an editing mode. The method reduces the cognitive burden on a user when navigating and editing an electronic document, thereby creating a more efficient human-machine interface. For battery-operated electronic devices, enabling a user to zoom in on content in a document faster and more efficiently conserves power and increases the time between battery charges.

The device displays at least a portion of an electronic document at a user-specified magnification level (1102). In some embodiments, the user-specified magnification level is a magnification level selected by the user from a plurality of possible magnification levels. For example, the device receives requests to adjust (e.g., increase or decrease) the magnification level of the document (e.g., pinch or depinch gestures on a touchscreen display) prior to receiving a request to enter a document-editing mode. For example, in FIG. 5X, document 584 is displayed at a user-specified magnification level in response to gesture 590 (FIG. 5W).

While the document is in a document-display mode, the device receives a request to enter a document-editing mode distinct from the document-display mode (1104). For example, gesture 592 (FIG. 5X) is a request to enter a document editing mode.

In response to receiving the request to enter the document-editing mode (1106), the device enters the document-editing mode (1108), and displays the document at a predefined document-editing magnification level different from the user-specified magnification level (1110). For example, in FIG. 5Y, in response to gesture 592, document 584 is displayed in document editing mode and at a particular magnification level for editing of a cell (e.g., cell 594) in worksheet 591.

In some embodiments, both entering the document-editing mode and displaying the document at the predefined document-editing magnification level are performed in response to receiving the request automatically, without further user input. Enabling a user to both enter the document-editing mode and zoom the document to a magnification level that is comfortable for editing by performing a single gesture reduces the number of steps that are performed by the user to begin editing the document, thereby increasing efficiency and ease of use of the device. In some embodiments, after displaying the document at the predefined-document editing magnification level, the device receives requests to adjust (e.g., increase or decrease) the magnification level of the document (e.g., pinch or depinch gestures on a touchscreen display) prior to receiving a request to exit the document-editing mode. In these circumstances the device would zoom from the current user-adjusted document-editing magnification level to the prior user-specified magnification level upon exiting the document-editing mode.

While the document is in a document-editing mode, the device receives a request to exit the document-editing mode (1112). For example, in FIG. 5Z, gesture 598 on button 597 is a request to exit document editing mode.

In response to receiving the request to exit the document-editing mode (1114), the device exits the document-editing mode (1116) and displays the document at the user-specified magnification level (1118). For example, in FIG. 5AA, in response to gesture 598, document 584 is displayed at the same user-specified magnification level as in FIG. 5X.

In some embodiments, both the exiting the document-editing mode and displaying the document at the user-specified magnification level are performed in response to receiving the request automatically, without further user input. Enabling a user to both exit the document-editing mode and zoom the document to a magnification level at which the document was previously displayed by performing a single gesture reduces the number of steps that are performed by the user to return to a document-display mode from the document-editing mode, thereby increasing efficiency and ease of use of the device.

In some embodiments, in response to receiving the request to enter the document-editing mode, the device determines whether the document-editing magnification level is within a predefined threshold (e.g., 5%, 10%, 20%, 30% or some other reasonable threshold that reduces jitter) of the user-specified magnification level. For example, if the document-editing magnification level is 100%, the user-specified magnification level will be within the predefined threshold if it is a magnification level between 80% and 120%. In accordance with a determination that the document-editing magnification level is not within the predefined threshold, the device enters the document-editing mode and displays the document at a predefined document-editing magnification level different from the user-specified magnification level. In contrast, in accordance with a determination that the document-editing magnification level is within the predefined threshold, the device enters the document-editing mode while maintaining display of the document at the user-specified magnification level. In other words, when the document-editing magnification level is within the predefined threshold, the device does not zoom to a document-editing magnification level that is different from the user-specified magnification level.

In some embodiments, the electronic device includes a touch-sensitive surface, and the request to enter the document-editing mode is detected on the touch-sensitive surface (1120). In some embodiments, the touch-sensitive surface is separate from the display. In some embodiments, the touch-sensitive surface and the display are combined as a touchscreen display. For example, gesture 592 is detected on touch screen 112.

In some embodiments, the request to enter the document-editing mode is a double tap gesture detected on the touch-sensitive surface (1122). For example, gesture 592 (FIG. 5X) is a double tap gesture.

In some embodiments, the request to enter the document-editing mode includes an indication of an insertion point in the document and the insertion point is proximate to a respective portion of the document (1124). In response to receiving the request to enter the document-editing mode, the device scrolls the document to place the respective portion of the document in a central region of a document display area. (e.g., a central region of the display or a central region of a portion of the display that doesn't include a soft keyboard) (1126). For example, the location of gesture 592 (FIG. 5X) indicates an insertion point in cell 594. In FIG. 5Y, cell 594 is approximately centered in the part of touch screen 112 where document 584 is displayed.

In some embodiments, the request to enter the document-editing mode includes an indication of an insertion point in the document and the insertion point is proximate to a respective portion of the document (1128). Entering the document-editing mode includes providing an input interface for editing the respective portion of the document proximate to the insertion point (e.g., a text cursor and keyboard or a form field for entering a value) (1130). For example, in FIG. 5Y, while in document editing mode, keypad 595 and edit field 596 are displayed.

In some embodiments, in response to receiving the request to enter the document-editing mode, the device inserts a text cursor at the insertion point (1132). In response to receiving the request to exit the document-editing mode, the device removes the text cursor (1134). For example, a text cursor may be inserted into cell 594 when entering document-editing mode, and the text cursor is removed from cell 594 when exiting document-editing mode.

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 900, and 1000 (e.g., FIGS. 6A-6E, 7A-7B, 8A-8B, 9A-9B, and 10, respectively) are also applicable in an analogous manner to method 1100 described above with respect to FIGS. 11A-11B. For example, the electronic document, insertion point and various magnification levels described above with reference to method 1100 may have one or more of the characteristics of the electronic document, insertion point and various magnification levels described herein with reference to methods 600, 700, 800, 900, and 1000. For brevity, these details are not repeated here.

Figure 12:
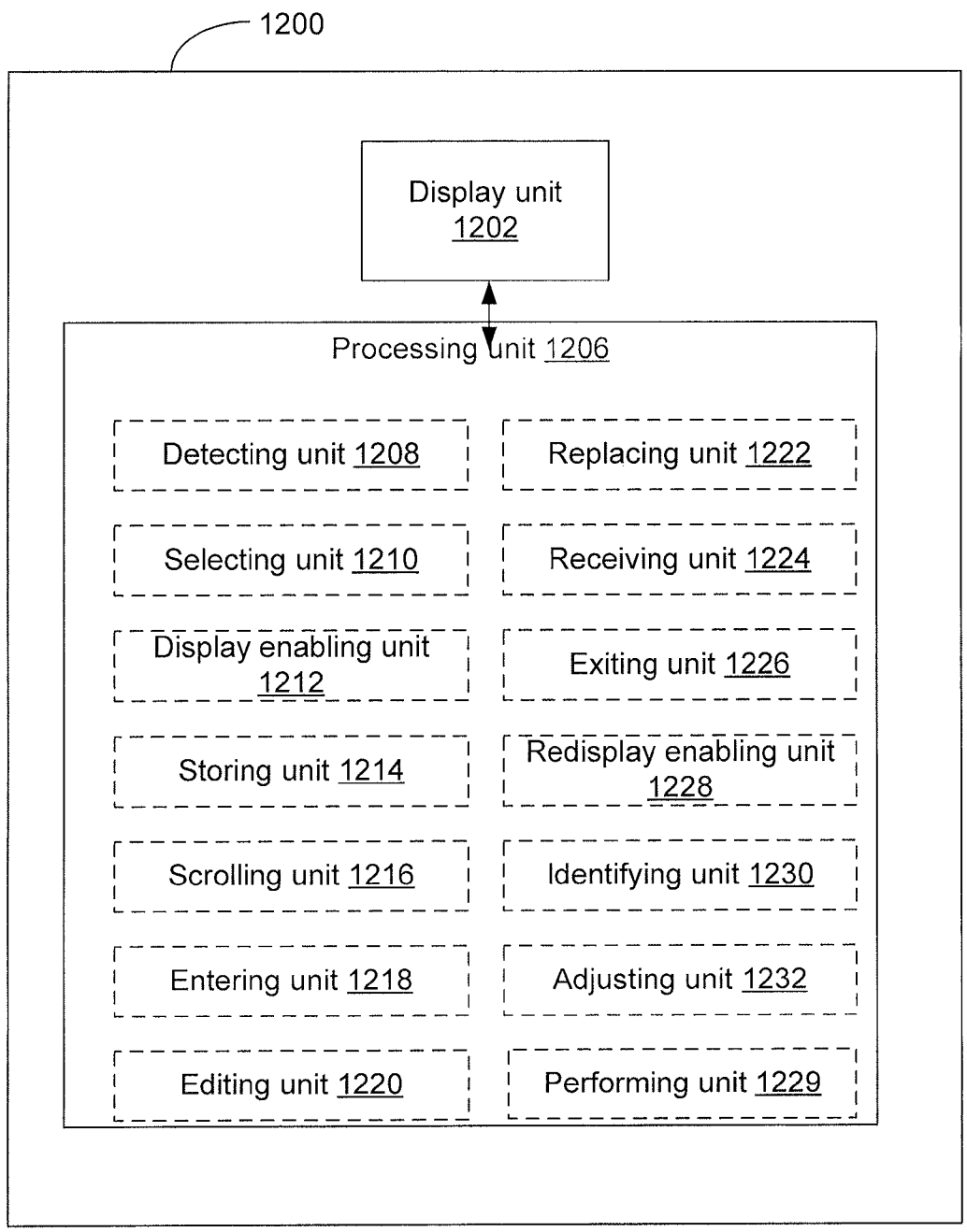
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, an electronic device 1200 includes a display unit 1202 configured to display at least a portion of an electronic document with a predefined page layout at a first magnification level; and a processing unit 1206 coupled to the display unit 1202. In some embodiments, the processing unit 1206 includes a detecting unit 1208, a selecting unit 1210, a display enabling unit 1212, a storing unit 1214, a scrolling unit 1216, an entering unit 1218, an editing unit 1220, a replacing unit 1222, a receiving unit 1224, an exiting unit 1226, a redisplay enabling unit 1228, a performing unit 1229, an identifying unit 1230, and an adjusting unit 1232.

The processing unit 1206 is configured to: detect a first input indicating a first insertion point in the document, wherein the first insertion point is proximate to a first portion of text in the document (e.g., with the detecting unit 1208); and in response to detecting the first input: select a second magnification level different from the first magnification level, wherein the second magnification level is selected so as to display the first portion of text at a target text display size (e.g., with the selecting unit 1210); and while maintaining the predefined page layout of the document, enable display of, at the second magnification level, a portion of the document that includes the first portion of text (e.g., with the display enabling unit 1212).

In some embodiments, the predefined page layout is a multi-page layout and the document has content that is associated with a plurality of the pages.

In some embodiments, the predefined page layout is a table with a plurality of rows and a plurality of columns.

In some embodiments, the electronic device includes a touch-sensitive surface unit, and the first input is detected on the touch-sensitive surface unit.

In some embodiments, the first input is a single tap on the touch-sensitive surface unit.

In some embodiments, the electronic device includes a touch-sensitive surface unit, and the first input includes: detecting a contact on the touch-sensitive surface unit; detecting movement of the contact on the touch-sensitive surface unit; and ceasing to detect the contact on the touch-sensitive surface unit.

In some embodiments, the processing unit 1206 is configured to: while detecting movement of the contact on the touch-sensitive surface unit, enable display of a magnified portion of the document corresponding to a current location of the contact on the touch-sensitive surface unit, wherein the first insertion point is selected based on a position of the contact on the touch-sensitive surface unit when the device ceases to detect the contact on the touch-sensitive surface unit (e.g., with the display enabling unit 1212).

In some embodiments, the processing unit 1206 is configured to: in response to detecting the first input, perform an operation selected from the set consisting of: placing a text cursor at the first insertion point, selecting a cell of a spreadsheet proximate to the first insertion point for editing, and highlight text proximate to the first insertion point (e.g., with the performing unit 1229).

In some embodiments, displaying the portion of the document at the second magnification level includes displaying an animation of the document zooming from the first magnification level to the second magnification level.

In some embodiments, the processing unit 1206 is configured to: in response to detecting the first input, scroll the document so that the first insertion point is in a central region of a displayed portion of the document (e.g., with the scrolling unit 1216).

In some embodiments, the processing unit 1206 is configured to: in response to detecting the first input, enter a document-editing mode (e.g., with the entering unit 1218).

In some embodiments, the electronic device enters the document-editing mode in response to detecting an end of the first input.

In some embodiments, the processing unit 1206 is configured to: in response to detecting the first input, enable display of a soft keyboard on the display unit 1202 (e.g., with the display enabling unit 1212).

In some embodiments, the processing unit 1206 is configured to: while in the document-editing mode, edit text of the document in response to user inputs (e.g., with the editing unit 1220).

In some embodiments, the document is one of a plurality of documents, and wherein the processing unit 1206 is configured to: prior to entering the document-editing mode, enable display of a navigation affordance for navigating between different documents in a set of documents (e.g., with the display enabling unit 1212); and after entering the document-editing mode, replace the navigation affordance with an exit affordance for exiting the document-editing mode (e.g., with replacing unit 1222).

In some embodiments, the processing unit 1206 is configured to: receive (e.g., with the receiving unit 1224) a request to exit the document-editing mode; and, in response to receiving the request to exit the document-editing mode: exit the document-editing mode (e.g., with the exiting unit 1226); and enable display of the document at the first magnification level (e.g., with the display enabling unit 1212).

In some embodiments, the processing unit 1206 is configured to: receive a request to exit the document-editing mode (e.g., with the receiving unit 1224); and, in response to receiving the request to exit the document-editing mode: exit the document-editing mode (e.g., with the exiting unit 1226); and enable display of the document at a third magnification level that corresponds to a predefined document magnification level different from the first magnification level (e.g., with the display enabling unit 1212).

In some embodiments, the processing unit 1206 is configured to: while in the document-editing mode, scroll the document in response to detecting inputs from a user (e.g., with the scrolling unit 1216); and after exiting the document-editing mode, enable redisplay of the document as it appeared when the first input was detected (e.g., with the redisplay enabling unit 1228).

In some embodiments, the target text display size at which the first portion of text is displayed in response to detecting the first input is a default target text display size, and wherein the processing unit 1206 is configured to: while displaying the portion of the document that includes the first portion of text at the second magnification level, detect a second input corresponding to a request to display a portion of the document at a third magnification level different from the second magnification level (e.g., with the detecting unit 1208); in response to detecting the second input: enable display of the portion of the document at the third magnification level (e.g., with the display enabling unit 1212); and store a user-adjusted target text display size corresponding to a text display size of the first portion of text at the third magnification level, wherein the user-adjusted target text display size is different from the default target text display size (e.g., with the storing unit 1214); and after storing the user-adjusted target text display size: detect a third input indicating a second insertion point in the document, wherein the second insertion point is proximate to a second portion of text in the document (e.g., with the detecting unit 1208); and in response to detecting the third input, enable display of the document at a respective magnification level such that the second portion of text is displayed at the user-adjusted target text display size (e.g., with the display enabling unit 1212).

In some embodiments, the first portion of text has a first font size, and wherein the processing unit 1206 is configured to: while displaying the portion of the document that includes the first portion of text at the second magnification level, detect a second input indicating a second insertion point in the document, wherein the second insertion point is proximate to a second portion of text in the document, the second portion of text having a second font size different from the first font size (e.g., with the detecting unit 1208); and in response to detecting the second input: select a third magnification level different from the second magnification level, wherein the third magnification level is selected so as to display the second portion of text at the target text display size (e.g., with the selecting unit 1210); and enable display of a portion of the document at the third magnification level (e.g., with the display enabling unit 1212).

In some embodiments, the processing unit 1206 is configured to, after displaying the portion of the document that includes the first portion of text at the second magnification level: detect a content selection input (e.g., with the detecting unit 1208); and in response to detecting the content selection input: identify a selected portion of the document in accordance with the content selection input (e.g., with the identifying unit 1230); and in accordance with a determination that the selected portion of the document includes content that is outside of a currently displayed portion of the document, adjust display of the document so that the entire selected portion of the document is displayed on the display unit 1202 (e.g., with the adjusting unit 1232).

Figure 13:
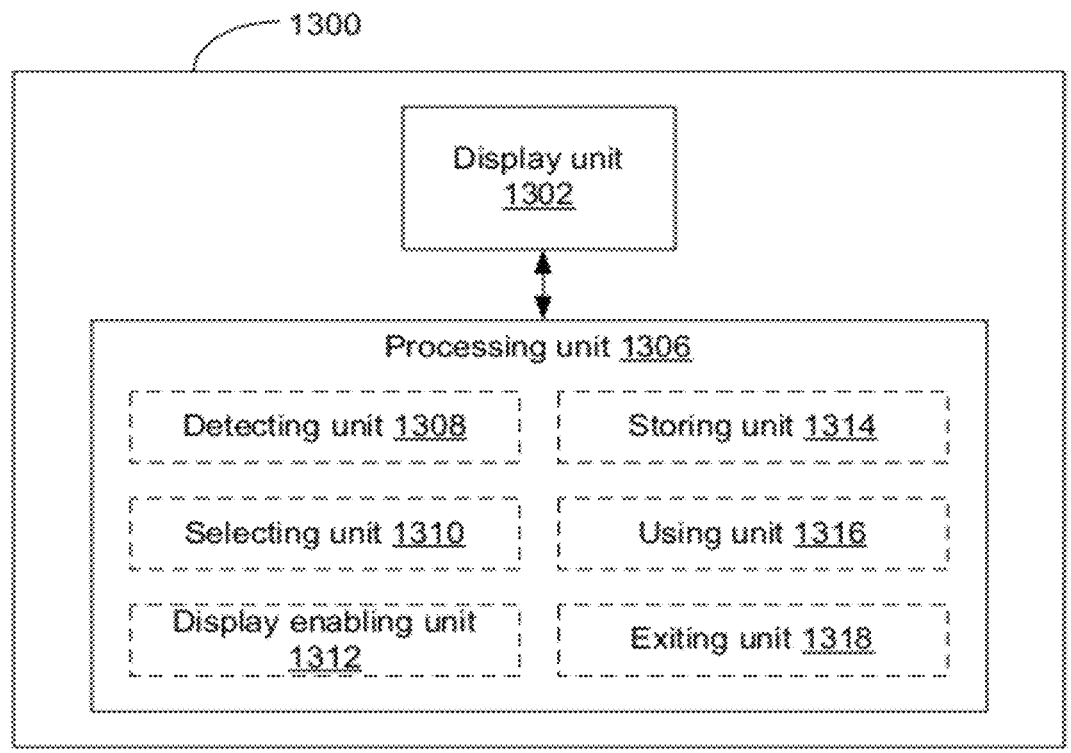
FIG. 13 is a functional block diagram of an electronic device in accordance with some embodiments.

In accordance with some embodiments, FIG. 13 shows a functional block diagram of an electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, an electronic device 1300 includes a display unit 1302 configured to display at least a portion of an electronic document at a first magnification level; and a processing unit 1306 coupled to the display unit 1302. In some embodiments, the processing unit 1306 includes a detecting unit 1308, a selecting unit 1310, a display enabling unit 1312, a storing unit 1314, a using unit 1316, and an exiting unit 1318.

The processing unit 1306 is configured to: detect a first input indicating a first insertion point in the document, wherein the first insertion point is proximate to a first portion of text in the document (e.g., with the detecting unit 1308); in response to detecting the first input: select a second magnification level different from the first magnification level, wherein the second magnification level is selected so as to display the first portion of text at a default target text display size (e.g., with the selecting unit 1310); and enable display of a portion of the document at the second magnification level (e.g., with the display enabling unit 1312); detect a second input corresponding to a request to display a portion of the document at a third magnification level different from the second magnification level (e.g., with the detecting unit 1308); in response to detecting the second input: enable display of the portion of the document at the third magnification level (e.g., with the display enabling unit 1312); and store a user-adjusted target text display size corresponding to a text display size of the first portion of text at the third magnification level, wherein the user-adjusted target text display size is different from the default target text display size (e.g., with the storing unit 1314); and after storing the user-adjusted target text display size: detect a third input indicating a second insertion point in the document, wherein the second insertion point is proximate to a second portion of text in the document (e.g., with the detecting unit 1308); and in response to detecting the third input, enable display of the document at a respective magnification level such that the second portion of text is displayed at the user-adjusted target text display size (e.g., with the display enabling unit 1312).

In some embodiments, the first portion of text is different from the second portion of text.

In some embodiments, the processing unit 1306 is configured to use the user-adjusted target text display size as a target display size for a plurality of different documents accessible by the device (e.g., with the using unit 1316).

In some embodiments, the default target text display size is a predefined value in the range 10 pt-24 pt.

In some embodiments, the respective magnification level is the same as the third magnification level if the second portion of text has a same font size as the first portion of text.

In some embodiments, the respective magnification level is different from the third magnification level if the second portion of text has a different font size from a font size of the first portion of text.

In some embodiments, the processing unit 1306 is configured to: after storing the user-adjusted target text display size and prior to detecting a third input indicating the respective insertion point in the document, exit a document-editing mode and displaying the document at the first magnification level (e.g., with the exiting unit 1318).

In some embodiments, the document has a predefined page layout and the predefined page layout is maintained while displaying the document at different magnification levels.

Figure 14:
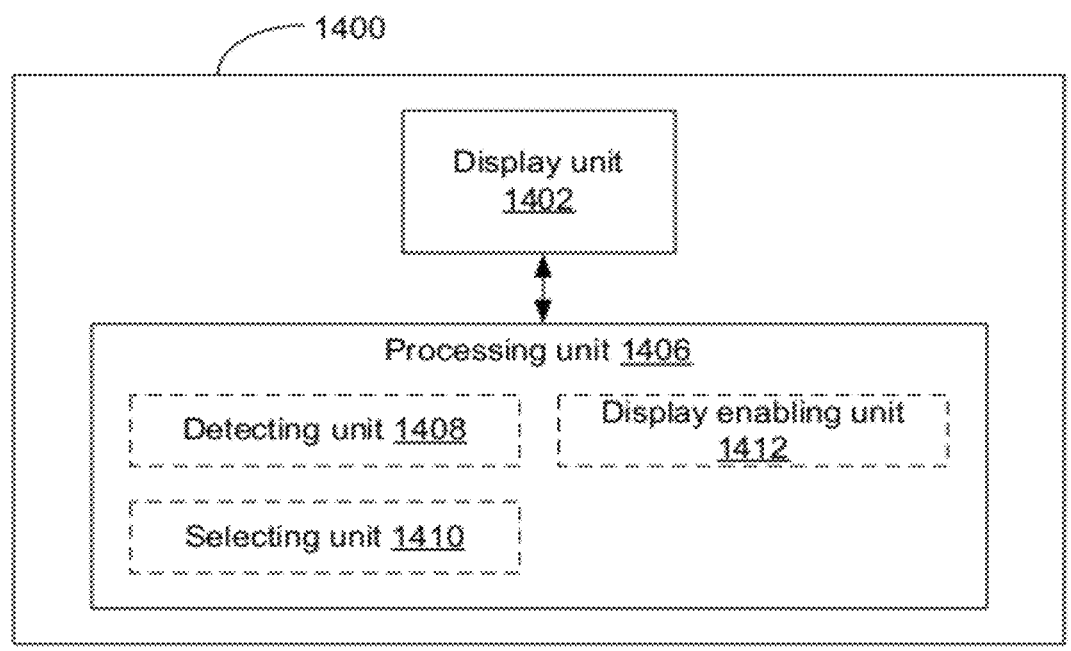
FIG. 14 is a functional block diagram of an electronic device in accordance with some embodiments.

In accordance with some embodiments, FIG. 14 shows a functional block diagram of an electronic device 1400 configured in accordance with the principles of the invention as described above. The functional blocks of the device may be implemented by hardware, software, or a combination of hardware and software to carry out the principles of the invention. It is understood by persons of skill in the art that the functional blocks described in FIG. 14 may be combined or separated into sub-blocks to implement the principles of the invention as described above. Therefore, the description herein may support any possible combination or separation or further definition of the functional blocks described herein.

As shown in FIG. 14, an electronic device 1400 includes a display unit 1402 configured to display at least a portion of an electronic document at a first magnification level; and a processing unit 1406 coupled to the display unit 1402. In some embodiments, the processing unit 1406 includes a detecting unit 1408, a selecting unit 1410, and a display enabling unit 1412.

The processing unit 1406 is configured to: detect a first input indicating a first insertion point in the document, wherein the first insertion point is proximate to a first portion of text in the document, the first portion of text having a first font size (e.g., with the detecting unit 1408); in response to detecting the first input: select a second magnification level different from the first magnification level, wherein the second magnification level is selected so as to display the first portion of text at a target text display size; (e.g., with the selecting unit 1410) and enable display of a portion of the document at the second magnification level (e.g., with the display enabling unit 1412); while displaying the portion of the document at the second magnification level, detect a second input indicating a second insertion point in the document, wherein the second insertion point is proximate to a second portion of text in the document, the second portion of text having a second font size different from the first font size (e.g., with the detecting unit 1408); and in response to detecting the second input: select a third magnification level different from the second magnification level, wherein the third magnification level is selected so as to display the second portion of text at the target text display size (e.g., with the selecting unit 1410); and enable display of a portion of the document at the third magnification level (e.g., with the display enabling unit 1412).

In some embodiments, the first font size is larger than the second font size.

In some embodiments, the first font size is smaller than the second font size.

In some embodiments, the electronic device includes a touch-sensitive surface unit, and the first input and the second input are detected on the touch-sensitive surface unit.

In some embodiments, the second input is a single tap on the touch-sensitive surface unit.

In some embodiments, the second input is a find command or a replace command.

In some embodiments, the electronic document has a predefined page layout and the predefined page layout is maintained while displaying the document at different magnification levels.

Figure 15:
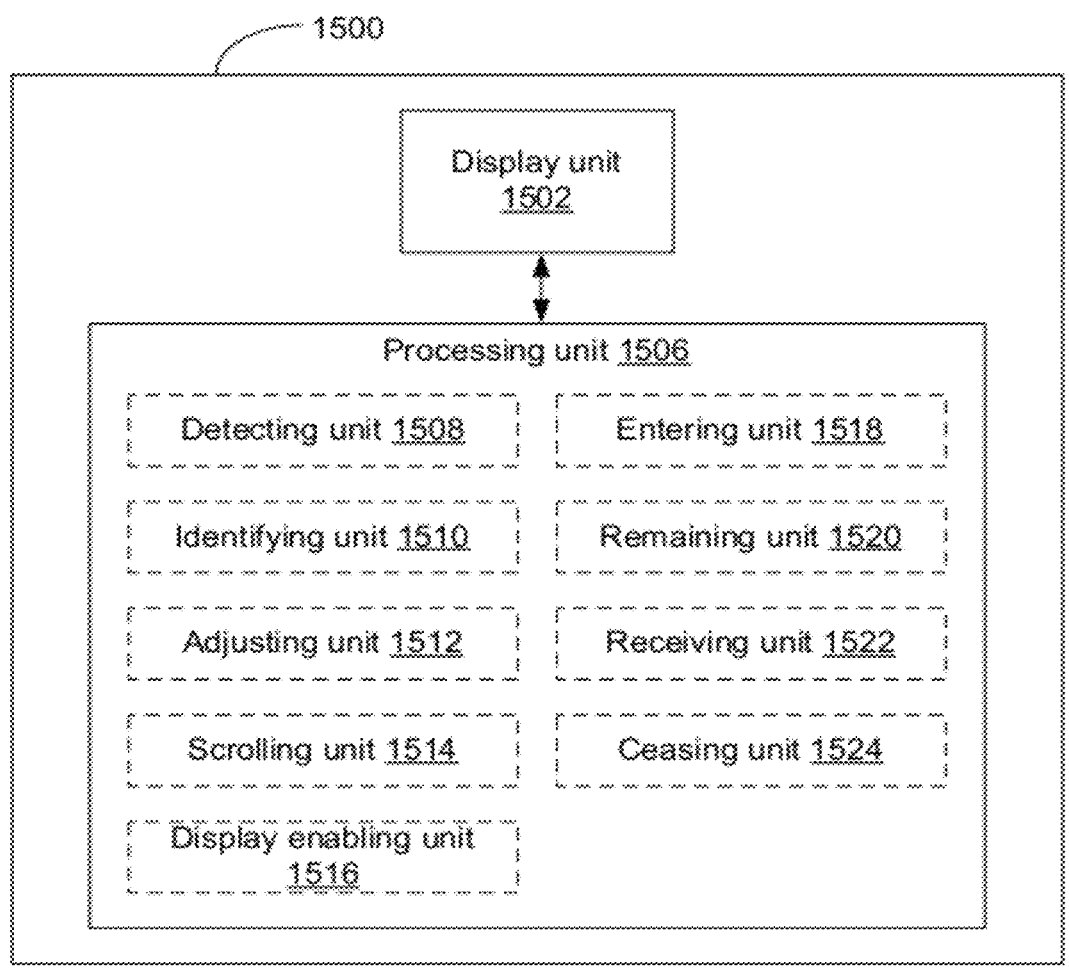
FIG. 15 is a functional block diagram of an electronic device in accordance with some embodiments.

In accordance with some embodiments, FIG. 15 shows a functional block diagram of an electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, an electronic device 1500 includes a display unit 1502 configured to display a portion of an electronic document; and a processing unit 1506 coupled to the display unit 1502. In some embodiments, the processing unit 1506 includes a detecting unit 1508, an identifying unit 1510, an adjusting unit 1512, a scrolling unit 1514, a display enabling unit 1516, an entering unit 1518, a remaining unit 1520, a receiving unit 1522, and a ceasing unit 1524.

The processing unit 1506 is configured to: detect a content selection input (e.g., with the detecting unit 1508); and in response to detecting the content selection input: identify a selected portion of the document in accordance with the content selection input (e.g., with the identifying unit 1510); and in accordance with a determination that the selected portion of the document includes content that is outside of a currently displayed portion of the document, adjust display of the document so that the entire selected portion of the document is displayed on the display unit 1502 (e.g., with the adjusting unit 1512).

In some embodiments, the electronic device includes a touch-sensitive surface unit, and the content selection input includes: detecting a contact on the touch-sensitive surface unit; detecting movement of the contact on the touch-sensitive surface unit; and ceasing to detect the contact on the touch-sensitive surface unit.

In some embodiments, the processing unit 1506 is configured to: in response to detecting movement of the contact on the touch-sensitive surface unit, scroll the document in accordance with the movement of the contact (e.g., with the scrolling unit 1514).

In some embodiments, adjusting display of the document is performed in response to ceasing to detect the contact on the touch-sensitive surface unit.

In some embodiments, the content includes text and/or images.

In some embodiments, the electronic document has a predefined page layout and the predefined page layout is maintained while adjusting display of the document.

In some embodiments, adjusting display of the document includes changing a magnification level for displaying the document.

In some embodiments, adjusting display of the document includes scrolling the document.

In some embodiments, the document has a page width; the selected portion of the document includes at least a full line of the document that spans the page width; and adjusting display of the document includes displaying the document at a page width magnification level.

In some embodiments, the processing unit 1506 is configured to: prior to detecting the content selection input, enable display of the document at a first magnification level (e.g., with the display enabling unit 1516); and in response to detecting the content selection input, enable display of the document at a second magnification level different from the first magnification level (e.g., with the display enabling unit 1516).

In some embodiments, the processing unit 1506 is configured to: prior to detecting the content selection input, enter a document-editing mode (e.g., with the entering unit 1518); and while in the document-editing mode, enable display of a soft keyboard on the display unit 1502 (e.g., with the display enabling unit 1516).

In some embodiments, the processing unit 1506 is configured to: prior to detecting the content selection input, enter a document-editing mode (e.g., with the entering unit 1518); and remain in the document-editing mode after adjusting display of the document (e.g., with the remaining unit 1520).

In some embodiments, the processing unit 1506 is configured to: prior to detecting the content selection input, receive a document-editing input (e.g., with the receiving unit 1522); in response to the document-editing input, enable display of a soft keyboard on the display unit 1502 (e.g., with the display enabling unit 1516); and in response to detecting the content selection input, cease to display the soft keyboard (e.g., with the ceasing unit 1524).

In some embodiments, the processing unit 1506 is configured to: in response to detecting the content selection input, enable display of a selection indicator indicating the selected portion of the document and a menu including options for manipulating the selected portion of the document (e.g., with the display enabling unit 1516).

Figure 16:
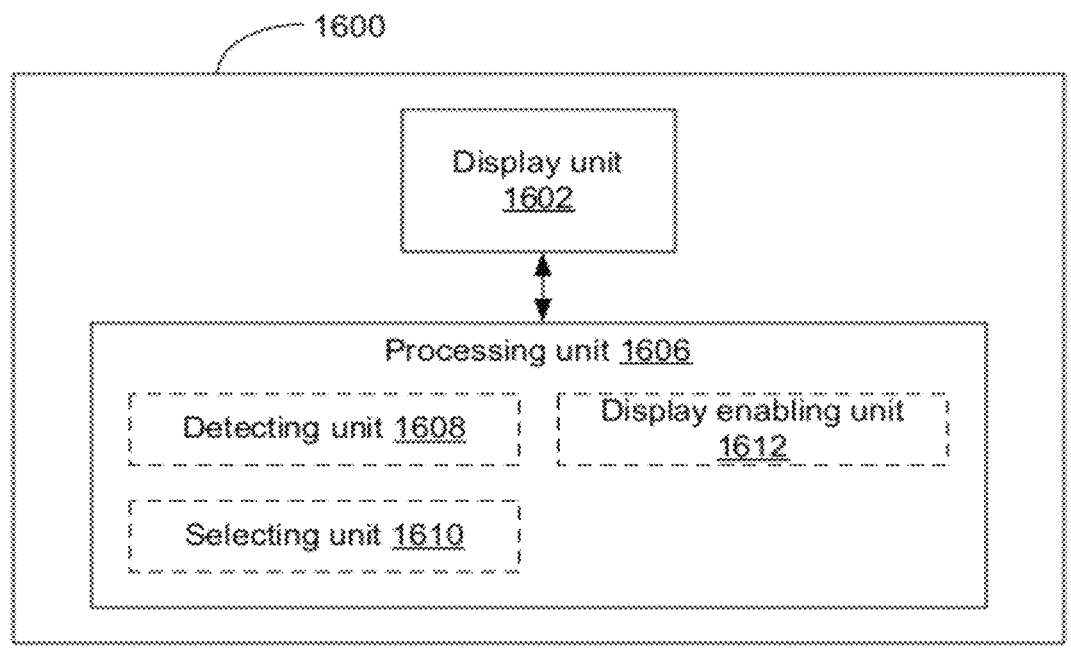
FIG. 16 is a functional block diagram of an electronic device in accordance with some embodiments.

In accordance with some embodiments, FIG. 16 shows a functional block diagram of an electronic device 1600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 16 may be combined or separated into sub-blocks to implement the principles of the invention as described above. Therefore, the description herein may support any possible combination or separation or further definition of the functional blocks described herein.

As shown in FIG. 16, an electronic device 1600 includes a display unit 1602 configured to display at least a portion of an electronic document at a first magnification level; and a processing unit 1606 coupled to the display unit 1602. In some embodiments, the processing unit 1606 includes a detecting unit 1608, a selecting unit 1610, and a display enabling unit 1612.

The processing unit 1606 is configured to: detect an input indicating a point within an object in the document (e.g., with the detecting unit 1608); and in response to detecting the input: in accordance with a determination that the object includes respective editable text: select a second magnification level different from the first magnification level, wherein the second magnification level is selected so as to display the respective text at a target text display size (e.g., with the selecting unit 1610); and enable display of the document at the second magnification level (e.g., with the display enabling unit 1612); and in accordance with a determination that the object does not include editable text: select a third magnification level different from the second magnification level, wherein the third magnification level is selected so as to display the object at a target object display size (e.g., with the selecting unit 1610); and enable display of the document at the third magnification level (e.g., with the display enabling unit 1612).

In some embodiments, the second magnification level is selected without reference to a size of the object.

In some embodiments, the object display size is a display size where the object is displayed at a predefined size with reference to a displayed area of the document on the display unit 1602.

Figure 17:
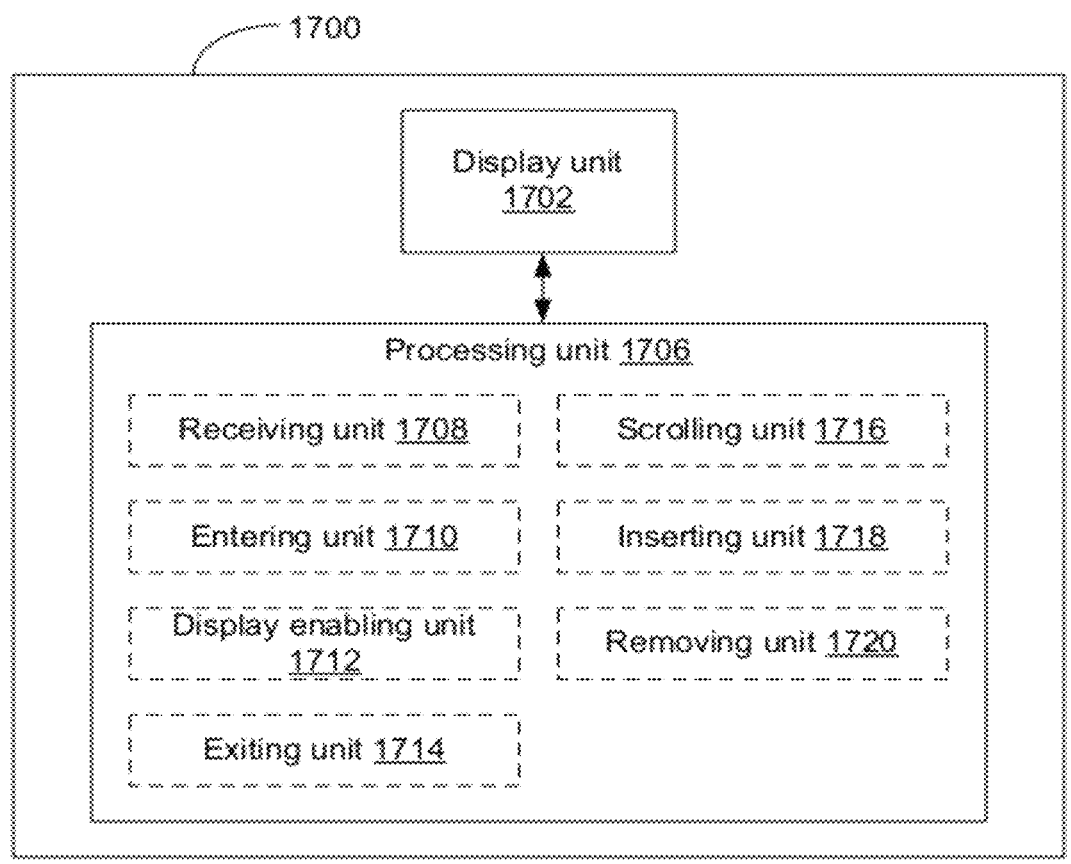
FIG. 17 is a functional block diagram of an electronic device in accordance with some embodiments.

In accordance with some embodiments, FIG. 17 shows a functional block diagram of an electronic device 1700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 17 may be combined or separated into sub-blocks to implement the principles of the invention as described above. Therefore, the description herein may support any possible combination or separation or further definition of the functional blocks described herein.

As shown in FIG. 17, an electronic device 1700 includes a display unit 1702 configured to display at least a portion of an electronic document at a user-specified magnification level; and a processing unit 1706 coupled to the display unit 1702. In some embodiments, the processing unit 1706 includes a receiving unit 1708, an entering unit 1710, a display enabling unit 1712, an exiting unit 1714, a scrolling unit 1716, an inserting unit 1718, and a removing unit 1720.

The processing unit 1706 is configured to: while the document is in a document-display mode, receive a request to enter a document-editing mode distinct from the document-display mode (e.g., with the receiving unit 1708); and in response to receiving the request to enter the document-editing mode: enter the document-editing mode (e.g., with the entering unit 1710); and enable display of the document at a predefined document-editing magnification level different from the user-specified magnification level (e.g., with the display enabling unit 1712); while the document is in a document-editing mode, receive a request to exit the document-editing mode; and in response to receiving the request to exit the document-editing mode: exit the document-editing mode (e.g., with the exiting unit 1714); and enable display of the document at the user-specified magnification level (e.g., with the display enabling unit 1712).

In some embodiments, the electronic device includes a touch-sensitive surface unit, and the request to enter the document-editing mode is detected on the touch-sensitive surface unit.

In some embodiments, the request to enter the document-editing mode is a double tap gesture detected on the touch-sensitive surface unit.

In some embodiments, the request to enter the document-editing mode includes an indication of an insertion point in the document; the insertion point is proximate to a respective portion of the document; and the processing unit 1706 is configured to, in response to receiving the request to enter the document-editing mode, scroll the document to place the respective portion of the document in a central region of a document display area (e.g., with the scrolling unit 1716).

In some embodiments, the request to enter the document-editing mode includes an indication of an insertion point in the document; the insertion point is proximate to a respective portion of the document; and entering the document-editing mode includes providing an input interface for editing the respective portion of the document proximate to the insertion point.

In some embodiments, the processing unit 1706 is configured to: in response to receiving the request to enter the document-editing mode, insert a text cursor at the insertion point (e.g., with the inserting unit 1718); and in response to receiving the request to exit the document-editing mode, remove the text cursor (e.g., with the removing unit 1720).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6E, 7A-7B, 8A-8B, 9A-9B, 10, and 11A-11B may be implemented by components depicted in FIGS. 1A-1B. For example, detection operation 608, selection operation 612, and displaying operation 614 in FIGS. 6A-6E may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more processors;
   memory; and
   one or more programs, wherein the one or more programs are stored in the memory and configured to be executed by the one or more processors, the one or more programs including instructions for:
      displaying at least a portion of an electronic document with a predefined page layout, the electronic document displayed at a first magnification level on the display;
      detecting a first input indicating a first insertion point in the document, wherein the first insertion point is proximate to a first portion of text in the document; and
      in response to detecting the first input:
         selecting a second magnification level for the electronic document, different from the first magnification level, wherein the second magnification level is selected so as to display the first portion of text at a target text display size;
         while maintaining the predefined page layout of the document, displaying, at the second magnification level, a portion of the document that includes the first portion of text;
         performing an operation selected from the set consisting of: placing a text cursor at the first insertion point, selecting a cell of a spreadsheet proximate to the first insertion point for editing, and highlighting text proximate to the first insertion point; and
         displaying a soft keyboard on the display.

2. The device of claim 1, including instructions for, in response to detecting the first input, scrolling the document so that the first insertion point is in a central region of a displayed portion of the document.

3. The device of claim 1, including instructions for, in response to detecting the first input, entering a document-editing mode.

4. The device of claim 3, including instructions for, while in the document-editing mode, editing text of the document in response to user inputs.

5. The device of claim 3, wherein the document is one of a plurality of documents, and the device includes instructions for:
   prior to entering the document-editing mode, displaying a navigation affordance for navigating between different documents in a set of documents; and
   after entering the document-editing mode, replacing the navigation affordance with an exit affordance for exiting the document-editing mode.

6. The device of claim 3, including instructions for:
   receiving a request to exit the document-editing mode; and,
   in response to receiving the request to exit the document-editing mode:
      exiting the document-editing mode; and
      displaying the document at the first magnification level.

7. The device of claim 3, including instructions for:
   receiving a request to exit the document-editing mode; and,
   in response to receiving the request to exit the document-editing mode:
      exiting the document-editing mode; and
      displaying the document at a third magnification level that corresponds to a predefined document magnification level different from the first magnification level.

8. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
      displaying at least a portion of an electronic document with a predefined page layout, the electronic document displayed at a first magnification level on the display;
      detecting a contact on the touch-sensitive surface;
      detecting movement of the contact on the touch-sensitive surface;
      while detecting movement of the contact on the touch-sensitive surface, displaying a magnified portion of the document corresponding to a current location of the contact on the touch-sensitive surface;
      ceasing to detect the contact on the touch-sensitive surface;
      detecting a first input indicating a first insertion point in the document, wherein the first insertion point is proximate to a first portion of text in the document, wherein the first insertion point is selected based on a position of the contact on the touch-sensitive surface when the device ceases to detect the contact on the touch-sensitive surface; and
      in response to detecting the first input:
         selecting a second magnification level for the electronic document, different from the first magnification level, wherein the second magnification level is selected so as to display the first portion of text at a target text display size; and
         while maintaining the predefined page layout of the document, displaying, at the second magnification level, a portion of the document that includes the first portion of text.

9. A method, comprising:
at an electronic device with a display:
displaying at least a portion of an electronic document with a predefined page layout, the electronic document displayed at a first magnification level on the display;
detecting a first input indicating a first insertion point in the document, wherein the first insertion point is proximate to a first portion of text in the document; and
in response to detecting the first input:
selecting a second magnification level for the electronic document, different from the first magnification level, wherein the second magnification level is selected so as to display the first portion of text at a target text display size;
while maintaining the predefined page layout of the document, displaying, at the second magnification level, a portion of the document that includes the first portion of text;
performing an operation selected from the set consisting of: placing a text cursor at the first insertion point, selecting a cell of a spreadsheet proximate to the first insertion point for editing, and highlighting text proximate to the first insertion point; and
displaying a soft keyboard on the display.

10. The method of claim 9, including, in response to detecting the first input, scrolling the document so that the first insertion point is in a central region of a displayed portion of the document.

11. The method of claim 9, including, in response to detecting the first input, entering a document-editing mode.

12. The method of claim 11, including, while in the document-editing mode, editing text of the document in response to user inputs.

13. The method of claim 11, wherein the document is one of a plurality of documents, and the method includes:
prior to entering the document-editing mode, displaying a navigation affordance for navigating between different documents in a set of documents; and
after entering the document-editing mode, replacing the navigation affordance with an exit affordance for exiting the document-editing mode.

14. The method of claim 11, including:
receiving a request to exit the document-editing mode; and,
in response to receiving the request to exit the document-editing mode:
exiting the document-editing mode; and
displaying the document at the first magnification level.

15. The method of claim 11, including:
receiving a request to exit the document-editing mode; and,
in response to receiving the request to exit the document-editing mode:
exiting the document-editing mode; and
displaying the document at a third magnification level that corresponds to a predefined document magnification level different from the first magnification level.

16. A non-transitory computer readable storage medium storing one or more programs, the one or more programs comprising instructions, which when executed by an electronic device with a display, cause the device to:
display at least a portion of an electronic document with a predefined page layout, the electronic document displayed at a first magnification level on the display;
detect a first input indicating a first insertion point in the document, wherein the first insertion point is proximate to a first portion of text in the document; and
in response to detecting the first input:
select a second magnification level for the electronic document, different from the first magnification level, wherein the second magnification level is selected so as to display the first portion of text at a target text display size;
while maintaining the predefined page layout of the document, display, at the second magnification level, a portion of the document that includes the first portion of text;
perform an operation selected from the set consisting of: placing a text cursor at the first insertion point, selecting a cell of a spreadsheet proximate to the first insertion point for editing, and highlighting text proximate to the first insertion point; and
display a soft keyboard on the display.

17. The computer readable storage medium of claim 16, including instructions, which when executed by the electronic device with the display, cause the device to, in response to detecting the first input, scroll the document so that the first insertion point is in a central region of a displayed portion of the document.

18. The computer readable storage medium of claim 16, including instructions, which when executed by the electronic device with the display, cause the device to, in response to detecting the first input, enter a document-editing mode.

19. The computer readable storage medium of claim 18, including instructions, which when executed by the electronic device with the display, cause the device to, while in the document-editing mode, edit text of the document in response to user inputs.

20. The computer readable storage medium of claim 18, wherein the document is one of a plurality of documents, and the computer readable storage medium includes instructions, which when executed by the electronic device with the display, cause the device to:
prior to entering the document-editing mode, display a navigation affordance for navigating between different documents in a set of documents; and
after entering the document-editing mode, replace the navigation affordance with an exit affordance for exiting the document-editing mode.

21. The computer readable storage medium of claim 18, including instructions, which when executed by the electronic device with the display, cause the device to:
receive a request to exit the document-editing mode; and,
in response to receiving the request to exit the document-editing mode:
exit the document-editing mode; and
display the document at the first magnification level.

22. The computer readable storage medium of claim 18, including instructions, which when executed by the electronic device with the display, cause the device to:
receive a request to exit the document-editing mode; and,
in response to receiving the request to exit the document-editing mode:
exit the document-editing mode; and
display the document at a third magnification level that corresponds to a predefined document magnification level different from the first magnification level.

23. A method, comprising:

at an electronic device with a display and a touch-sensitive surface:

displaying at least a portion of an electronic document with a predefined page layout, the electronic document displayed at a first magnification level on the display;

detecting a contact on the touch-sensitive surface;

detecting movement of the contact on the touch-sensitive surface;

while detecting movement of the contact on the touch-sensitive surface, displaying a magnified portion of the document corresponding to a current location of the contact on the touch-sensitive surface;

ceasing to detect the contact on the touch-sensitive surface;

detecting a first input indicating a first insertion point in the document, wherein the first insertion point is proximate to a first portion of text in the document, wherein the first insertion point is selected based on a position of the contact on the touch-sensitive surface when the device ceases to detect the contact on the touch-sensitive surface; and in response to detecting the first input:

selecting a second magnification level for the electronic document, different from the first magnification level, wherein the second magnification level is selected so as to display the first portion of text at a target text display size; and while maintaining the predefined page layout of the document, displaying, at the second magnification level, a portion of the document that includes the first portion of text.

24. A non-transitory computer readable storage medium storing one or more programs, the one or more programs comprising instructions, which when executed by an electronic device with a display and a touch-sensitive surface, cause the device to:

display at least a portion of an electronic document with a predefined page layout, the electronic document displayed at a first magnification level on the display;

detect a contact on the touch-sensitive surface;

detect movement of the contact on the touch-sensitive surface;

while detecting movement of the contact on the touch-sensitive surface, display a magnified portion of the document corresponding to a current location of the contact on the touch-sensitive surface;

cease to detect the contact on the touch-sensitive surface;

detect a first input indicating a first insertion point in the document, wherein the first insertion point is proximate to a first portion of text in the document, wherein the first insertion point is selected based on a position of the contact on the touch-sensitive surface when the device ceases to detect the contact on the touch-sensitive surface; and in response to detecting the first input:

select a second magnification level for the electronic document, different from the first magnification level, wherein the second magnification level is selected so as to display the first portion of text at a target text display size; and while maintaining the predefined page layout of the document, display, at the second magnification level, a portion of the document that includes the first portion of text.

* * * * *